(12) United States Patent
Potter

(10) Patent No.: US 8,004,127 B2
(45) Date of Patent: Aug. 23, 2011

(54) ROTARY RELUCTANCE MOTOR

(75) Inventor: Steven D. Potter, Bedford, MA (US)

(73) Assignee: Foster-Miller, Inc., Waltham, MA (US)

( * ) Notice: Subject to any disclaimer, the term of this patent is extended or adjusted under 35 U.S.C. 154(b) by 414 days.

(21) Appl. No.: 12/150,003

(22) Filed: Apr. 24, 2008

(65) Prior Publication Data
US 2010/0052439 A1    Mar. 4, 2010

Related U.S. Application Data

(63) Continuation-in-part of application No. 11/732,044, filed on Apr. 2, 2007, now abandoned, which is a continuation of application No. 10/726,420, filed on Dec. 3, 2003, now Pat. No. 7,218,019.

(60) Provisional application No. 60/431,604, filed on Dec. 6, 2002.

(51) Int. Cl.
H02K 37/08 (2006.01)
H02K 16/00 (2006.01)

(52) U.S. Cl. .................. 310/49.44; 310/49.43; 310/168; 310/268; 310/114

(58) Field of Classification Search .................. 310/268, 310/114, 168, 49.43, 49.44
See application file for complete search history.

(56) References Cited

U.S. PATENT DOCUMENTS

| | | | | |
|---|---|---|---|---|
| 2,797,346 A * | 6/1957 | Ranseen | | 310/46 |
| 3,401,323 A * | 9/1968 | French | | 318/696 |
| 3,469,134 A * | 9/1969 | Bering et al. | | 310/164 |
| 3,700,944 A * | 10/1972 | Heintz | | 310/168 |
| 3,992,641 A | 11/1976 | Heinrich et al. | | |
| 4,864,169 A | 9/1989 | Rioux et al. | | |
| 4,912,343 A | 3/1990 | Stuart | | |
| 5,495,131 A | 2/1996 | Goldie et al. | | |
| 5,751,089 A | 5/1998 | Stridsberg | | |
| 5,831,353 A | 11/1998 | Bolding et al. | | |
| 5,982,074 A * | 11/1999 | Smith et al. | | 310/254.1 |
| 6,670,730 B2 | 12/2003 | Bartolotti | | |
| 6,741,010 B2 * | 5/2004 | Wilkin | | 310/268 |
| 6,940,190 B2 | 9/2005 | Jobson et al. | | |

* cited by examiner

*Primary Examiner* — Burton Mullins
(74) *Attorney, Agent, or Firm* — Iandiorio Teska & Coleman

(57) ABSTRACT

A rotary reluctance motor includes a set of inner disks each having an inner diameter root, an outer diameter free end, and a plurality of alternating high permeability teeth and low permeability material segments. A set of outer disks is interleaved with the inner disks to form a disk stack. Each outer disk has an outer diameter root, an inner diameter free end, and a plurality of alternating high permeability teeth and low permeability material segments. The inner and outer disks are configured to bear against and support each other in response to axial magnetic forces. Flux return portions are disposed axially adjacent the disks at each end of the disk stack. A coil is associated with the roots of one of the sets of disks and configured to provide axial flux through the disk stack to rotate one set of disks with respect to the other set of disks.

7 Claims, 56 Drawing Sheets

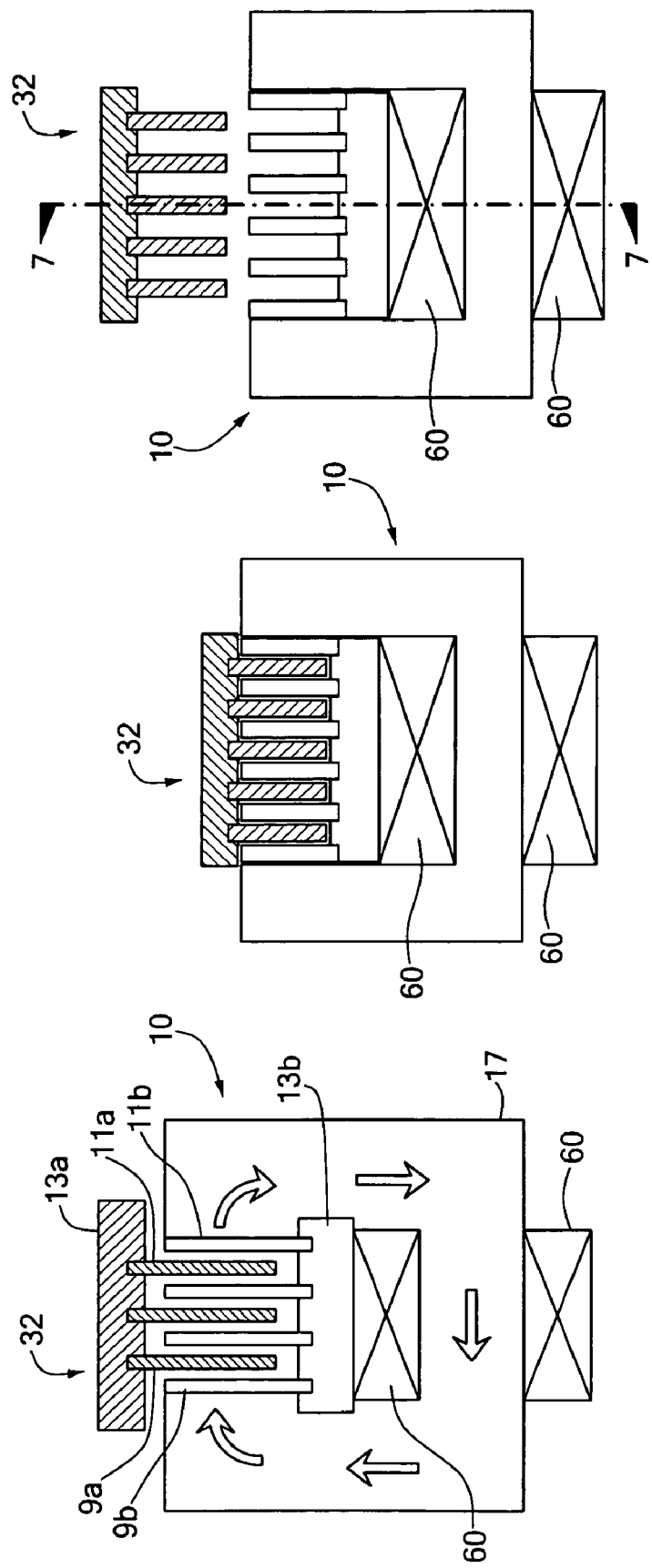

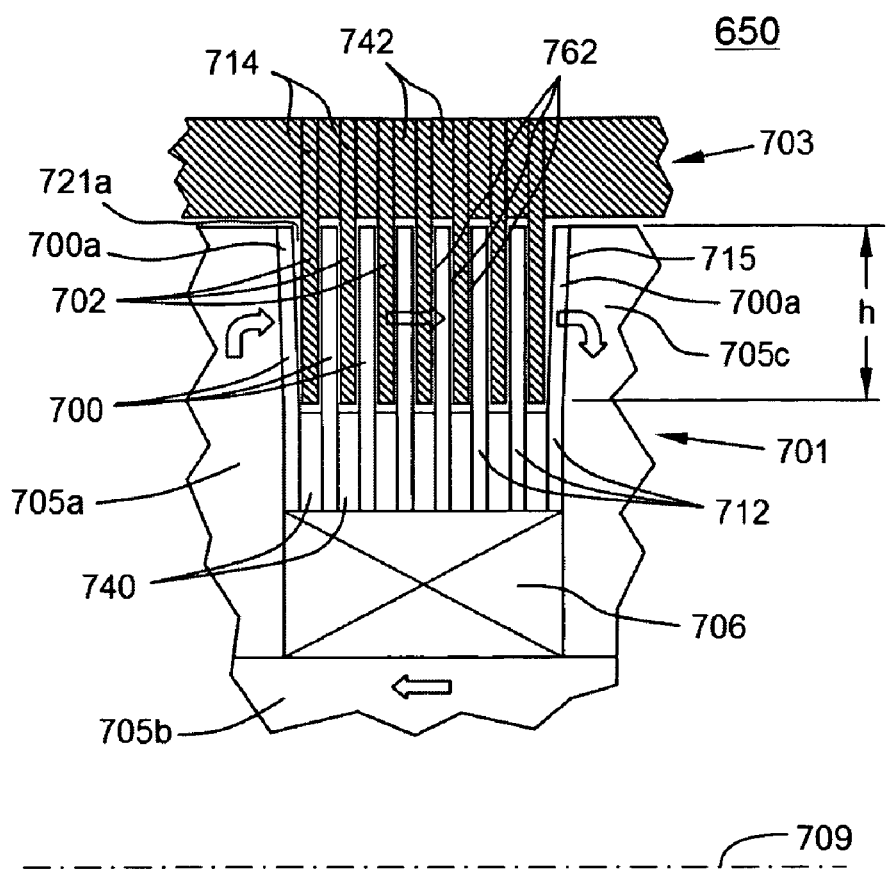
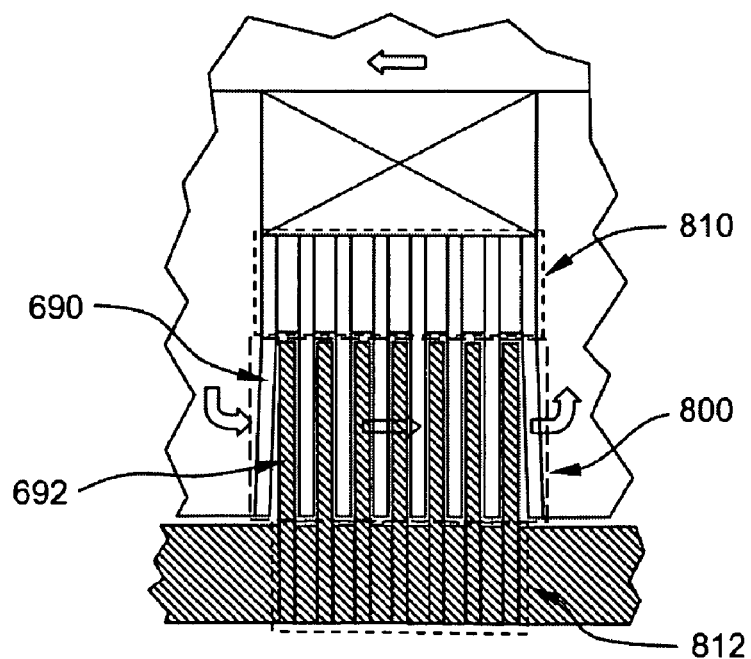
Fig. 59

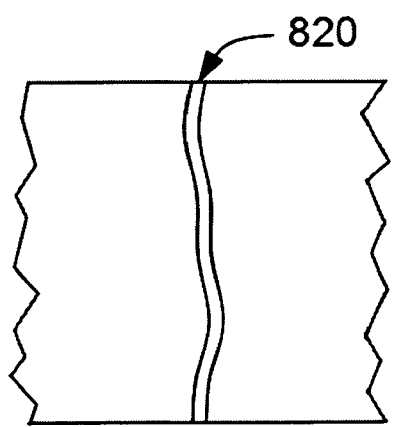
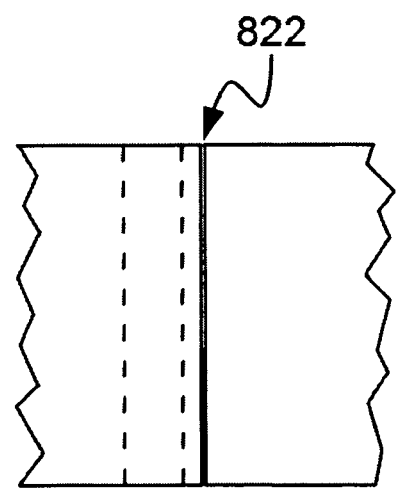
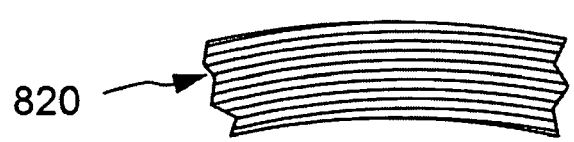
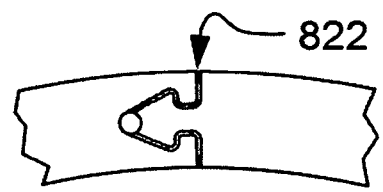
Fig. 80A           Fig. 80B

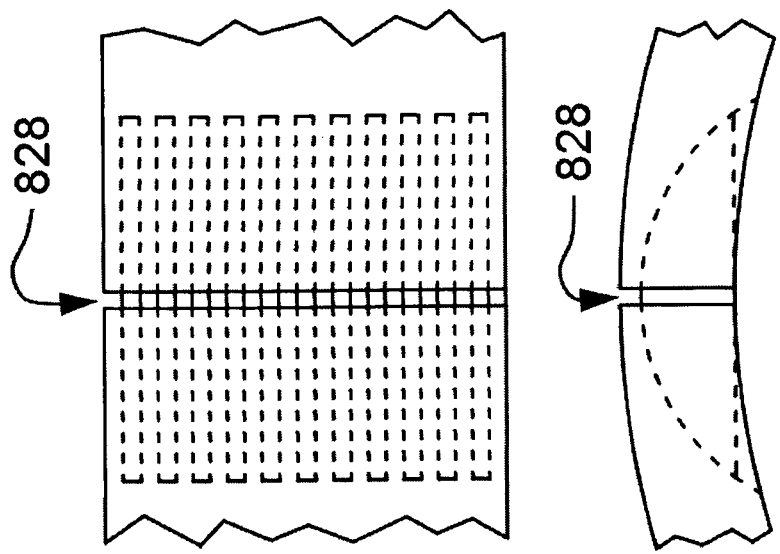
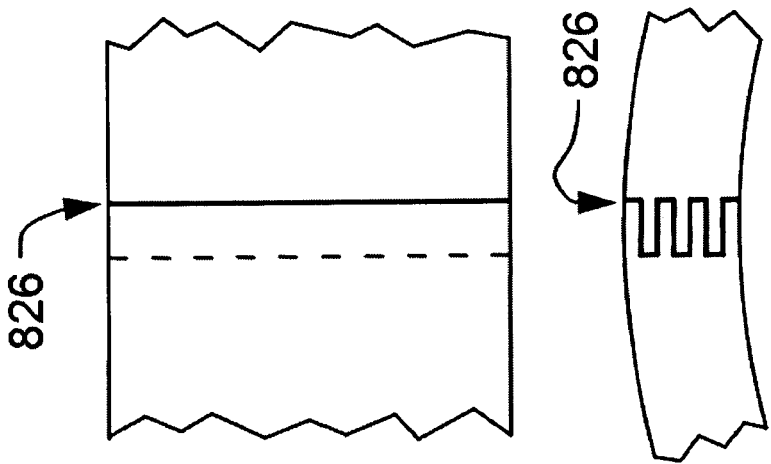
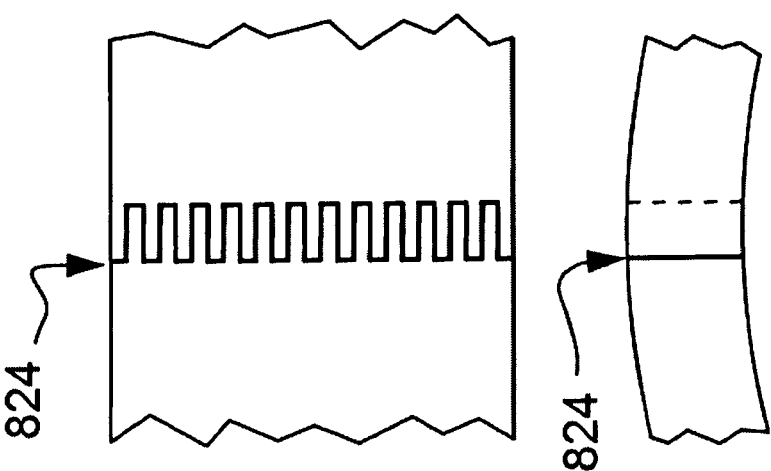

ROTARY RELUCTANCE MOTOR

RELATED APPLICATIONS

This application is a continuation-in-part of U.S. patent application Ser. No. 11/732,044 filed Apr. 2, 2007 now abandoned, which is a continuation of prior U.S. patent application Ser. No. 10/726,420 filed Dec. 3, 2003, now U.S. Pat. No. 7,218,019, which claims the benefit of and priority to U.S. provisional application Ser. No. 60/431,604 filed Dec. 6, 2002, each of which are incorporated herein by reference.

GOVERNMENT RIGHTS

This invention was made with U.S. Government support under the U.S. Government Contract No. N68335-01-C-0384 with the U.S. Navy. The Government may have certain rights in the subject invention.

FIELD OF THE INVENTION

This subject invention relates to reluctance motors, and in particular rotary reluctance motors.

BACKGROUND OF THE INVENTION

Conventional electric motors, both rotary and linear, have very poor torque and force density. For heavy lifting applications, mechanical means such as gears and screws are more typically used. Fluidic devices including pneumatic and hydraulic systems are also used. These mechanical methods generally involve noise, wear, backlash, poor shock tolerance, and high reflected inertia. The fluidic methods tend to increase system complexity due to the addition of a fluid system. Fluid systems are also harder to control than electric systems. Due to seal wear, the fluid methods are unreliable and can contaminate sensitive environments when the working fluid leaks.

Most prior art linear motors operating on the principle of magnetism, however, include permanent magnets or are classified as inductance machines. U.S. Pat. No. 4,864,169, also incorporated herein by this reference, discloses a linear reluctance motor but it is configured such that the magnetic flux produced extends in the direction of the actuation axis. Such a design, however, results in a fairly low force density.

In general, variable reluctance motors include a stationary part (stator) which includes coil(s), each of which has an associated "pole", typically made of some form of iron. The combination of a coil and its "poles" is known as a "phase". A moving part (rotor) also has "poles", and when a phase is energized, the rotor tends to move so as to align its "poles" with those of the stator. When aligned with this energized phase, the other two (or more) phases are so arranged that their poles are offset in one direction or the other. By energizing the phases in the correct sequence, the motor moves or revolves. See e.g. U.S. Pat. No. 3,992,641, which discloses a rotor-stator alignment arrangement for a poly-phase disk motor with improved starting torque regardless of position, which is incorporated herein by reference.

As in any electric motor, torque results from the electromagnetic shear force acting between the rotor and the stator. A common term in motor design is the operating "shear pressure", i.e. the shear force per unit area. In a variable reluctance motor, the shear pressure goes up with the flux-density squared, but the maximum pressure is sharply limited by the saturation flux-density of the poles and flux return (typically made of an iron alloy).

A polyphase disk reluctance rotary motor is shown in U.S. Pat. No. 3,992,641 incorporated herein by this reference. The motor therein described uses interleaved disks and radial teeth to provide higher torque than conventional motors, however, the torque is still sharply limited due to the use of thick, self-supporting disks and large gaps between disks.

BRIEF SUMMARY OF THE INVENTION

It is therefore an object of this invention to provide an improved rotary reluctance motor.

It is a further object of this invention to provide such an improved rotary reluctance motor which provides higher torque.

It is a further object of this invention to provide such an improved rotary reluctance motor which exhibits higher torque density.

The invention results from the realization that an improved rotary reluctance motor is effected by orienting the windings of the coils to produce flux through a set of interleaved rotating disks, and by making the disks thin and well-centered, the disks need not be self-supporting but instead support each other, and the disk density can be increased resulting in higher torque per mass and torque per volume. In contrast, the conventional wisdom is that each disk must be sufficiently thick and stiff to support itself and that the gaps between the disks must be large. The invention also results from the realization that with such minimal gap spacing between the disks, there are reduced resistive losses, less coil current is required to generate the necessary flux, and less heat is generated. The invention results from the further realization that increased torque may further be achieved by a large number of interleaved disks including high permeability teeth separated by low permeability material segments, creating a large surface area for electromagnetic shear.

This invention features a rotary reluctance motor including a set of inner disks each having an inner diameter root, an outer diameter free end, and a plurality of alternating high permeability teeth and low permeability material segments. A set of outer disks is interleaved with the inner disks to form a disk stack. Each outer disk has an outer diameter root, an inner diameter free end, and a plurality of alternating high permeability teeth and low permeability material segments. The inner and outer disks are configured to bear against and support each other in response to axial magnetic forces. Flux return portions are disposed axially adjacent the disks at each end of the disk stack. A coil is associated with the roots of one of the sets of disks. The coil is configured to provide axial flux through the disk stack to rotate one set of disks with respect to the other set of disks. The rotary reluctance motor may further include lubricating fluids, powders, films or coatings on or between the interleaved disks.

In one configuration, the set of inner disks are fixed at the inner diameter roots to an inner root assembly, and the set of outer disks are fixed at the outer diameter roots to an outer root assembly, with the root assemblies defining spacing of the disks. The axial clearances between disks may vary, and the disks may touch, but there is an average axial clearance between the disks of the disk stack. Typically, the disks are flexible to tolerate errors in disk flatness and axial misalignment, which allows smaller average axial clearance between the disks. In one variation, there is a gap between the endmost disk of a disk stack and the adjacent flux return and/or a gap between the endmost disk and the adjacent disk, wherein the gap is substantially larger than the average axial clearance between disks of the disk stack. The gap may be tapered to allow for axial misalignment of the inner and outer root assemblies and to minimize the size of the gap during operation of the motor.

In another variation, the rotary reluctance motor of the subject invention includes a flexure residing in a flexure region between a disk root and an interleaved portion of the disk. The flexure region may be formed by thinning a portion of the disk in the flexure region, or by increasing the height of the flexure region, or by including slots in the flexure region, or by some combination thereof. The motor may also include a set of disks which include at least one disk that is thinner at the free end thereof. Typically, the inner disks and outer disks have the same number of teeth and the teeth are evenly spaced. In one configuration, the high permeability teeth extend from the disk roots and are fabricated from the same material stock as the disk root.

Root assemblies can be fabricated using spacers between disks roots and/or a collar. The root assemblies are preferably made of low permeability materials, and discontinuities can be used to avoid circumferential eddy currents. A root assembly may further include multiple discontinuities which are staggered to provide greater mechanical strength.

The high permeability teeth and low permeability segments may be configured to be straight, curved, wavy, angled, zig-zagged or chevroned, with each tooth typically having an average angle within 45 degrees of the radial direction. The high permeability teeth can be made of laminated ferromagnetic material, and the disks can have more than one row of high permeability teeth. Also, some or all of the disks may include a thin structural layer covering the high permeability teeth and low permeability segments for reinforcing the disks, and/or some or all of the disks may include a reinforcing band of structural material at the free end.

Typically, the rotary reluctance motor includes a plurality of disk stacks, coils and flux return portions. The root assembly (or assemblies) associated with the coil can be axially clamped to the flux return portions using at least one tie rod. In one configuration, the collar and the root of at least one of the spaced disks are mated and arranged in tangential alignment.

The subject invention also features a rotary reluctance motor comprising a set of inner disks each having an inner diameter root, an outer diameter free end, and a plurality of alternating high permeability teeth and low permeability segments, with spacers and/or a collar attached to the roots of the inner disks to form an inner root assembly. A set of outer disks is interleaved with the inner disks to form a disk stack, with each outer disk having and outer diameter root, and inner diameter free end, and a plurality of alternating high permeability teeth and low permeability material segments. Spacers and/or a collar are attached to the roots of the outer disks to form an outer root assembly. Flux return portions are disposed axially adjacent each end of the disk stack, and a coil is associated with one of the root assemblies and configured to provide axial flux through the disk stack to rotate the inner set of disks with respect to the outer set of disks. At least one tie rod clamps the flux return portions to the root assembly associated with the coil.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 4 is a schematic cross-sectional view of a linear reluctance motor in accordance with the subject invention wherein the active component is associated with the stator which includes three phases serially arranged;

FIG. 5 is a schematic cross-sectional view similar to FIG. 4;

FIG. 6 is a schematic cross-sectional exploded view of the linear reluctance motor shown in FIGS. 4 and 5;

FIG. 59 is a schematic cross-sectional partial view showing primary components of one embodiment of a rotary reluctance motor in accordance with the present invention;

FIGS. 80A-80E are schematic partial side and end views of embodiments of discontinuity configurations for conductive collars in accordance with the present invention;

DETAILED DESCRIPTION OF THE INVENTION

Figure 1:
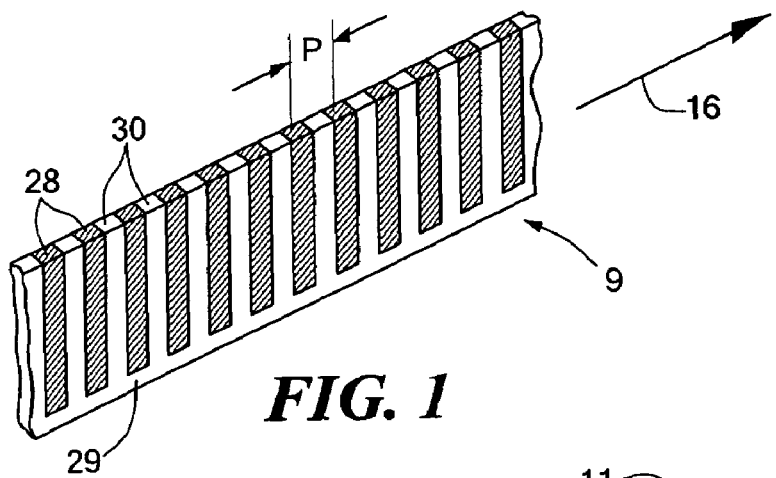
FIG. 1 is a schematic three-dimensional view of a single blade in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts a single blade 9 including a plurality of alternating high permeability teeth 28 and low permeability teeth 30 extending from blade root 29 and defining pitch P. In FIG. 1, teeth 28 and 30 extend perpendicular to the longitudinal axis of the blade but this is not a necessary limitation of the subject invention as discussed infra. Also, the longitudinal axis of the blade is the actuation axis 16 as defined herein.

Figure 2:
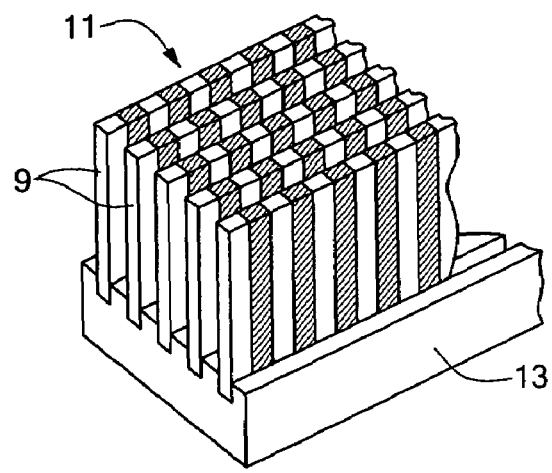
FIG. 2 is a schematic three-dimensional view of a blade set in accordance with the subject invention.
Figure 3:
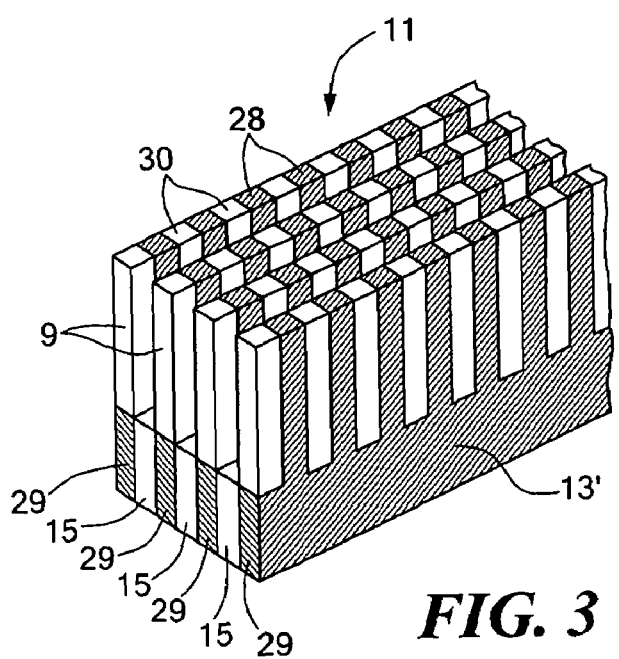
FIG. 3 is a schematic three-dimensional view of another embodiment of a blade set in accordance with the subject invention.

FIG. 2 depicts a single blade set 11 including blades held in place by blade carrier or plate 13. FIG. 3 shows an alternative type of carrier 13' where non-magnetic spacers 15 separate blade roots 29.

Regions of low-permeability 30 between teeth 28 may be filled with a low-permeability structural material including, but not limited to, polymers, ceramic-filled polymers, metal-filled polymers, fiber-filled polymers, ceramics, metal-filled ceramics, and low-permeability metals such as aluminum, brass and stainless-steel.

One version of a linear reluctance motor in accordance with the subject invention includes shuttle 32, FIG. 4 and stator housing 10, defining a channel for receiving shuttle 32 therein. As used herein, the "shuttle" is typically the moving component while the stator component is the fixed in place component but those skilled in the art will understand that if, in any embodiment described herein, the "shuttle" is held fixed, then the stator becomes the moving component or that even both the stator and the shuttle may move in some embodiments or applications.

In FIG. 4, shuttle 32 includes blade carrier 13a disposed outside the C-shaped channel defined by stator housing 10, and blade set 11a extending into the channel of stator housing 10. Here, blade carrier 13a may serve as the carriage which drives other structure(s) attached thereto in a linear fashion. Interleaved with the blades 9a of shuttle blade set 11a are the blades 9b of stator blade set 11b. In this embodiment, the active component of the motor is associated with stator 10 which includes three phases arranged serially along the actuation axis. Each phase includes flux return portion 17 and coil 60 wound to produce flux through the sets of interleaved blades 9a and 9b in a direction transverse to the actuation axis of the motor. FIGS. 5-6 provide similar views to that of FIG. 4.

Figure 7:
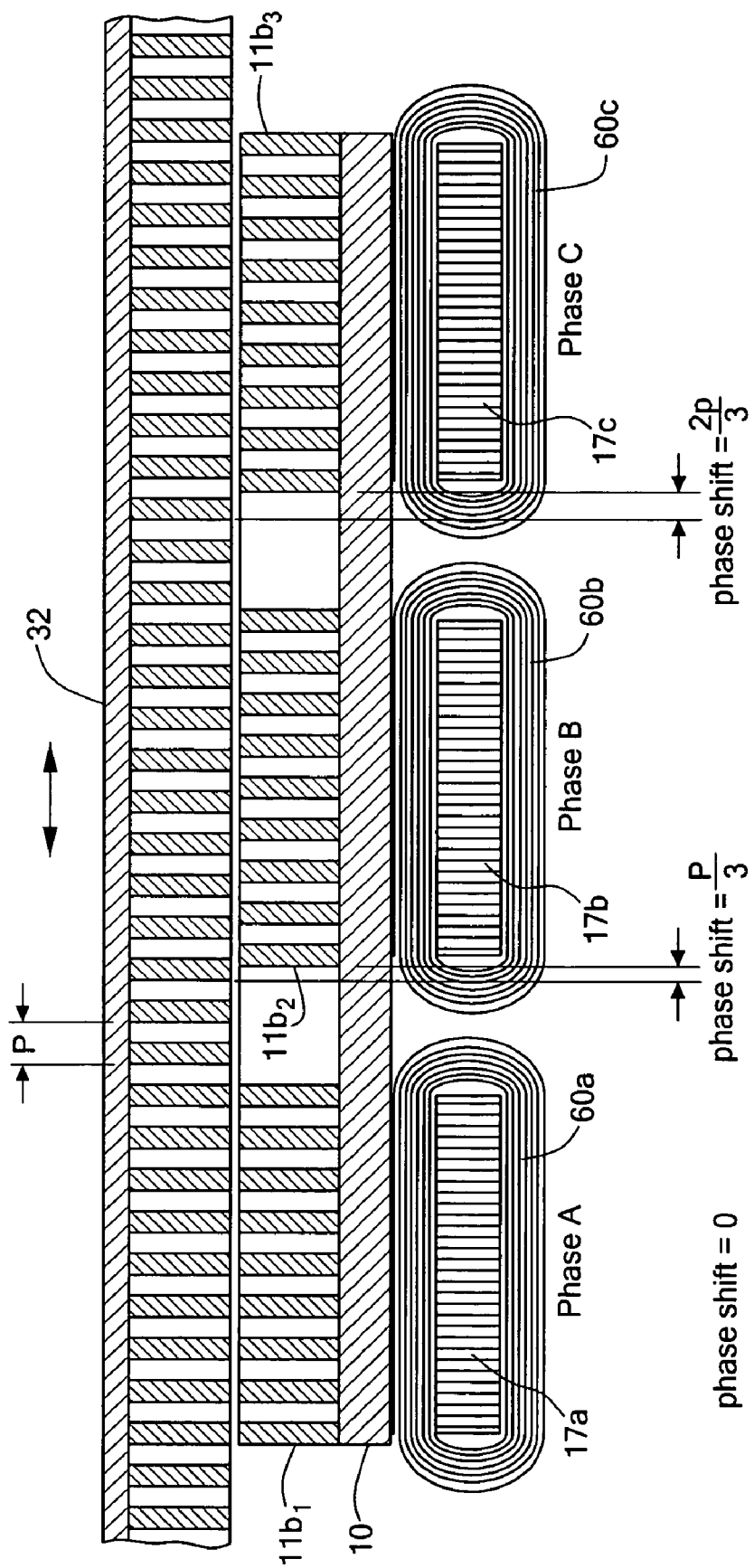
FIG. 7 is a sectional view taken along line 7-7 of FIG. 6.

FIG. 7 shows the three serially arranged phases A, B, and C of stator 10 each including a coil $60a$, $60b$, and $60c$, a blade set $11b_1$, $11b_2$, and $11b_3$, and flux return plates $17a$, $17b$, and $17c$ (each made of laminated ferromagnetic material, for example). Each phase A, B, and C of stator 10 is offset by ⅓ of a tooth pitch P assuming three phases such that phase A has a phase shift of zero, phase B has a phase shift of P/3, and phase C has a phase shift of 2P/3.

Figure 8:
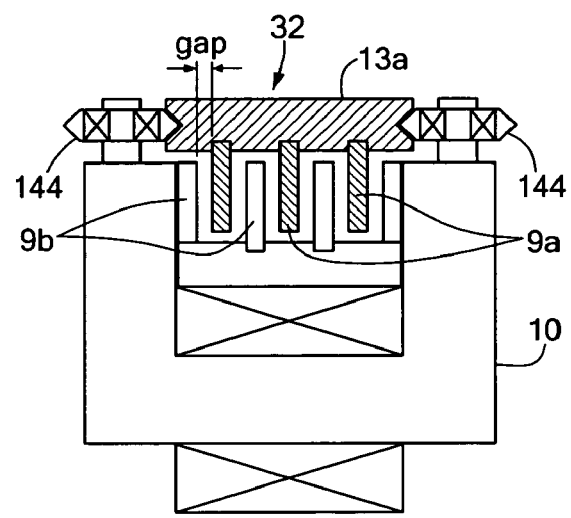
FIG. 8 is a schematic cross-sectional view similar to FIG. 4 with the addition of a linear bearing assembly.

In the embodiment of FIG. 8, the blades of the stator and rotor are fairly thick and the gaps between them fairly large to resist unstable magnetic attractive pressure and to avoid sliding contact between adjacent blades. Thus, shuttle 32 blade teeth 9a and stator 10 teeth 9b can be made relatively thick and relatively large gaps existing between the blades (e.g., 10 mils or greater) but in any case large enough so the blades do touch each other in the presence of unstable magnetic attraction. Linear bearing assembly 144 controls movement of moving shuttle blade carrier 13a.

Figure 9:
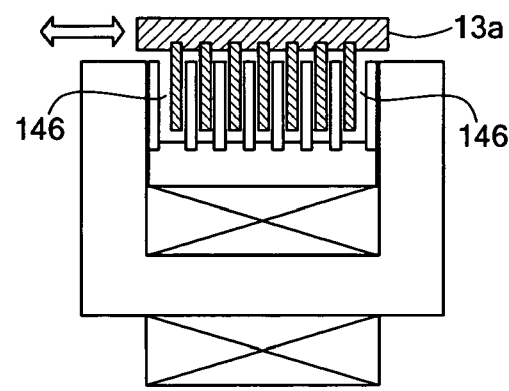
FIG. 9 is a schematic cross-sectional view showing how the size of the gap between the outermost blades and the next adjacent blades can be increased.
Figure 10:
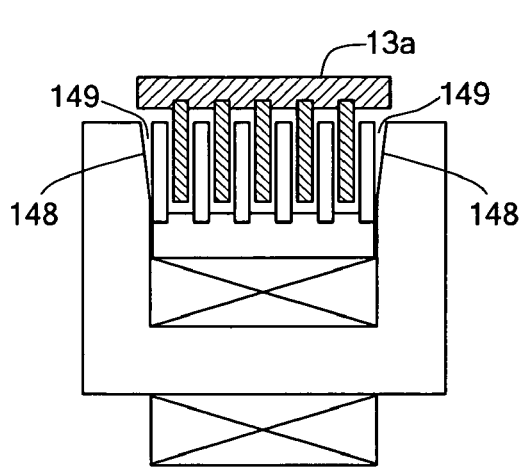
FIG. 10 is a schematic cross-sectional view similar to FIG. 9 except that the flux return side walls of the stator are tapered to increase the gap spacing.

Alternatively, FIG. 9 shows a design where the blades are spaced closely together for maximum force density and minimum power requirements. In this case, the blades may come into contact with each other, but in a practical assembly it is desirable to provide additional lateral play to allow for alignment errors between phases or between the phases and a linear bearing. The larger outer gap 146 between the outermost teeth and the next adjacent teeth allows lateral motion of blade carrier 13a in the case where the remainder of the interleaved teeth of the stator and the shuttle are closely spaced. The blades are stiff in shear but flexible in bending. FIG. 10 show a similar situation in which the flux return portion includes an outwardly tapered wall 148 to increase the gap 149 between the outermost blades of the stator and the flux return section of the stator. In either case, lateral play between the shuttle and the stator is effected by making the outer gap greater than the average gap between the interleaved blades as shown.

Figure 11:
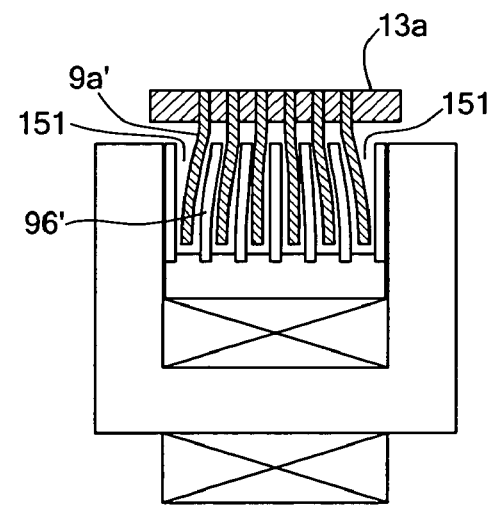
FIG. 11 is a schematic cross-sectional view showing the use of flexible or bent blades for both the stator and the shuttle.
Figure 12:
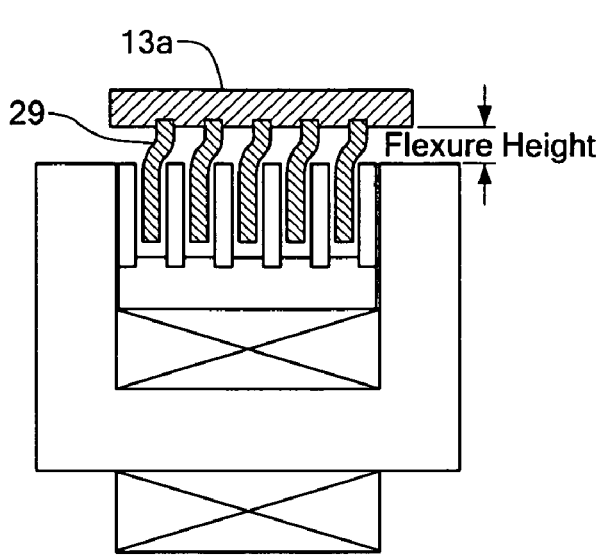
FIG. 12 is a schematic cross-sectional view showing flexible shuttle blades in accordance with the subject invention.
Figure 13:
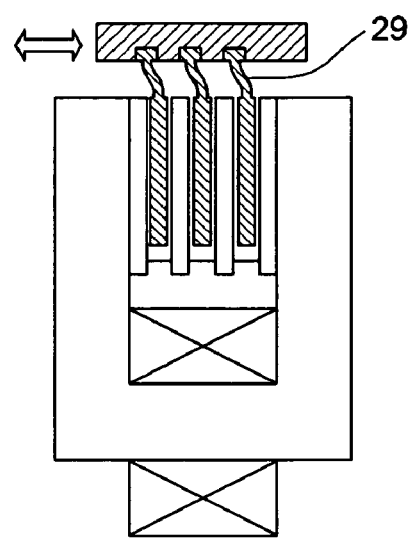
FIG. 13 is a schematic partial cross-sectional view showing shuttle blades with thinned down blade roots in order to provide flexibility in accordance with the subject invention.
Figure 14:
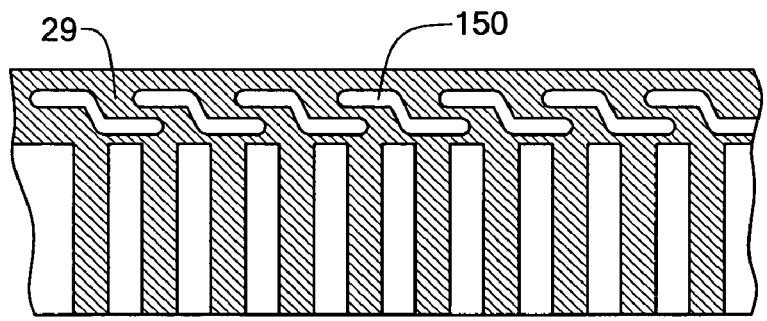
FIG. 14 is a schematic side view of a blade with slots in the blade root in order to provide flexibility.
Figure 15:
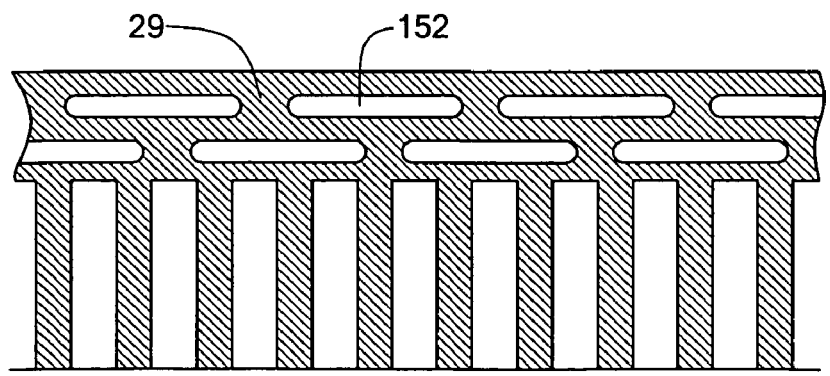
FIG. 15 is a schematic side view of a blade also with slots in the blade root in order to provide flexibility.

So far, the blades of the stator and the shuttle have been shown to be straight but that is not a necessary limitation of the subject invention as shown in FIG. 11 where both the stator 9b' and shuttle 9a' blades are bent or have an extended root portion or otherwise bend or flex to provide a close blade spacing (e.g., 0.0005" to 0.003") while allowing significant lateral (e.g., ±0.005" to 0.010") motion of the shuttle. Thus, in FIG. 11, outer gap 151 is larger than the average gap between the interleaved blades. Or, the root 29, FIG. 13 of the shuttle blades can include flexural features to allow bending or flexing of the blades when the interleaved blades are very closely spaced. This method provides lateral play without increasing the gaps between blades. In one example, as shown in FIG. 13, the root 29 of the shuttle blade is thinned down. In the embodiment shown in FIG. 14, the root 29 of the teeth are formed with slots 150 to provide flexure and in FIG. 15 different kind of slots 152 are shown. The result is a blade relatively stiff in the axial direction but compliant in the lateral direction.

When the gaps between the interleaved blades are small or non-existent, lubrication can be used to lower the friction between the blades. Or, friction and wear can be minimized by using low-friction materials, coatings, or films. These methods are recommended when the blades are too thin and too closely spaced to maintain a gap in the presence of lateral pressure resulting from unstable magnetic attraction.

In all these embodiments, the blade-carriers of the passive shuttle can move laterally with respect to the corresponding blade-carrier on the active stator by a distance substantially greater than the average gap between interleaved blades without causing high contact stress on the outer blades, thus avoiding friction and wear resulting from lateral misalignment of blade-sets.

Figure 16:
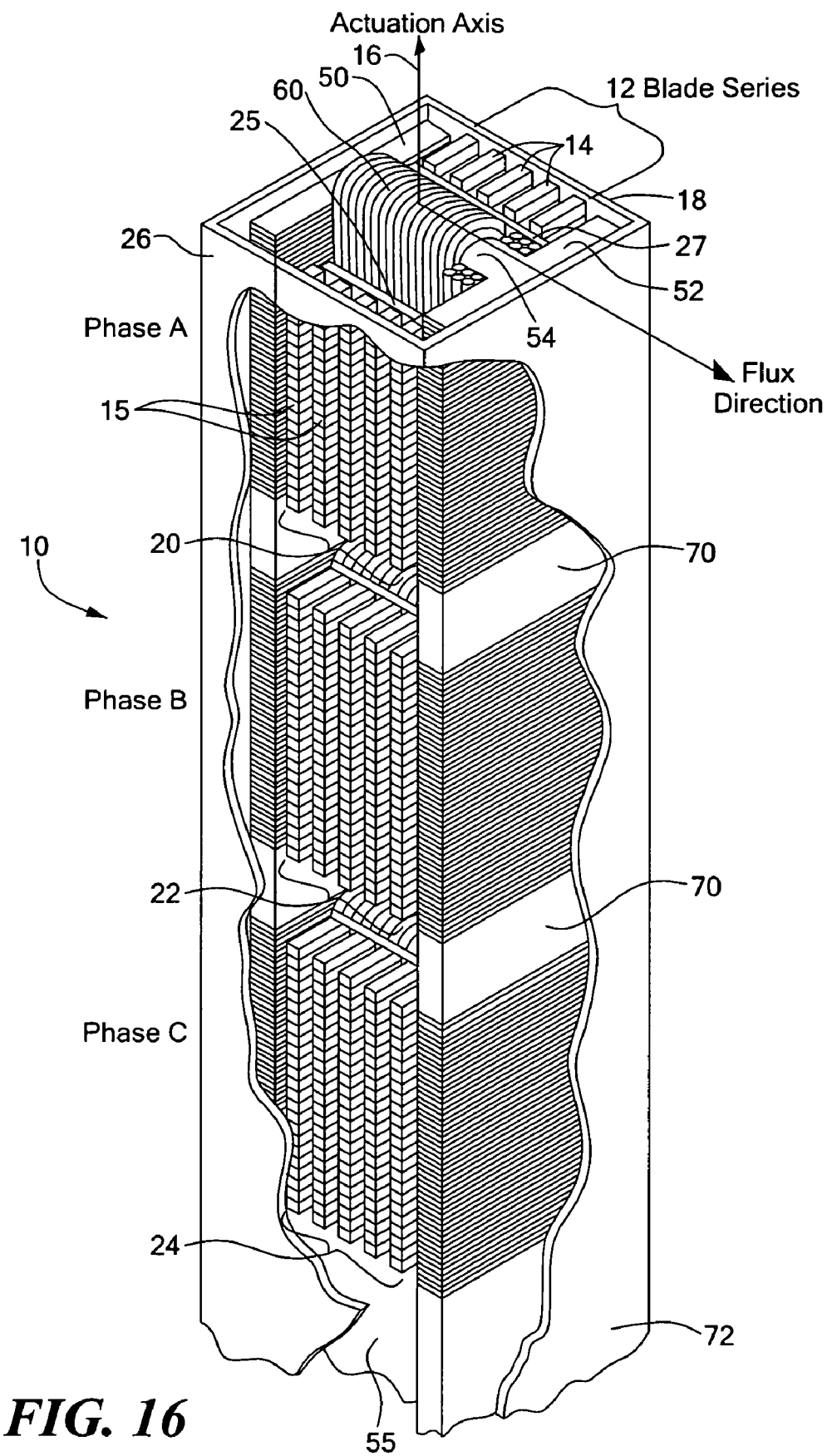
FIG. 16 is a three-dimensional schematic view of one embodiment of the stator portion of a linear reluctance motor in accordance with the subject invention.

FIG. 16 shows another possible configuration of a linear reluctance motor in accordance with the subject invention employing the principles discussed above. In this embodiment, the channel defined by stator 10 is fully enclosed by the walls of the stator as shown and shuttle 32 is telescopingly received in stator 10. Stator 10 includes at least one set 12 of spaced blades 14 each extending lengthwise in the direction of actuation axis 16. In this particular embodiment, there are three serially arranged sets of blades extending outwardly from plate 27 towards side 18 of stator 10 and three opposing serially arranged sets 20, 22, and 24 of blades extending from plate 25 towards side 26 of stator 10 constituting three phases A, B, and C although such a construction is not a limitation of this invention. As shown, blade set 20 includes blades 15. Each blade includes a plurality of alternating low permeability teeth 28 and high permeability teeth 30 where P is the tooth pitch. Assuming the stator has N phases, it is preferred that the blades of each phase of stator 10, FIG. 16 are offset by 1/N of a tooth pitch.

Figure 17:
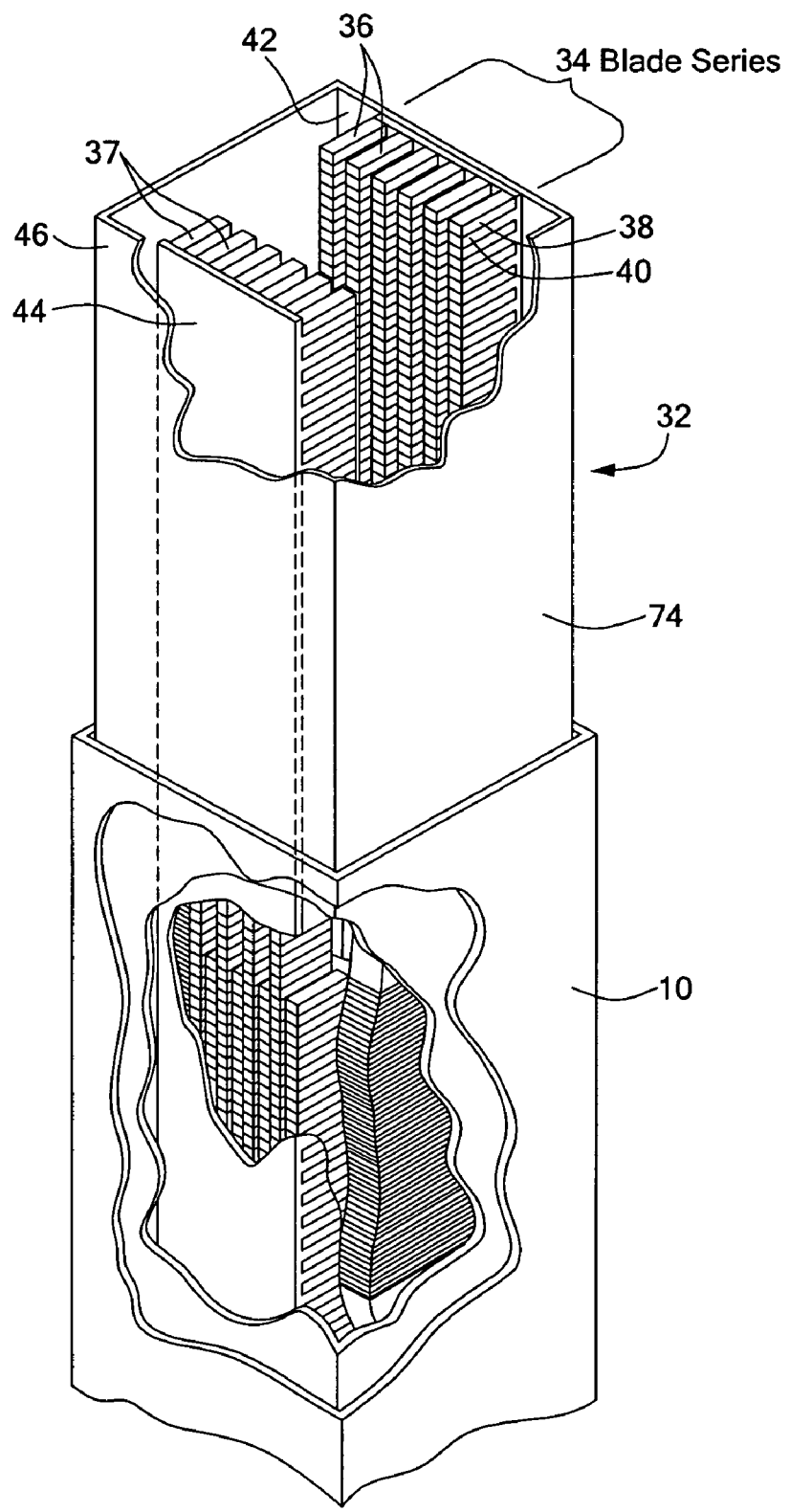
FIG. 17 is a schematic three-dimensional view showing the addition of a shuttle to the stator portion shown in FIG. 16.

Shuttle 32, FIG. 17 also includes a set 34 of spaced blades 36 each also extending lengthwise in the direction of the actuation axis 16 and interleaved with the blades 14, FIG. 16 of stator 10. Each blade 36, FIG. 17 of shuttle 32 also includes a plurality of alternating high permeability teeth 38 and low permeability teeth 40. As shown in this particular embodiment, blade set 34 extends inwardly from wall 42 of shuttle 32 interleaved with blades 14, FIG. 8 of stator 10. An opposing blade set 44, FIG. 17 of shuttle 32 has blades 37 extending inwardly from wall 46 of shuttle 32 interleaved with blades 15 of blade sets 20, 22, and 24, FIG. 16 of stator 10.

In accordance with this invention, the active component or the subsystem which drives the shuttle is associated with either the stator, the shuttle, or both. In embodiment of FIGS. 16-18, the active component is divided into three serially arranged phases A, B, and C as already discussed and is associated with stator 10, FIG. 16. Thus, phase A includes blade sets 12 and 20 and iron flux return plates 50 and 52 interconnected by core 54 forming an I-shaped flux-return structure. Phase A also includes coil 60 wound about core 54 between blade carrier plates 25 and 27 to produce flux through the sets of interleaved blades of the shuttle and the stator in a direction 62 substantially transverse to the direction 16 of the actuation axis. Flux return plates 50 and 52 are thus each adjacent an end of coil 60.

Phases B and C are constructed in a similar fashion each having their own coil, flux return plates, and blades except that, as noted above, the blades of phase B of stator 10 are offset ⅓ of a tooth pitch from the blades of phase A and the blades of phase C are offset by ⅓ of a tooth pitch from the blades of phase B. Structural spacers 70 support phases A and B to phase C, and phase C is supported by the structural I-bean column 55. At the base of this column, the structural housing 72 and the column 55 are attached. These components complete the primary components of stator 10 resulting in shuttle FIGS. 17 and 32 telescopingly received in stator 10.

Figures 18, 19:
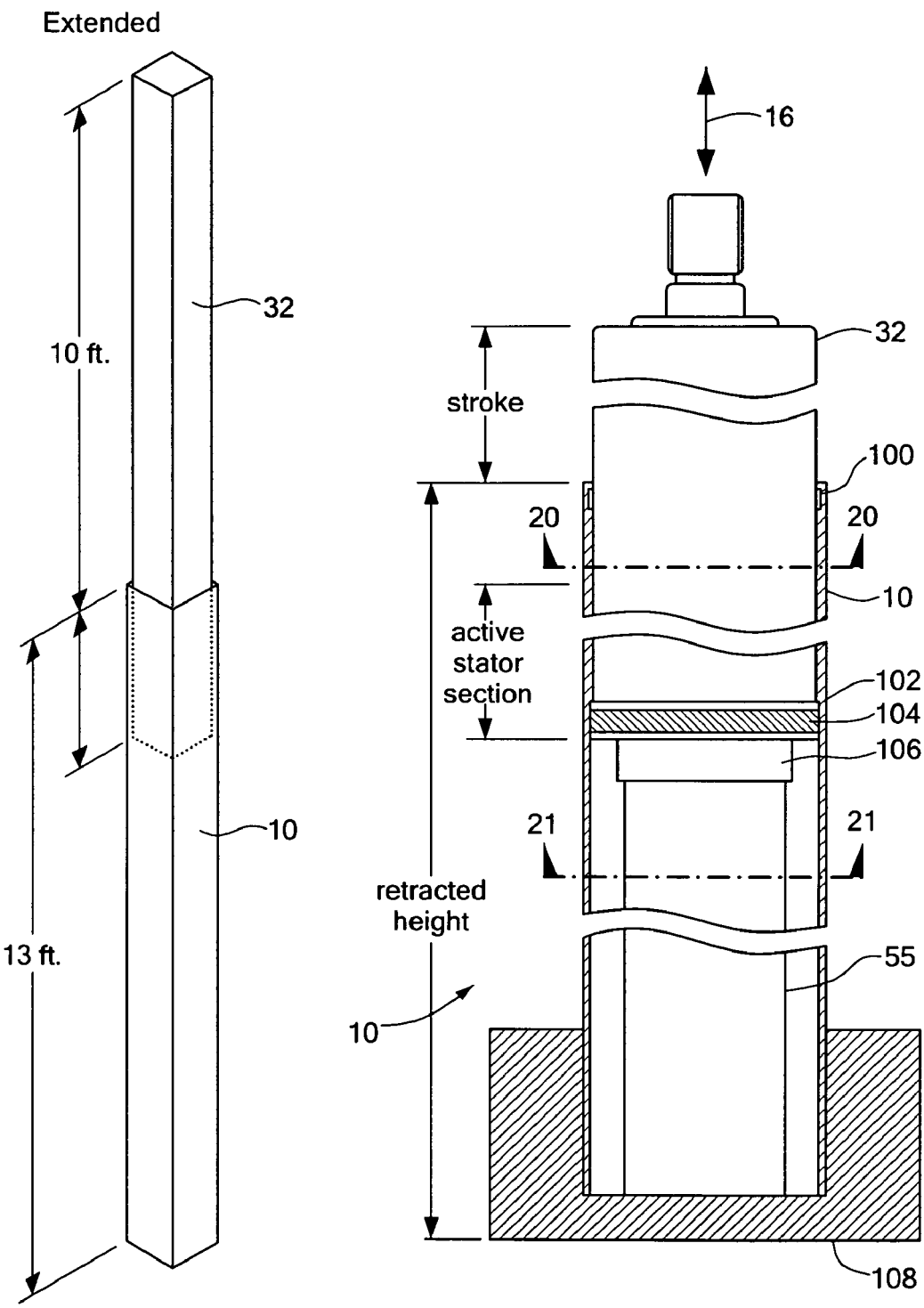
FIG. 18 is a schematic three-dimensional view also showing the combination of an exemplary stator and shuttle for a reluctance motor in accordance with the subject invention.
FIG. 19 is a schematic side view of another version of a linear reluctance motor in accordance with the subject invention.

FIGS. 19-22 show an example where the motor is cylindrical in shape but otherwise the same reference numerals are used to denote structures similar to the structures of FIGS. 16-18. As shown in FIG. 19, sliding bearings 100 and 104 allow shuttle 32 to telescopingly move up and down along actuation axis 16 within stator 10. Limit stop 102 prevents further travel of shuttle 32 and flange 106 supports the active stator section 10. I-beam stator support column 55 is secured in base 108. FIG. 19 also shows the retracted height of shuttle 32, the active stator section, and the stroke of shuttle 32.

Figure 20:
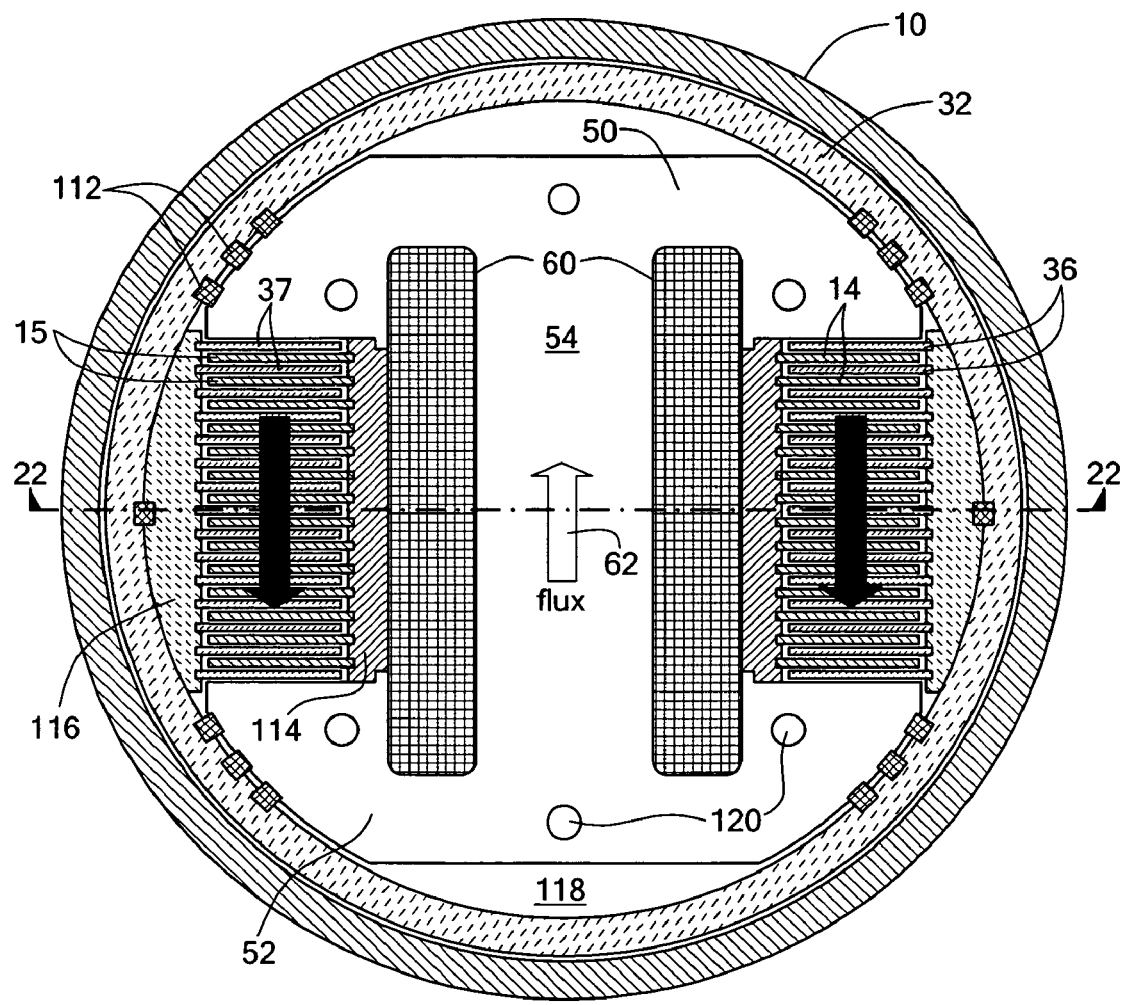
FIG. 20 is a sectional view taken along line 20-20 of FIG. 19.
Figure 21:
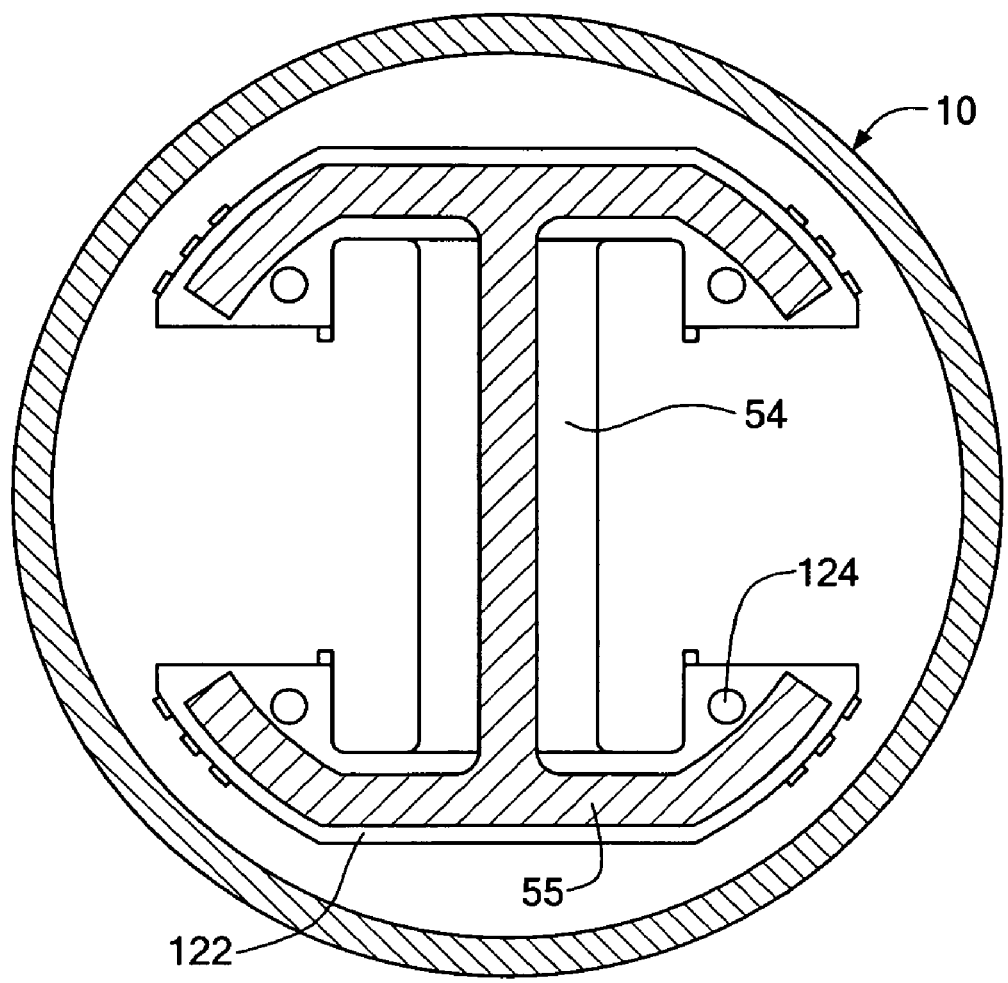
FIG. 21 is a sectional view taken along line 21-21 of FIG. 19.
Figure 22:
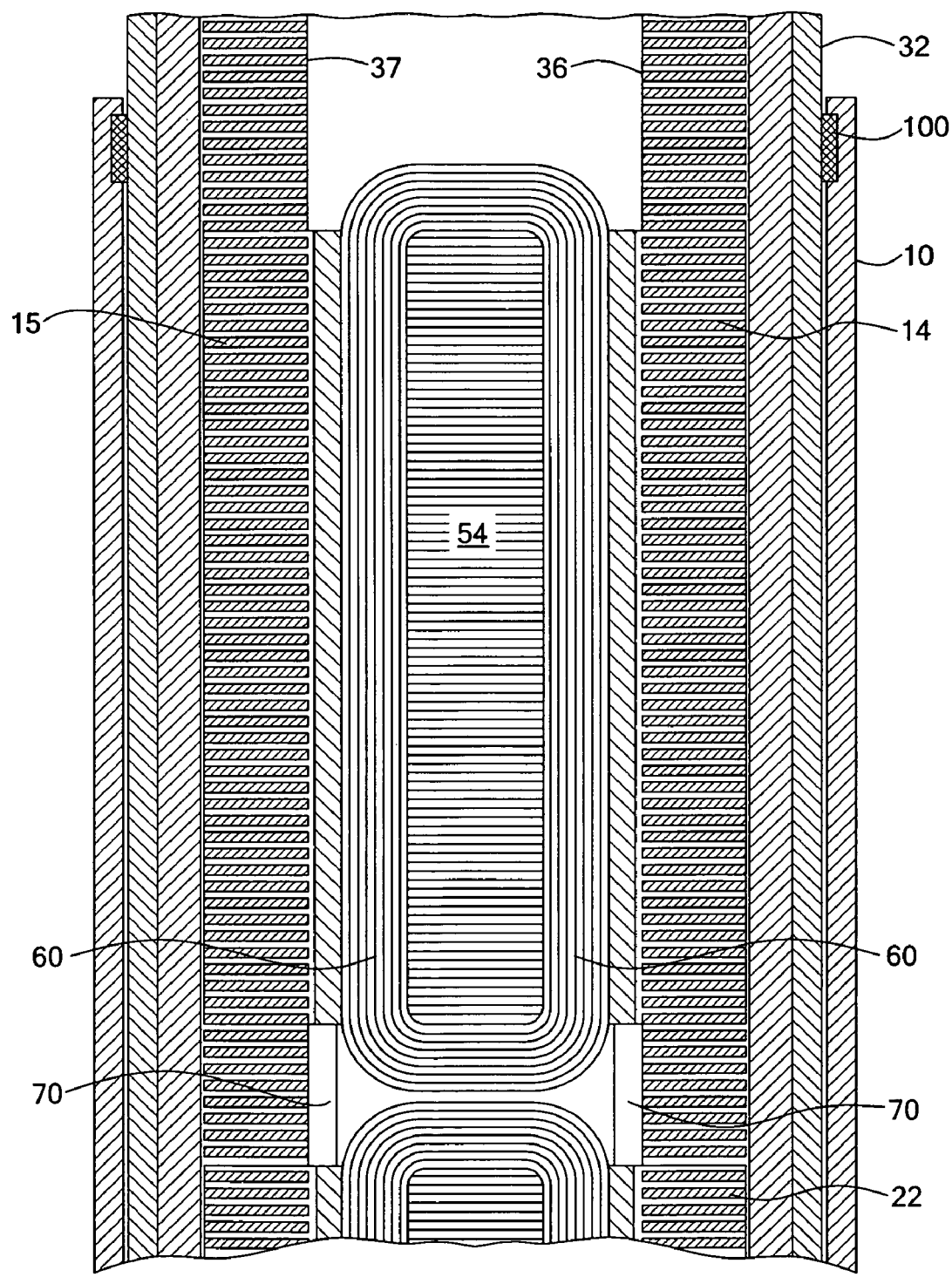
FIG. 22 is a cut away sectional side view taken along line 22-22 of FIG. 20.

FIG. 20 shows anti-rotation bearings 112, stator blade carrier 114, shuttle blade carrier 116, and open channel 118 which allows for fluid passage. Tie rods 120 hold the core together. FIG. 21 shows additional details of I-beam stator support column 55 including stator support flange 122 and threaded hole 124 for tie-rod 120, FIG. 20. FIG. 22 is a cut-away side view showing one complete phase A and a portion of phase B but otherwise the same numbering convention is used.

With respect to the embodiment shown so far, the blades of the shuttle run the full length of the shuttle tube and the blades of the stator are interleaved with those of the shuttle but over a relatively short section. The blades of the shuttle have a constant pitch the whole length of the shuttle but in the stator the three sets of blades are offset by ⅓ of a tooth pitch relative to each other. When one of the three phases is energized, flux is generated which goes through the stack and tends to bring the shuttle and the stator blades of that phase into alignment. On the stator side, the resulting force is transmitted through the stator blade carrier to the laminated core. The core is held together with the tie rods shown in FIG. 20 and/or an adhesive and is attached to structural I-bean 55, FIG. 21 which reacts the force back to the base 108, FIG. 19 of the stator. On the shuttle side, shuttle blade carrier 116 is used to connect the shuttle blades to shuttle tube 32. Typically, both blade carriers and the shuttle 32 and stator 10 tubes are made of non-magnetic material such as 300 series stainless steel, brass, aluminum, ceramic, or reinforced polymer material. To avoid an eddy-current loop, the stator blade carrier should be insulated with respect to the core laminations. The stator blade carrier 114 should also be stiffly and strongly affixed to the core. The preferred method is to bond stator blade carrier 114 to the core. For structural strength and stiffness, the gaps between the teeth may be potted with a non-conductive, non-magnetic filler material such as a ceramic-filled epoxy. The blades can also be laminated on each side with a thin layer of structural material.

One advantage of this geometry is that the wires leading to the three phases do not need to move. This avoids the need for sliding contacts (commutation) or extensible wires. Another advantage is that the relatively delicate blades are protected from damage.

Alternative geometries, however, are possible and within the scope of the subject invention. For example, the windings could be located on the shuttle, on the stator, or both. More than three phases could be used. The phases could be arranged axially as shown, side-by-side, or a combination of the two. The core could be "C" shaped and flux directed through only one blade-stack as opposed to two with the I-beam shaped core shown. The blades of the shuttle could be short compared to the stator, or the other way around. Or, the blades of the shuttle and the stator could be similar thus providing highest force in the retracted position and force decaying as the shuttle extends. Mechanically, the connection to the shuttle could be achieved using cables, pushrods, or a direct connection to a moving carriage. If the phase windings reside on the shuttle, power could be supplied locally by sliding contacts, or by an extensible conductor, for example, a coiled wire.

In the case of a long active stator and a relatively shorter shuttle, it may be desirable to arrange the phases axially in a repeating pattern (i.e., ABCABCABC . . . ). In a three-phase design, the shuttle should be at least four (number of phases plus one) long, so that it always overlaps at least three phases. Compared to a long-stator/active-short-shuttle machine, this one may require more copper and electrical steel, but avoids the problem of commutation.

In any design, the shear pressure generated on the surface of each shuttle blade is dependent on the relative alignment of the blade "teeth", the flux-density, the tooth geometry, and the magnetic characteristics of the blade steel.

Figure 23:
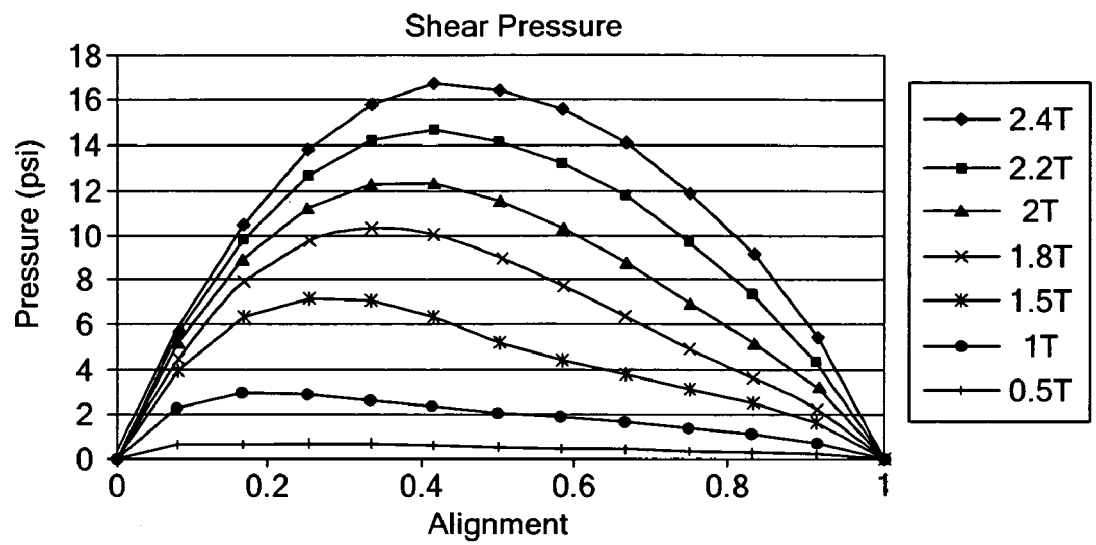
FIG. 23 is a graph showing the relationship between shear pressure and tooth alignment at various flux densities for a typical reluctance motor in accordance with the subject invention.

Assuming the use of M19 silicon/iron alloy, a blade thickness of 0.015", a tooth pitch of 0.036", a tooth width of 0.018", and an average air gap of 0.001", a finite element magnetic analysis predicts a shear pressure as a function of tooth alignment and flux density as shown in FIG. 23. The flux density shown in the legend in this case represent the equivalent flux density if all the flux were to go through the blade teeth. In other words, the average flux density through the stack is half the values given in the legend (in units Tesla). While this data is based on the tooth width being half of the tooth pitch, other ratios of width/pitch are also acceptable. Use of width/pitch ratio of 0.55 may be beneficial to increase blade stiffness and strength and to reduce wear. Use of a width/pitch ratio slightly less than 0.5 provides similar shear pressure but requires less flux, thus reducing the size of the flux-return for a given force rating.

Figure 24:
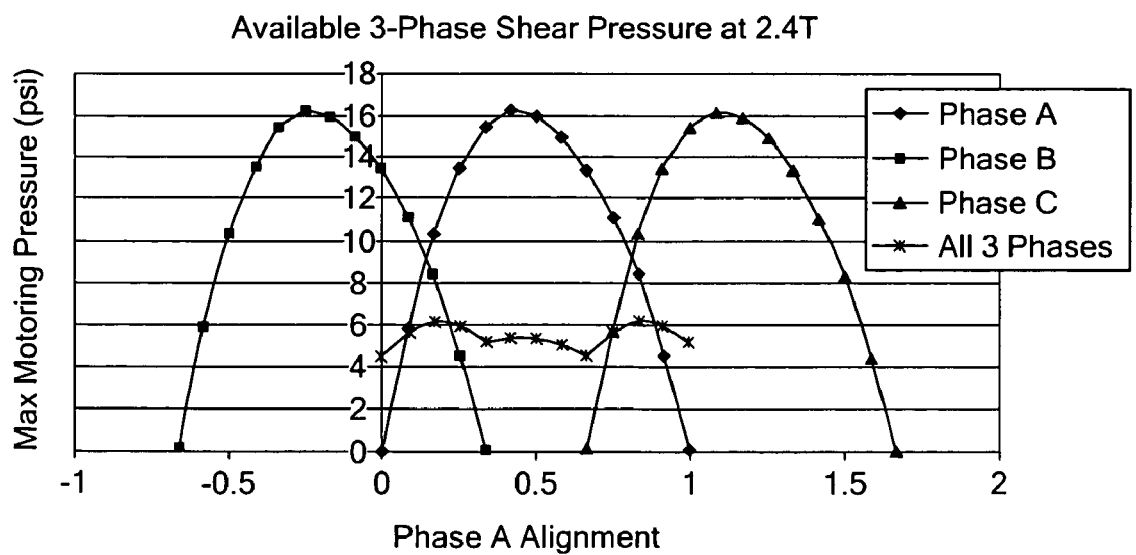
FIG. 24 is a graph showing the available three-phase shear pressure.

Each phase produces positive force over a fraction of the tooth alignment cycle. This is why a minimum of three phases is preferential in order to apply smooth force in either direction. While the curve of FIG. 23 peaks at almost 17 psi, the average pressure is only about 10 psi over the useful part of the range. But since the phase is off half the time, the average shear pressure for continuous movement is about 5 psi. Actually, the number of phases also comes into play as illustrated in FIG. 24. The lowest available shear pressure occurs when one phase is ⅔ aligned and the next phase is misaligned.

Figure 25:
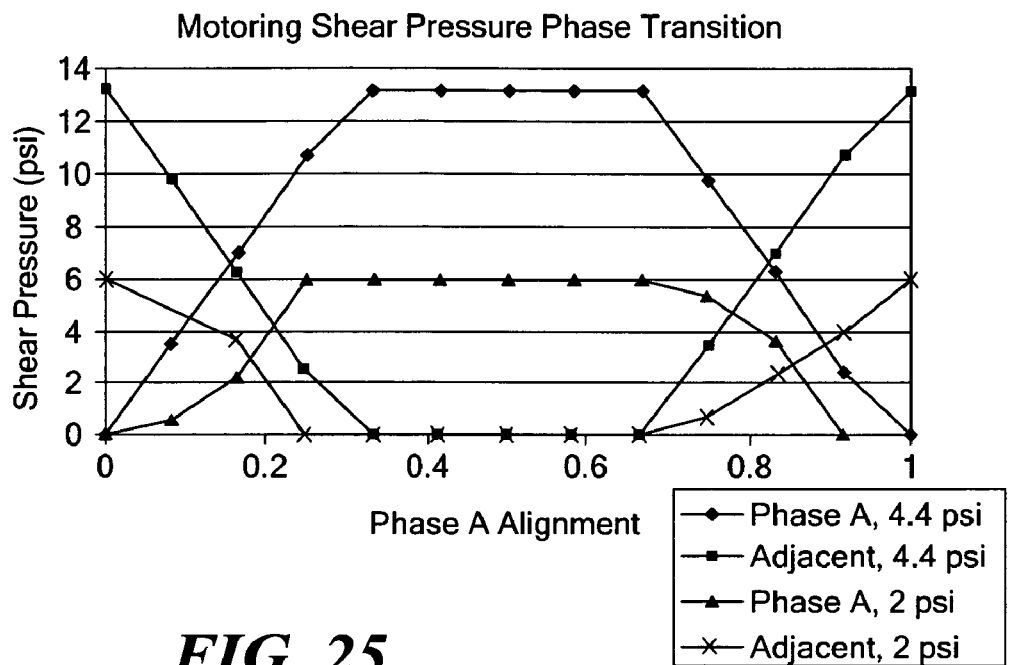
FIG. 25 is a graph showing the three-phase shear pressure transition for minimum resistive dissipation.
Figure 26:
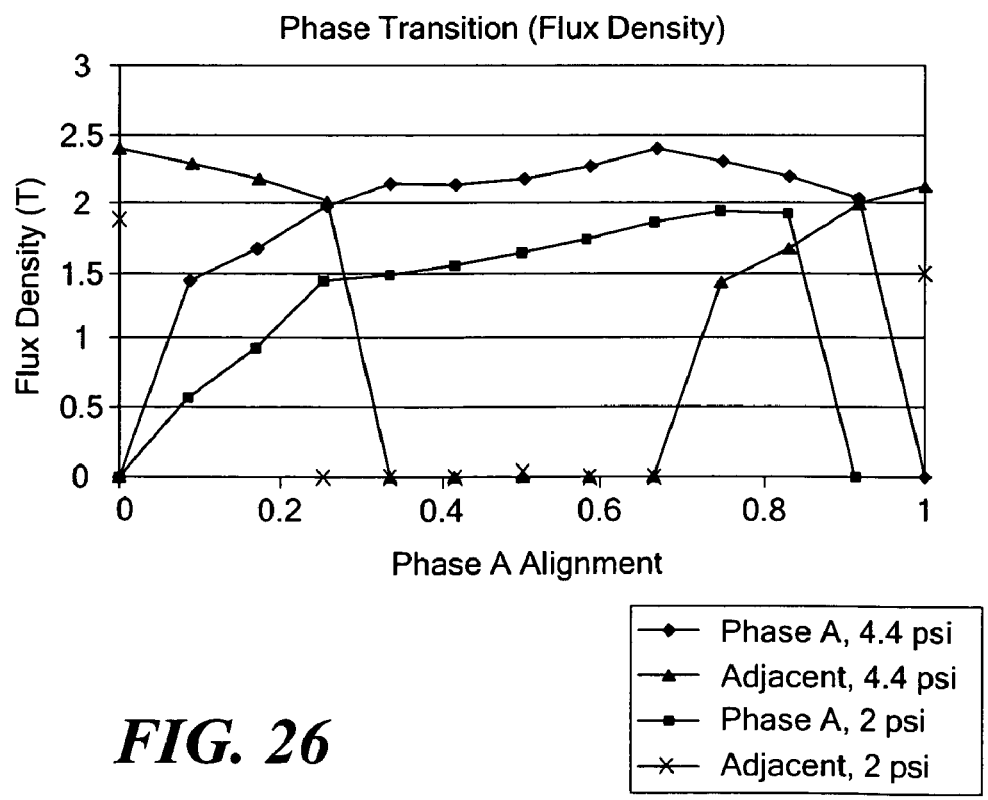
FIG. 26 is a graph showing the three-phase flux-density transition for minimum resistive dissipation.
Figure 27:
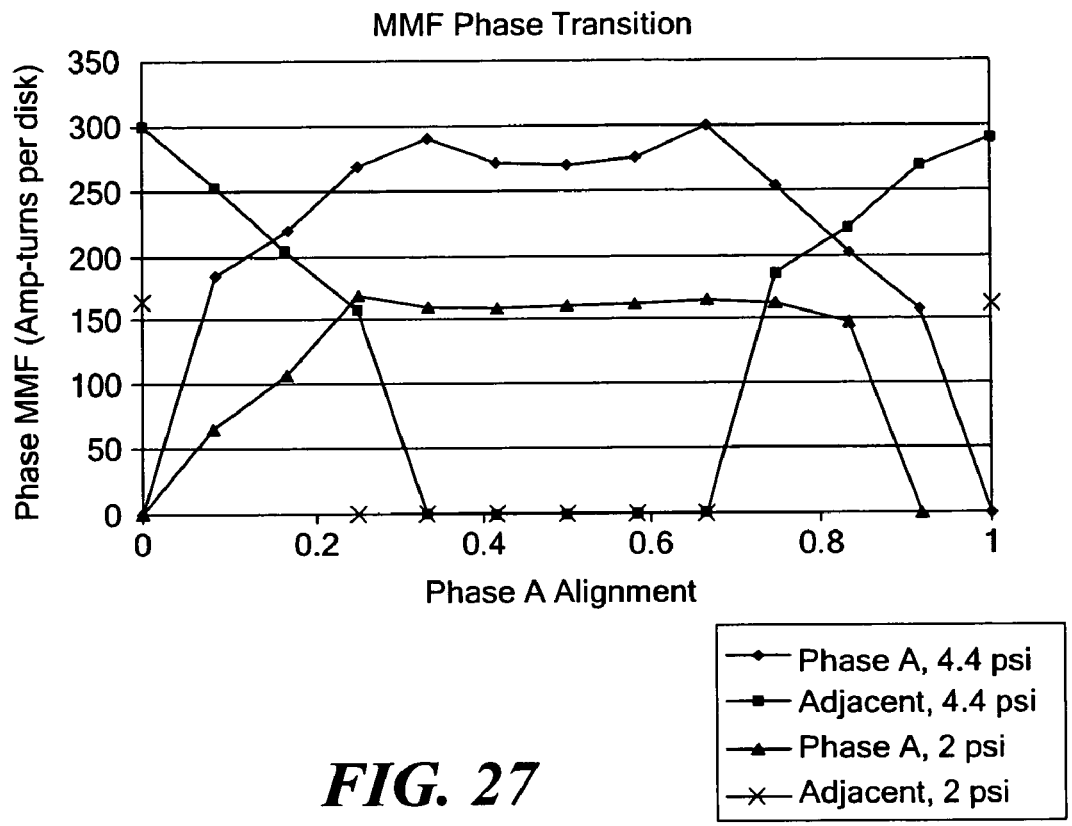
FIG. 27 is a graph showing the three-phase MMF transition for minimum resistive dissipation.

To produce a constant force, the current to each of the three phases should be modulated as a function of commanded force and shuttle position. FIGS. 25-27 show the preferred way to transition from one phase (phase A) to an adjacent phase (B or C), assuming a three-phase machine with the same tooth geometry as in the previous figures. Two sets of transition curves are shown, assuming a commanded shear pressure of 2 and 4.4 psi. The transition curves assume quasi-static operation and are optimized for minimum resistive losses.

From analytical and finite element magnetic analysis above of other tooth geometries (i.e., thickness, width, and pitch) and other electrical steel alloys, it appears that the maximum shear pressure scales with the square of the saturation flux density of the blade material and that to a first-order, the stall-force resistive power loss scales as follows:

$$\text{Power} \propto N^2 \cdot t^0 \cdot p^1 \cdot g^{1.6} \quad (1)$$

where N is the number of disks per stack, t is the disk thickness, p is the tooth pitch, and g is air-gap.

As shown in FIG. 20 in particular, interleaved shuttle blades 37 and stator blades 15 have almost no gap therebetween and during actuation the blades will touch and rub against each other. Since the rate of travel of shuttle 32 is relatively slow, however, wear is not a primary concern. Instead, by making the blades relatively thin, the blade density can be increased resulting in a large force density. The conventional wisdom is that each blade must be sufficiently thick and stiff to support itself and/or that the gaps between the blades must be large. The truth is that in a relatively slow moving motor the blades can actually touch and rub against each other. And, the added benefit of reducing the extent of the gaps between the blades is reduce losses and less coil current is required to generate the necessary flux. Thus, in one example of the subject invention, the blades are relatively thin 0.020" (e.g., 0.020") and the gaps between adjacent blades extremely small 0.002" (e.g., 0.002") or smaller such that the blade density is substantially increased resulting in a larger or force density and reduced losses and coil current required to generate the necessary flux. Use of very small air gaps also reduces the lateral magnetic pressure tending to attract the faces of the blades together. If a blade is exactly centered between adjacent blades, the attractive forces cancel. Due to magnetic instability, however, a blade will be drawn to one side or the other, but, by minimizing the air gap the net lateral force is minimized, thus reducing friction and wear.

Figure 28:
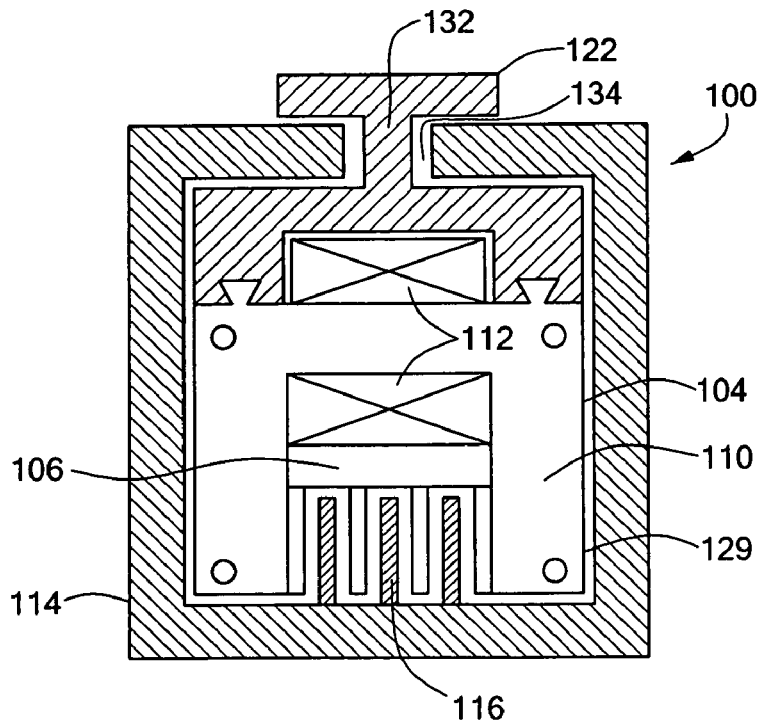
FIG. 28 is a schematic cross-sectional view showing another linear reluctance motor in accordance with the subject invention wherein the shuttle includes the active component and has three phases arranged in series along the actuation axis.
Figure 29:
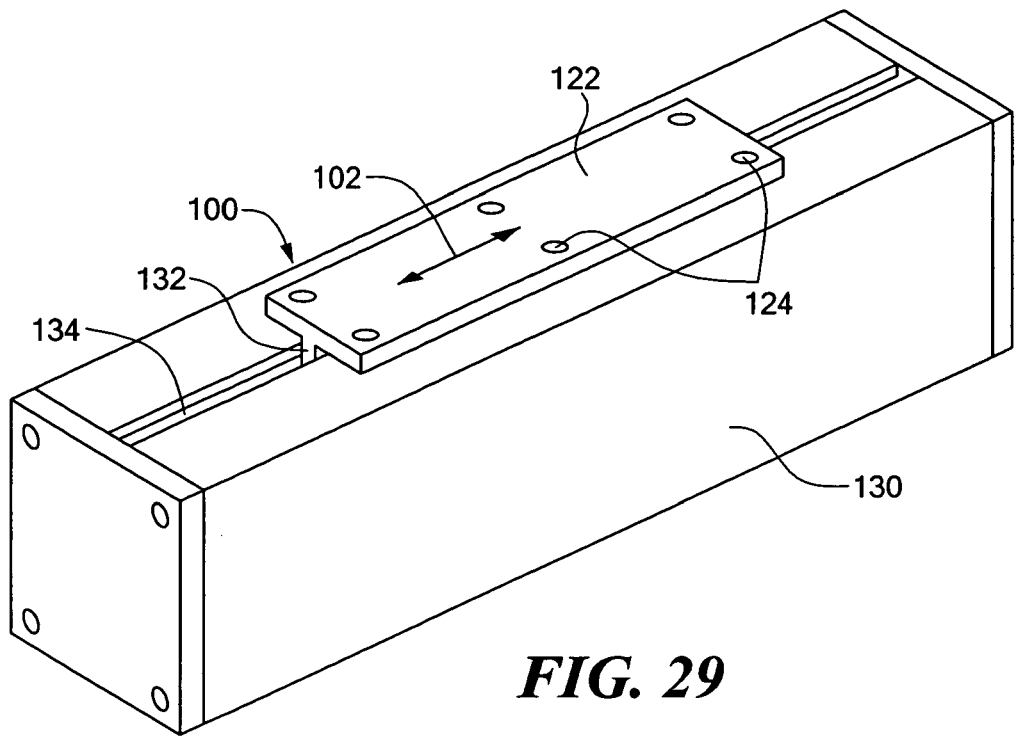
FIG. 29 is a schematic three-dimensional view of the linear reluctance motor shown in FIG. 28.
Figure 30:
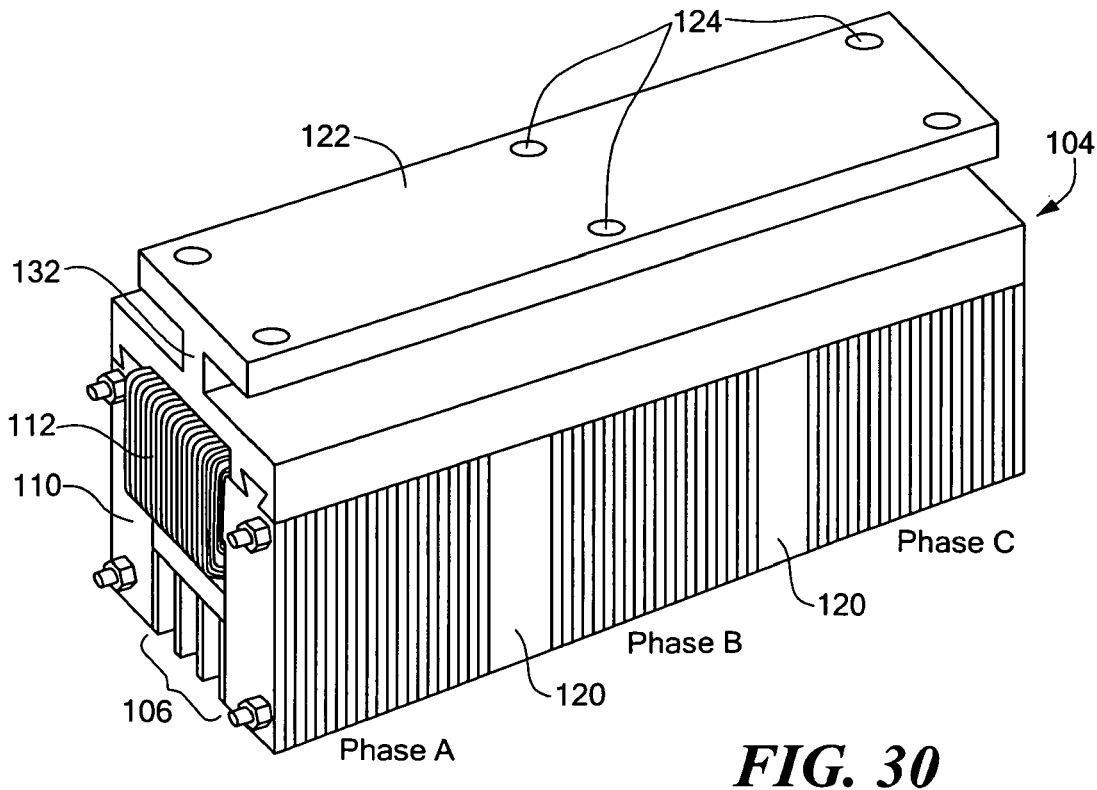
FIG. 30 is a schematic three-dimensional view showing the shuttle portion of the linear reluctance motor depicted in FIG. 28.

FIGS. 28-30 show another linear reluctance motor 100 in accordance with this invention having an actuation axis 102. Here, shuttle 104 includes three serially aligned phases A, B, and C, FIG. 30, and, associated with each phase a blade set 106, a flux return portion 110, and a coil 112 wound to produce flux through the sets of interleaved blades of the stator and shuttle in a direction substantially transverse to the actuation axis. Stator 114, FIG. 28 includes blade set 116 extending into the channel of stator housing 130 and interleaved with the blade set of shuttle 104. Structural spacers 120, FIG. 30 (preferably non-magnetic) separate the phases of shuttle 104. The result is a long passive stator and in comparison a relatively short active shuttle providing a long stroke, low weight, and low power consumption. Whatever is to be driven by shuttle 104 is attached to driving element 122 by mounting features 124. Driving element 122, external to stator housing 130, is connected to flux return portions 110 of shuttle 104 within the C-shaped channel 129 of stator housing 130, FIG. 29 by fin 132 which is received in longitudinal slot 134 of stator housing 130.

Here, the length of the active shuttle is La, the length of the passive stator is Lp, the passive stator is longer than the active shuttle, the available motor force is substantially constant over the stroke length Lp-La, and therefore, this configuration provides for a long stroke, low weight and low power consumption.

Figure 31:
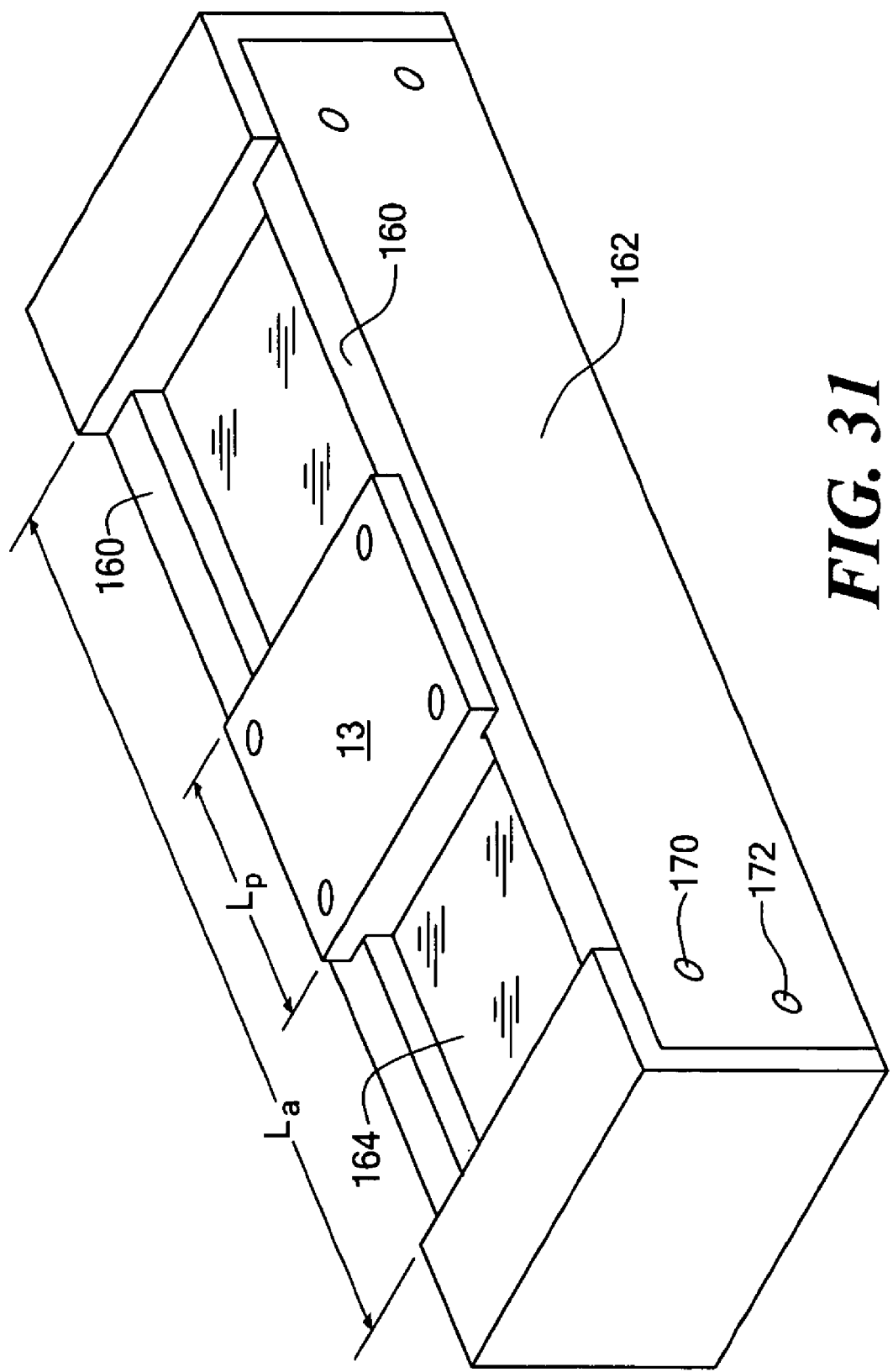
FIG. 31 is a schematic three-dimensional view of another linear reluctance motor in accordance with the subject invention wherein the stator includes the active component and the three phases are arranged laterally.
Figure 32:
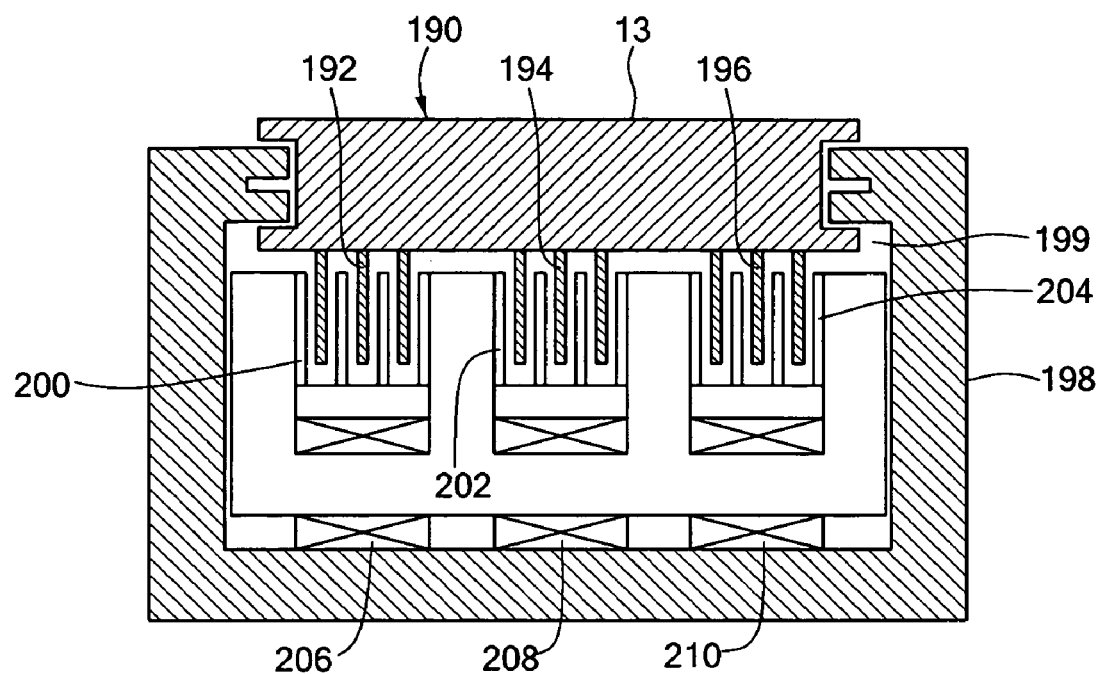
FIG. 32 is a schematic cross-sectional view of the linear reluctance motor shown in FIG. 31.
Figure 33:
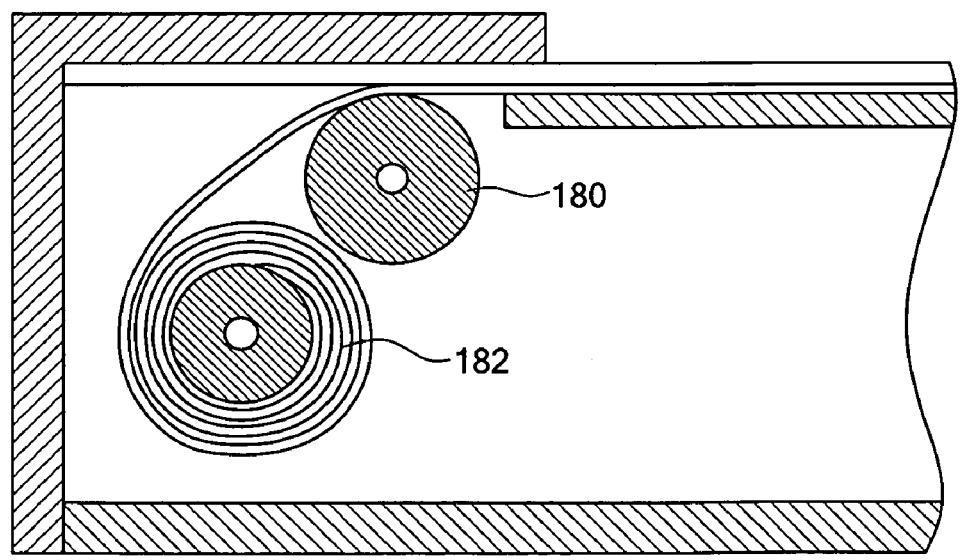
FIG. 33 is a side cross-sectional view of the linear reluctance motor shown in FIG. 31.
Figure 34:
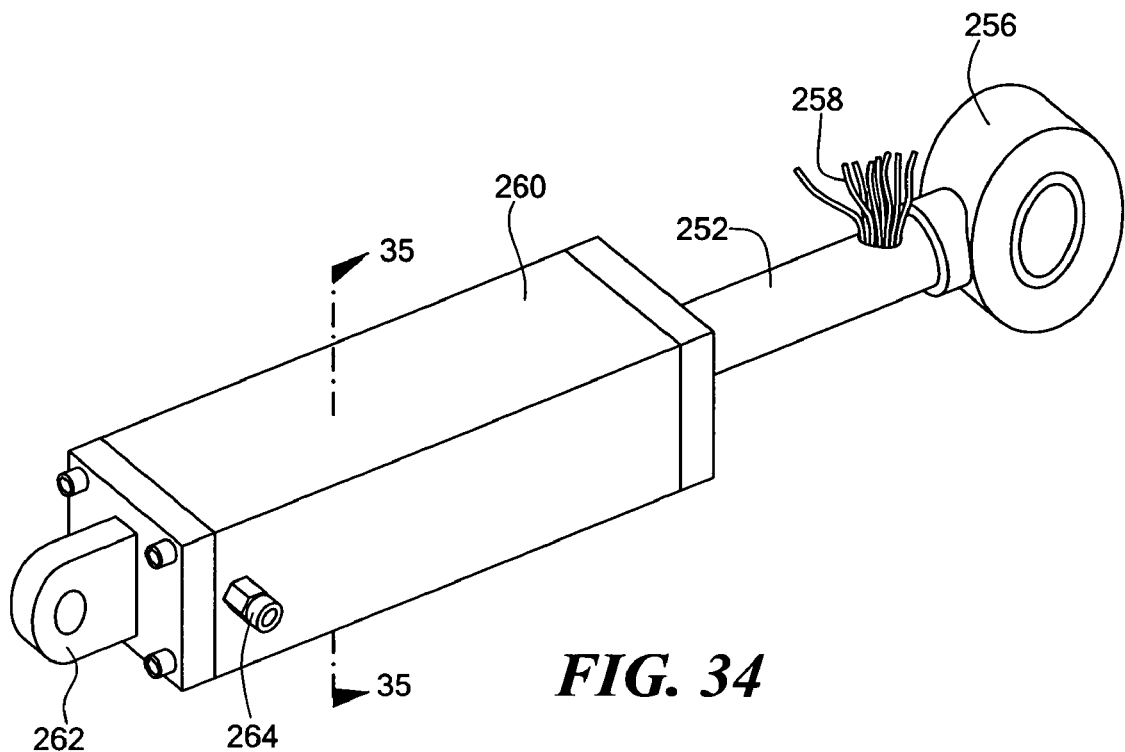
FIG. 34 is a schematic three-dimensional view of another linear reluctance motor in accordance with the subject invention wherein the shuttle includes the active component and the phases thereof are arranged both axially and laterally.
Figure 35:
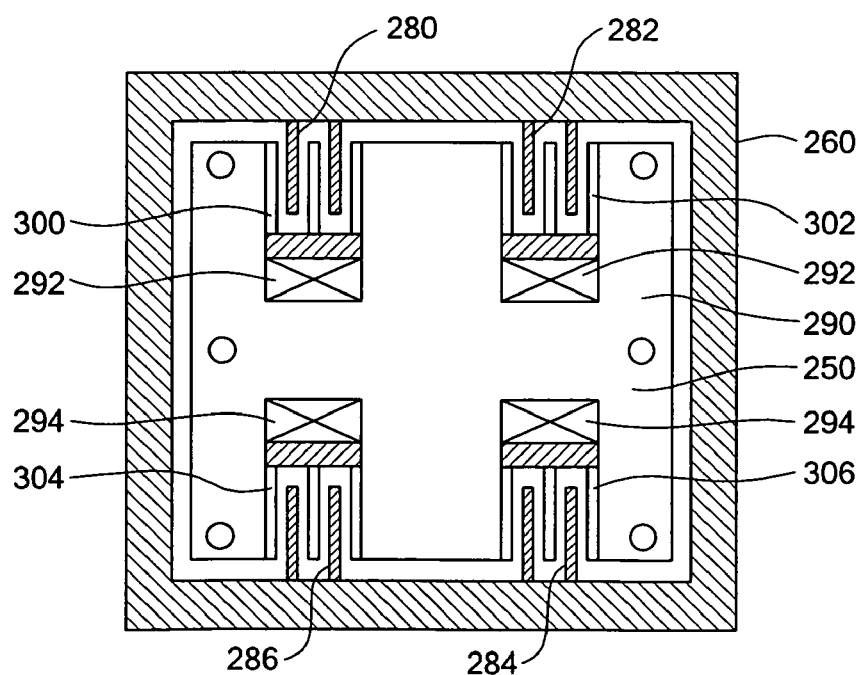
FIG. 35 is a schematic cross-sectional view of the linear reluctance motor shown in FIG. 34.

In FIG. 31, passive shuttle blade carrier 13 slides on rails 160 of active stator housing 162 and is fixed to sliding shutter 164 which moves with shuttle blade carrier 13 to protect the internal components of the stator and shuttle assembly including the coils and the interleaved blades in a working environment. The design of FIG. 31 results in a short passive shuttle and a long active stator. Thus, the shuttle is relatively short and the stator is relatively long, the shuttle is mounted inside a C-shaped channel defined by stator 162, the short shuttle has mounting features accessible from the open side of the channel, and the channel is sealed using two extensible covers, each attached on one end to carrier 13, and the other to an end of the C-shaped channel. Axle 170 is for idler roller 180, FIG. 33 and axle 172, FIG. 31 is for rolled up shutter material as shown at 182, FIG. 33. FIG. 32 shows passive shuttle 190 with three sets 192, 194, and 196 of blades arranged laterally with respect to the actuation axis extending into channel 199 from carrier 13 and active stator 198 with three sets of blades 200, 202, and 204 also arranged laterally and coils 206, 208, and 210 associated with each phase. Thus, stator housing 198 defines channel 199 for receiving shuttle 190 therein and the blade sets 200, 202, and 204 of the stator are adjacent each other across the channel 199. The blade sets 192, 194, and 196 of the shuttle are also adjacent each other and across the channel. In this design, the phases of either the stator or the shuttle or both could be offset to effect a phase shift of P/N between each phase.

Figure 36:
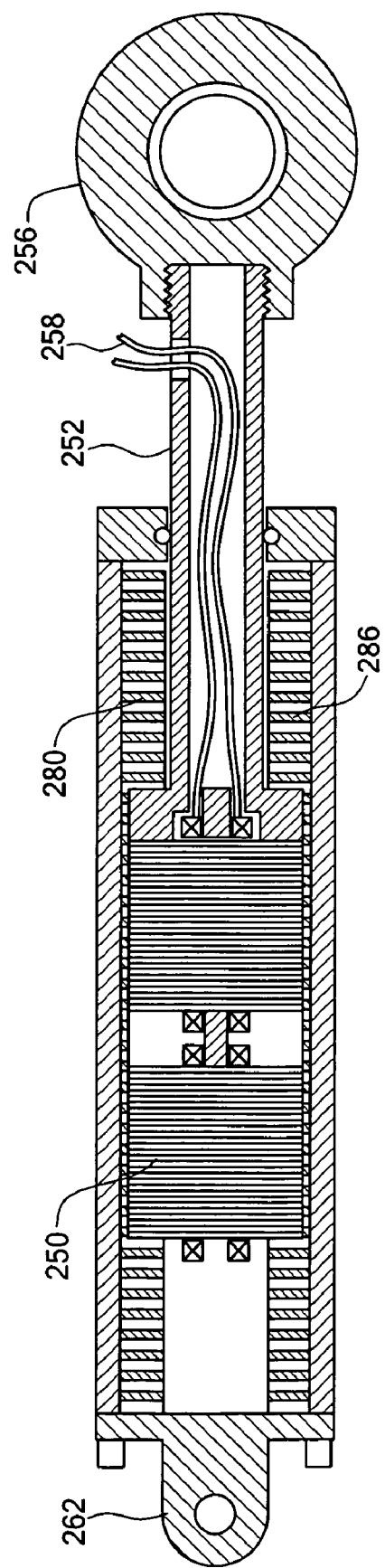
FIG. 36 is a side cross-sectional view of the linear reluctance motor shown in FIG. 34.
Figure 37:
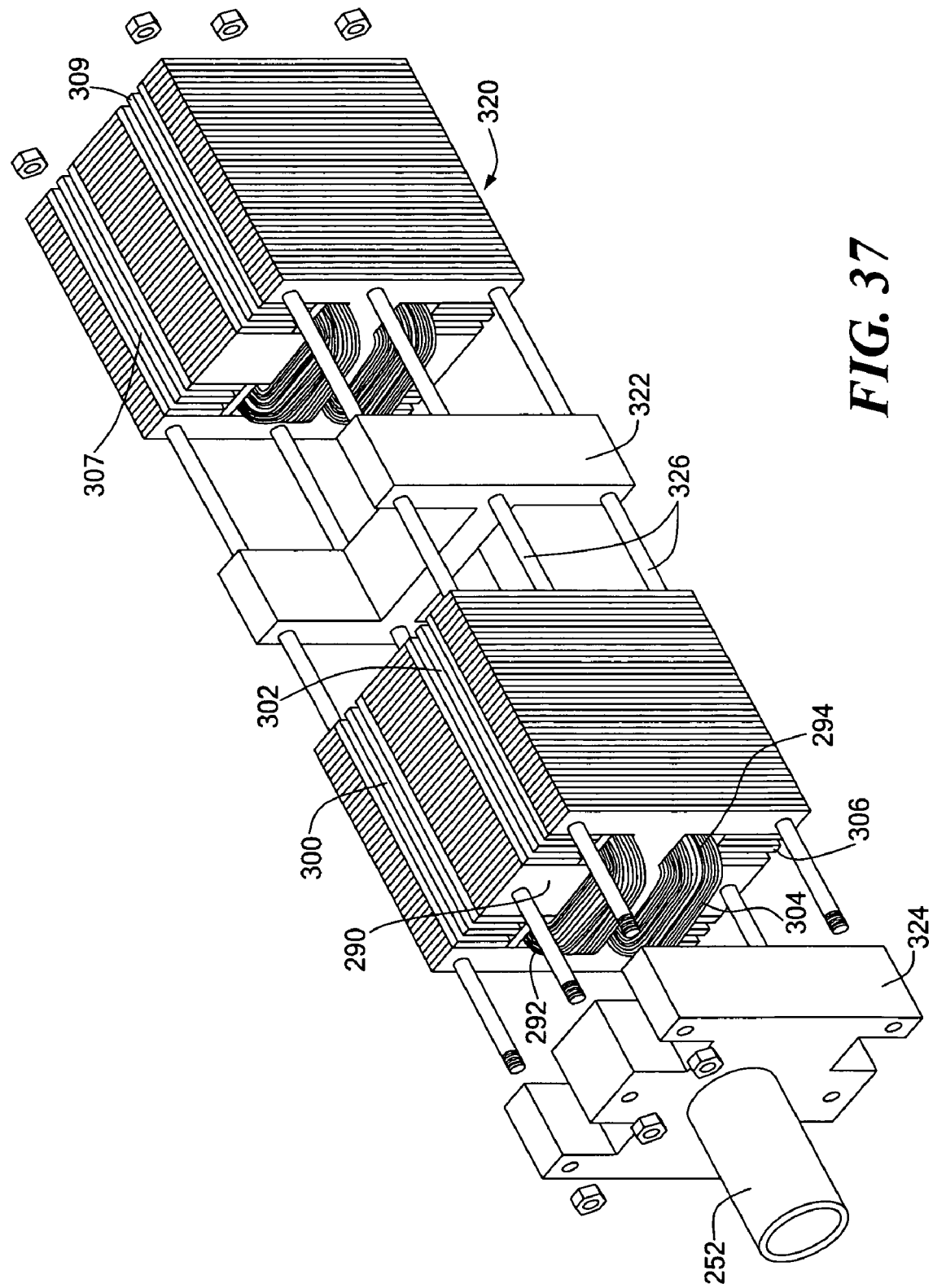
FIG. 37 is a schematic three-dimensional view showing the shuttle of the linear reluctance motor of FIG. 34.

In the construction of FIGS. 34-37, the phases are distributed both axially and laterally. Shuttle 250, FIG. 36 is active and includes push rod 252 terminating in mounting feature 256 and enclosing coil wires 258. Stator 260 includes the housing as shown with mounting feature 262 and vent hole 264 which can be pressurized or depressurized for pressure equalization with a pressure fitting serving as vacuum compensation means or could be attached to a filter to allow venting to the atmosphere but rejecting corrosive fluids, dust, and the like. The blade sets 280, 282 are associated with phase A, and blade sets 284 and 286 are associated with phase B, and thus phases A and B are arranged laterally. Phases C and D are also lateral to each other but are axially disposed with respect to phases A and B. The phases of stator 260 are thus arranged to provide phases distributed both axially and laterally combined with the flux return portion 290 of shuttle 250 and coils 292 and 294 of the shuttle and shuttle teeth sets 300, 302, 304, and 306. A more complete view of the shuttle is shown in FIG. 37 where coil 292 and shuttle blade sets 300 and 302 define phase A, coil 294 and shuttle blade sets 304 and 306 define phase B and a similar arrangement as shown at 320 define phases C and D. Structural non-magnetic spacer element 322 separates the phase A and B coils from the phase C and D coils as shown and in combination with push rod spacer 324 and tie rods 326 form the structure of the active shuttle. Stator 260 thus includes one pair of adjacent blade sets 280 and 282 opposing another pair of adjacent blade sets 286 and 284. Shuttle 250, in turn, includes first pair of adjacent blade sets 300 and 302 opposing a second pair of adjacent blade sets 304 and 306 defining phases A and B and, as shown at 320, a third pair of adjacent blade sets 307 and 309 opposing a fourth pair of adjacent blade sets defining phases C and D.

Figure 38:
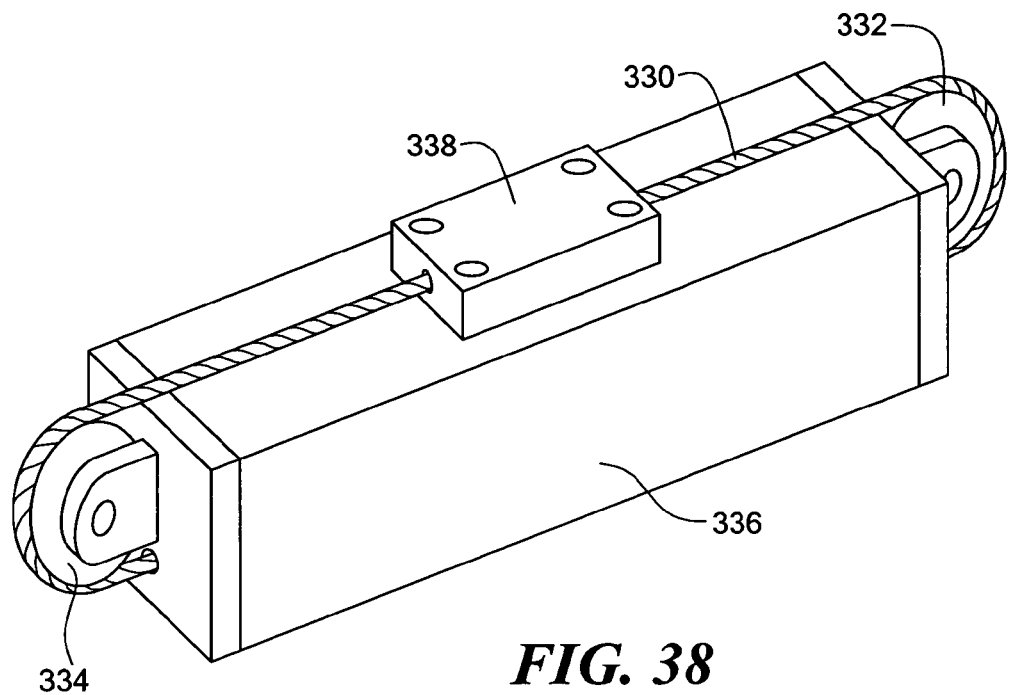
FIG. 38 is a schematic three-dimensional view showing another embodiment of a linear reluctance motor in accordance with the subject invention.
Figure 39:
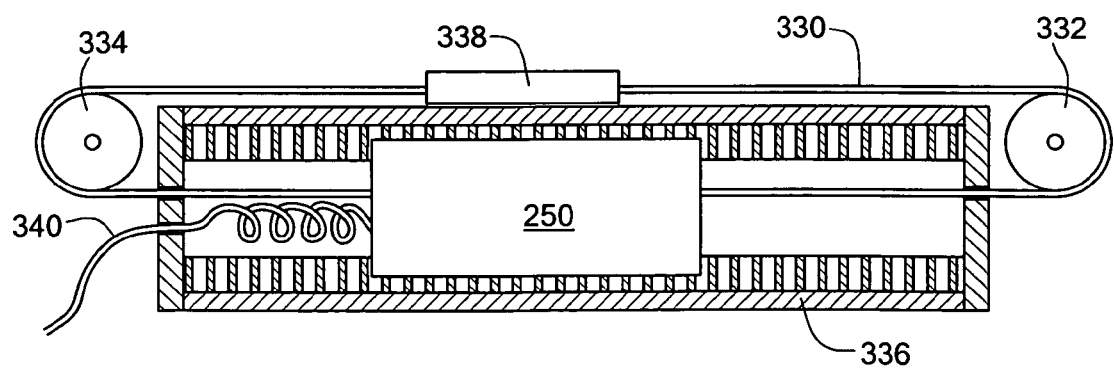
FIG. 39 is a side schematic cross sectional view of the linear reluctance motor shown in FIG. 38.

FIG. 38 shows how a tension element such as cable 330 and pulleys 332 and 334 can be arranged on stator housing 336 and connected to cable terminator 338 which is the component to which a linearly driven subsystem is connected to in another embodiment where the shuttle 250, FIG. 39 is active as described above. In this embodiment flex cable 340 would be connected to active shuttle 250 in order to power the coils thereof. Helical wires, lazy tong linkages, or axial conductive bars and sliding contacts could also be used.

Figure 40:
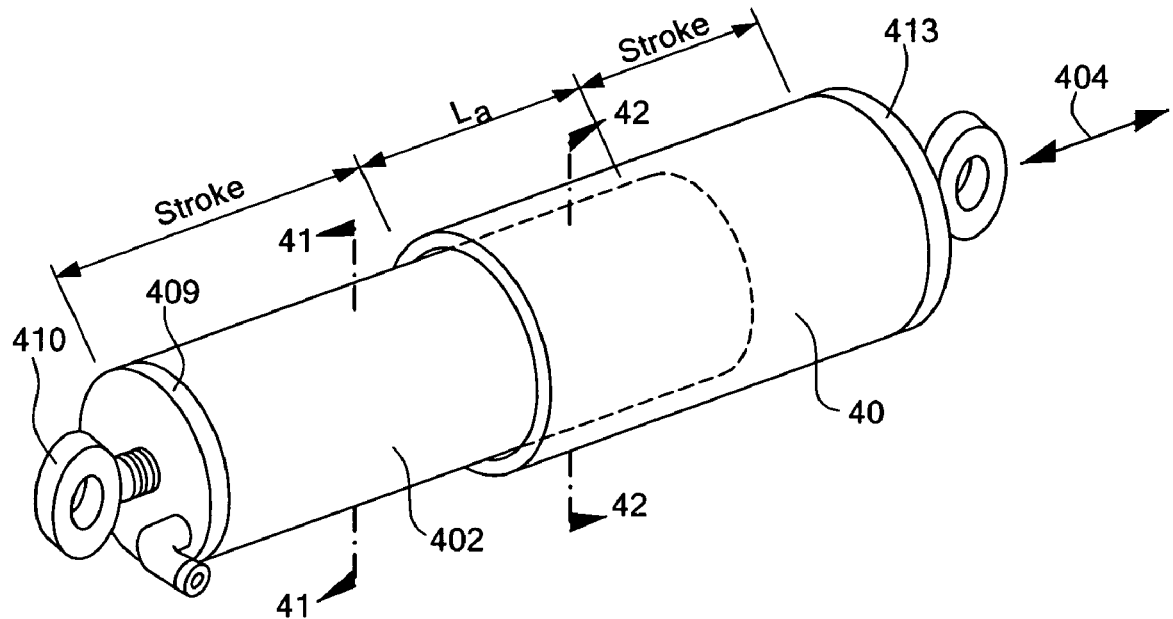
FIG. 40 is a schematic three-dimensional view of still another linear reluctance motor in accordance with the subject invention.
Figure 42:
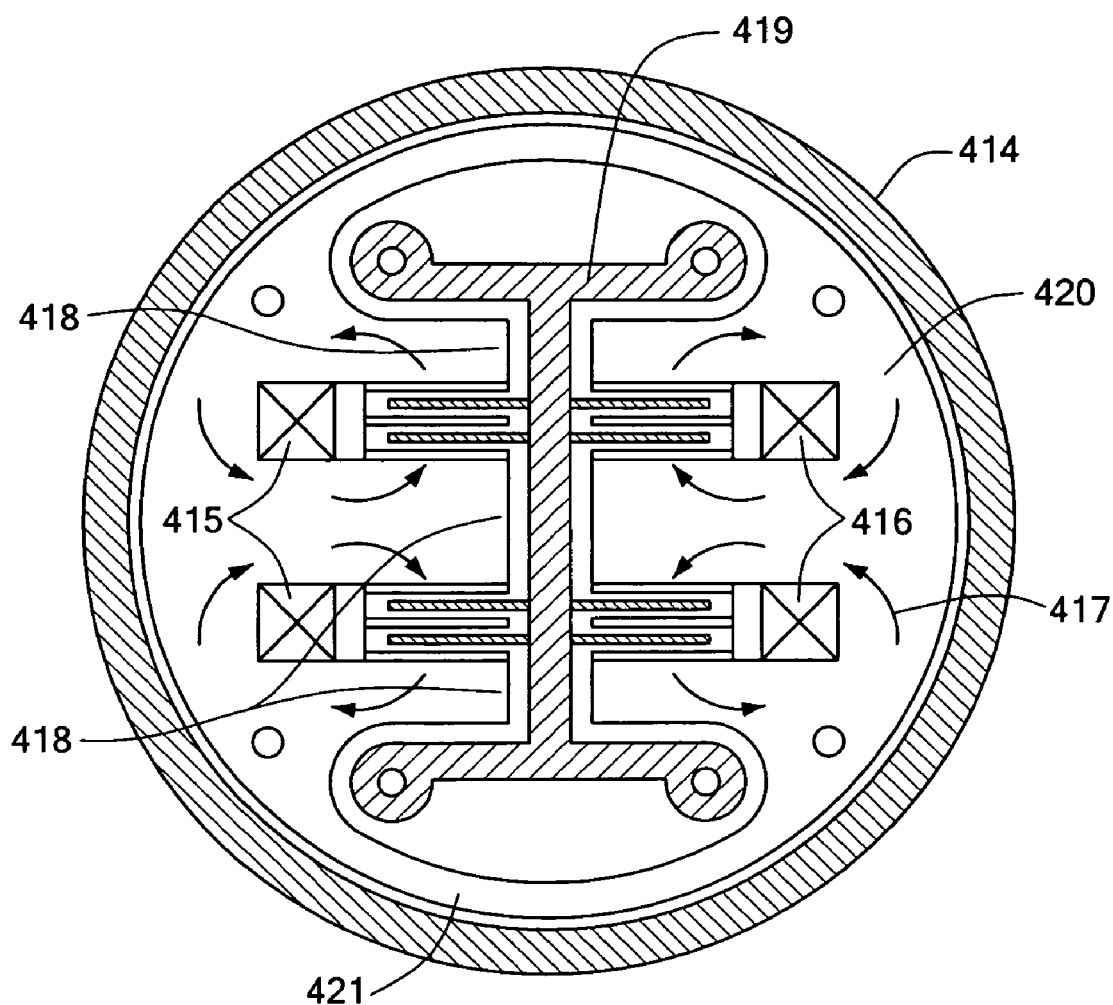
FIG. 42 is a schematic cross-sectional view of the stator portion of the linear reluctance motor shown in FIG. 40.
Figure 43:
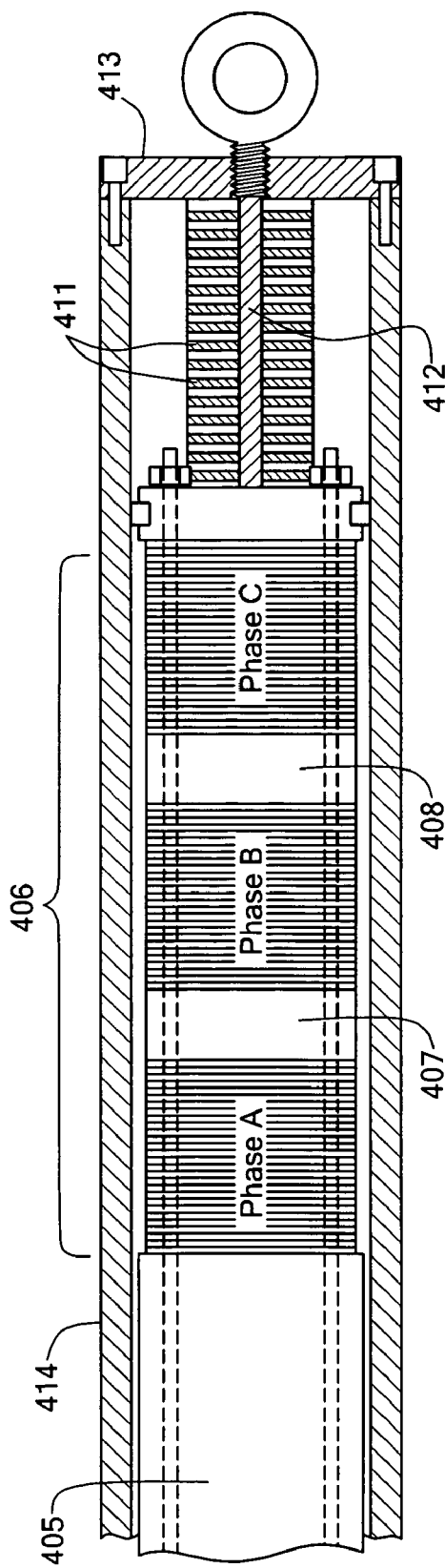
FIG. 43 is a schematic cut-away view of the linear reluctance motor shown in FIG. 40.
Figure 44:
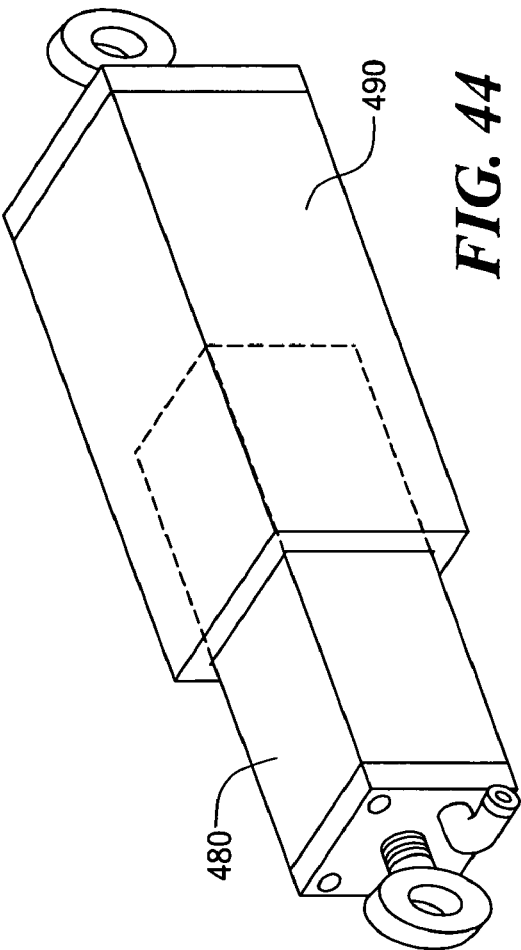
FIG. 44 is a schematic three-dimensional view of a version of a linear reluctance motor in accordance with the subject invention similar to FIGS. 16-18.
Figure 45:
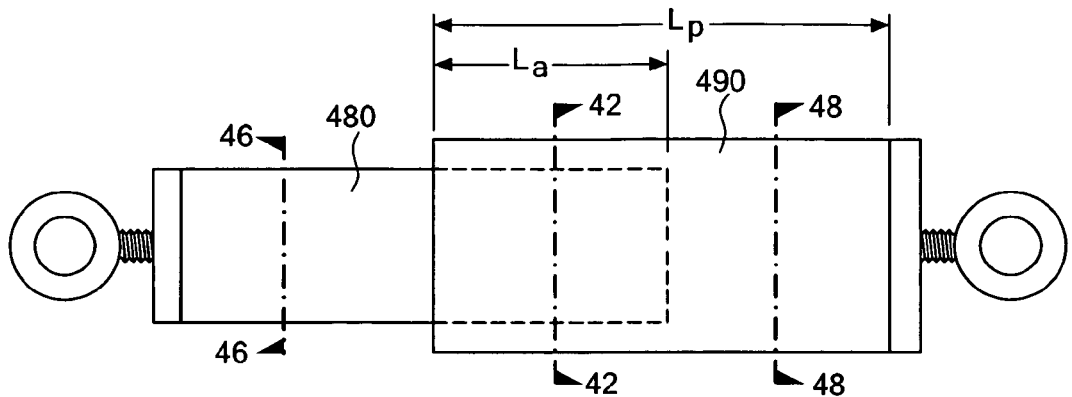
FIG. 45 is a side view of the linear reluctance motor shown in FIG. 44.
Figure 46:
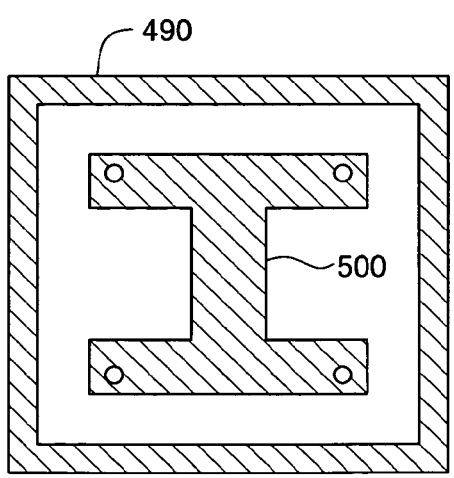
FIG. 46 is a schematic cross-sectional view taken along line 46-46 of FIG. 45.
Figure 47:
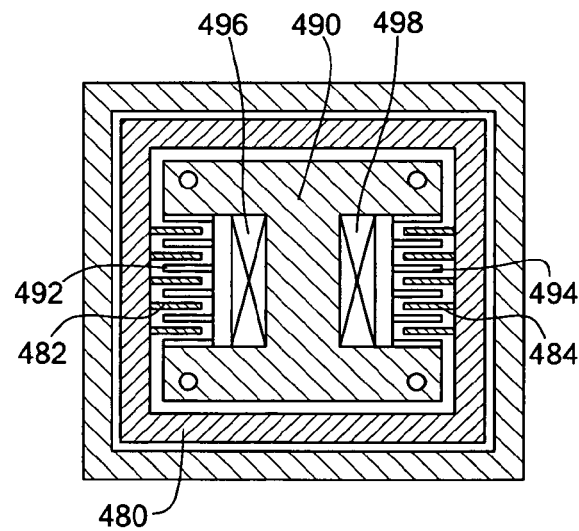
FIG. 47 is a schematic cross-sectional view taken along line 47-47 of FIG. 45.
Figure 48:
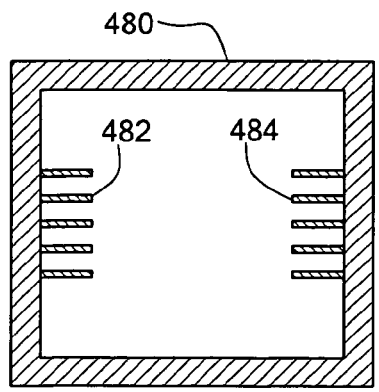
FIG. 48 is a schematic cross-sectional view taken along line 48-48 of FIG. 45.

FIGS. 40, 42 and 43 shown passive shuttle 400 and active stator 402 both of which move in the direction of actuation axis 404.

The result is a linear motor having a long passive shuttle and a short active stator. FIG. 40 shows the shuttle 400, the stator 402, and the direction of motion 404.

FIG. 43 shows how the three phases are arranged serially along the axis 404, separated by structural spacers 407 and 408. Stator tube 405 connects the active part 406 of the stator to the stator end cap 409, FIG. 40. and mounting feature 410. FIG. 43 also shows the passive shuttle blades 411 which run the full length of the shuttle. These blades are stiffened by a structural, non-magnetic I-beam 412 which is attached to the shuttle end cap 413, which, in turn, connects to the tubular shuttle housing 414.

Figure 41:
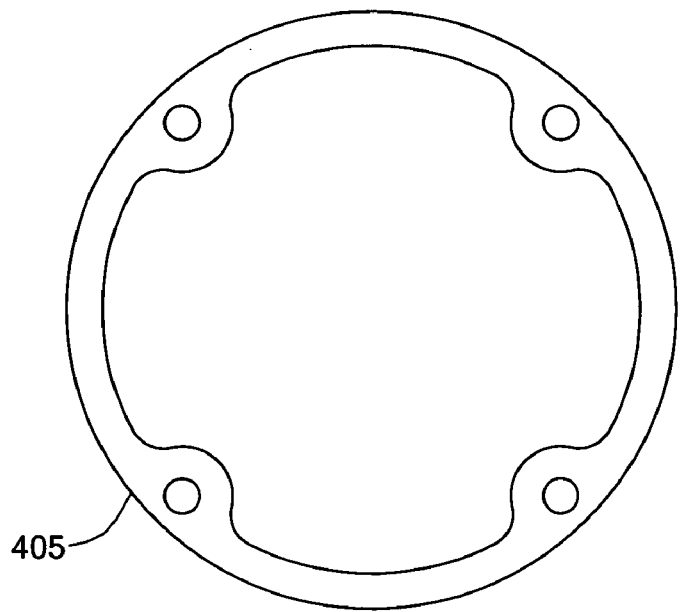
FIG. 41 is a sectional view of the structural tube supporting the active component of the motor of FIG. 40.

FIG. 41 shows a cross-section of stator tube 405. This is cross-section along line 41-41 of FIG. 40. FIG. 42 shows cross-section along line 42-42 of FIG. 40, through the active part of the stator. Unlike the previous embodiments, this one uses two coils (415 and 416) per phase, and the coils are external to the blade-sets. This arrangement directs the flux as shown by the flux arrows (417). The poles 418 of the flux return face inward, thus minimizing the magnetic field outside the motor. This is desirable since it minimizes electromagnetic interference and the detectability (e.g. by a magnetic sensitive explosive mine). By energizing coils 415 and 416 with the right polarity, no flux crosses the web 419 of I-beam 416, thus contributing to maximum force-density of the motor.

The flux return 420 is preferably made from laminated ferromagnetic material. As shown in FIG. 42, the outside of the flux return makes a complete circle. This is structurally advantageous, but not magnetically necessary since the annular web 421 of the flux return carries no useful flux. An alternate design would be for the flux return to be anchored to the inner surface of an additional structural tube attached to the stator tube 405, or, tube 405 could extend the full length of the stator and the flux-returns of phases A, B, and C could attach to the inner diameter.

FIGS. 44-48 show passive shuttle 480 with opposing inwardly facing blade sets 482 and 484 and active stator 490 with opposing outwardly facing blade sets 492 and 494 and coil 496 and 498. Structural I-beam 500, FIG. 46 supports the active part of the stator similar to the embodiment of FIGS. 16-18.

Figure 49:
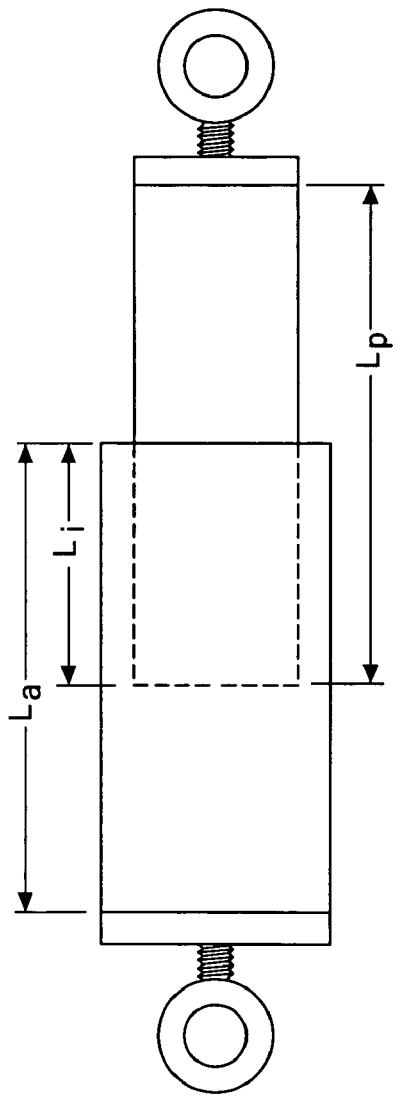
FIG. 49 is a schematic side view of another version of a linear reluctance motor in accordance with the subject invention.

FIG. 49 shows a linear motor having an active part of length La, a passive part of length Lp, and an interleaved or overlapping section of length Li. Unlike the previous embodiments, the length Li changes as the shuttle extends, and consequently, the force capability is not constant. This embodiment is advantageous when maximum force is needed in the retracted position and less force as the shuttle extends.

Figure 50:
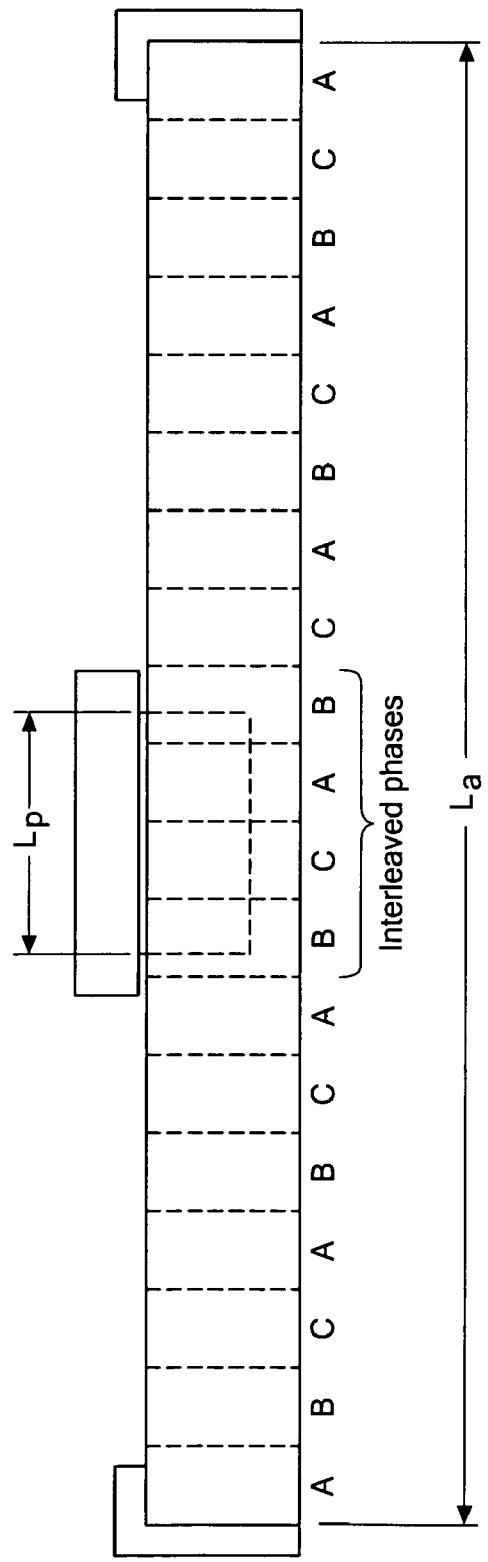
FIG. 50 is a schematic side view of a linear reluctance motor having a short passive shuttle and a long active stator.

FIG. 50 shows one preferred embodiment when the shuttle is much shorter than the stator and electrical connections to the shuttle are to be avoided. In this case, the stator has a large number of phases, which are arranged serially down the length of the stator. The cross-section through the shuttle could resemble the configuration of FIG. 4 with the shuttle having a single set of passive blades. To allow smooth force in either direction, the shuttle blade-set should overlap a minimum of three phases of the stator.

In FIG. 50 the phases of the stator are marked A, B, C, A, B, C etc. Preferably, all these phases marked "A" should have their blade teeth in phase with each other, meaning the distance between the left edge of any two magnetic teeth is an integer multiple of the tooth pitch. Similarly, the teeth of all phases marked B should be "in phase" with each other, and the same for those phases marked "C". As shown in FIG. 7, phases A, B, and C are also "phase-shifted" by P/3 with respect to each other.

Figure 51:
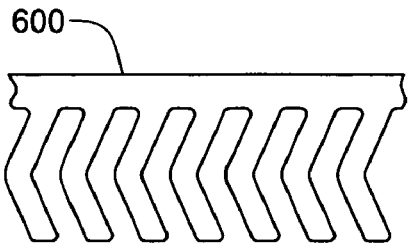
FIG. 51 is a schematic side view of a non-magnetic metal blade coupon portion in accordance with the subject invention.
Figure 52:
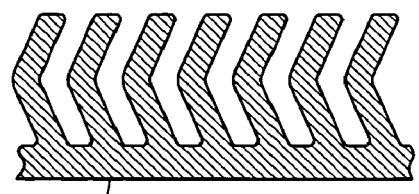
FIG. 52 is a schematic side view of a high permeability material blade coupon in accordance with the subject invention.
Figure 53:
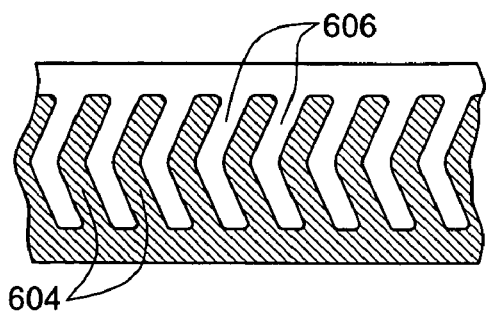
FIG. 53 is a schematic side view showing a complete blade when the blade coupon of FIG. 51 is bonded to the blade coupon of FIG. 52.

FIGS. 51-53 show how chevron-shaped blade teeth can be formed by bonding non-magnetic blade coupon 600, FIG. 51 with high permeability blade coupon 602, FIG. 52 as shown in FIG. 53 to produce high permeability bent teeth 604 alternating with low permeability bent teeth 606. Preferably, the bond between the two blade coupons should be non-conductive so as to minimize the cross-section of the blade subject to circulating eddy-currents. The teeth may be continuous, discontinuous, curved, straight or with one or more zig-zags, or any combination of these shapes, as may be beneficial to improve the strength of the blades, provide a low-friction sliding surface, or increase the effective tooth pitch without increasing the tooth width.

Figure 54:
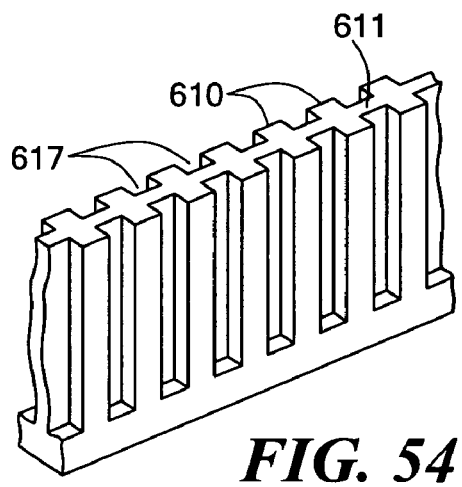
FIG. 54 is a schematic three-dimensional view of a blade coupon with lateral grooves in accordance with the subject invention.
Figure 55:
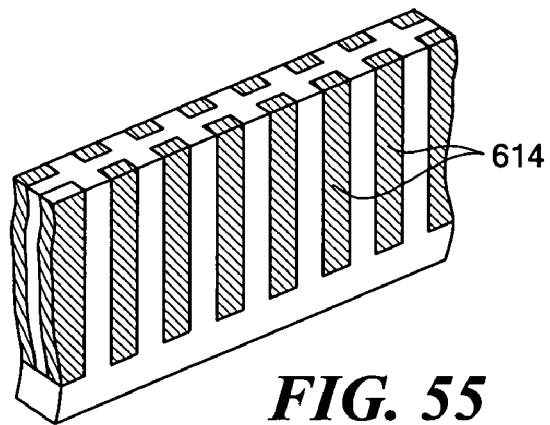
FIG. 55 is a schematic three-dimensional view showing a blade with lateral grooves which have been filled with low permeability structural material.

FIG. 54 shows how alternating high permeability teeth 610 and low permeability teeth 617 can be achieved by forming grooves in a low-permeability material, but leaving a web 611 of material for structural support. In a non-contact design as in FIG. 8, the grooves could remain unfilled, but for greater strength and for contacting designs it is preferable to fill the grooves with a low-permeability material 614 as shown in FIG. 55.

Figure 56:
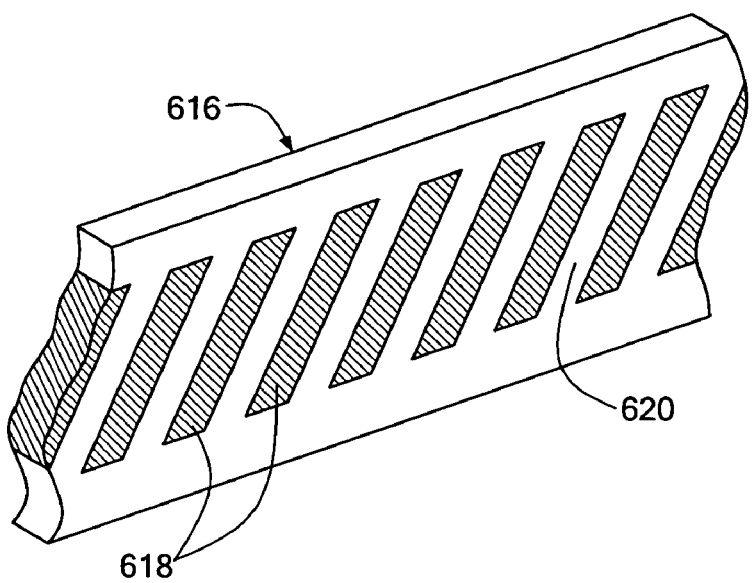
FIG. 56 is a schematic three-dimensional view of a portion of a blade in accordance with the subject invention where the teeth thereof are angled.

In FIG. 56, structural non-magnetic non-conductive blade coupon 616 includes angled slots filled with high permeability material forming angled high permeability teeth 618 and angled low permeability teeth 620. The result is teeth angled with respect to a line perpendicular to the long axis of the blade thus reducing tensile stress in the low permeability material in applications where the load is primarily in one direction. Angled teeth can also be chevron shaped as shown in FIGS. 51-53 or zig-zig in shape, curved, or any combination of these shapes.

Figure 57:
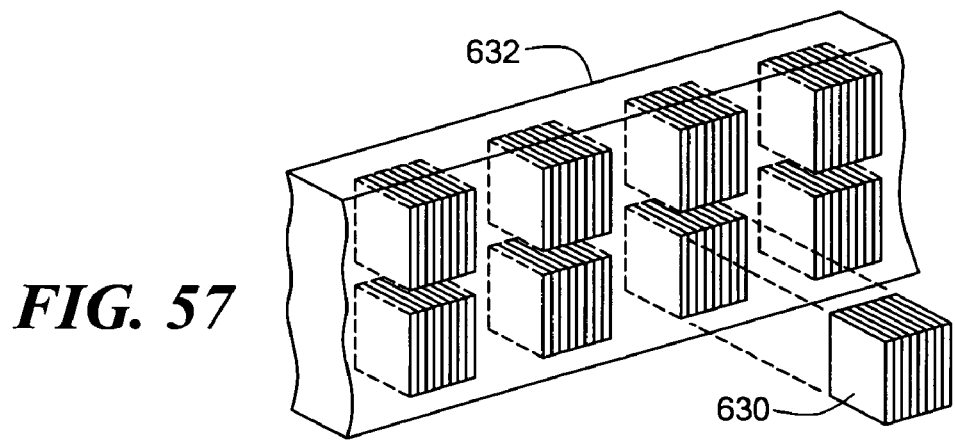
FIG. 57 is a schematic three-dimensional view of a portion of a blade in accordance with the subject invention wherein the teeth are formed by bars of laminated ferromagnetic material bonded in place within a blade coupon.

FIG. 57 shows how bars 630 of laminated ferromagnetic material (e.g., iron) can be bonded into the slots formed in non-magnetic, non-conductive blade coupon 632. Each bar is made of laminated ferromagnetic material thus allowing higher speed operation with reduced eddy-current losses.

Figure 58:
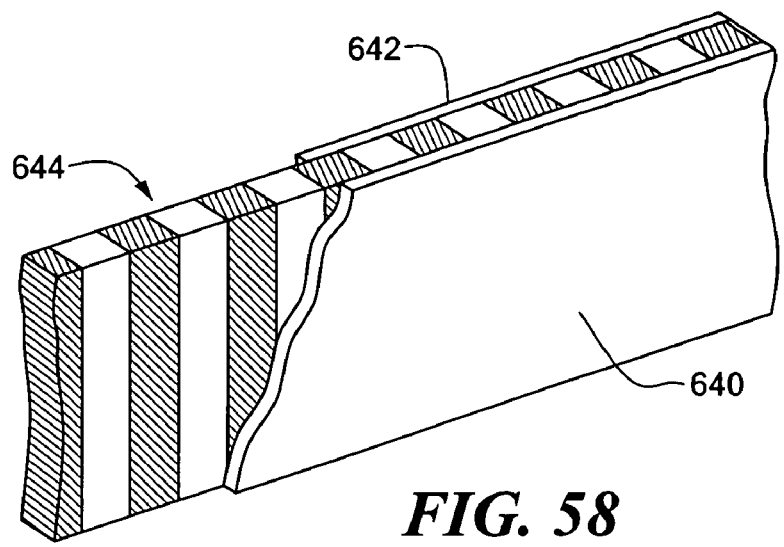
FIG. 58 is a schematic three-dimensional view showing a portion of a blade in accordance with the subject invention with laminated thin structural sheet material bonded to each side thereof.

In any embodiment, thin structural sheet material (e.g., titanium, carbon steel, alloy steel, stainless steel, carbon-fiber reinforced polymer, glass fiber reinforced polymer, polymer film, liquid crystal polymer film, ceramic, or glass) 640 and 642, FIG. 58 can be laminated on the opposite sides of blade 644 to increase the strength of the blades and/or reduce friction and wear.

Thus, depending on the specific application, the shuttle and/or the stator of the linear reluctance motor of the linear reluctance motor can be active and the shuttle and/or the stator can move. The shuttle can be relatively long and the stator relatively short or the stator can be relatively long and the shuttle relatively short. The shuttle can ride along a C-shaped channel defined by the stator or the shuttle and the stator can define telescoping tubes.

One embodiment of rotary reluctance motor 650, FIG. 59, in accordance with the present invention includes set 690 of disks 700 interleaved with, bearing against, and supporting set 692 of disks 702.

Figure 60:
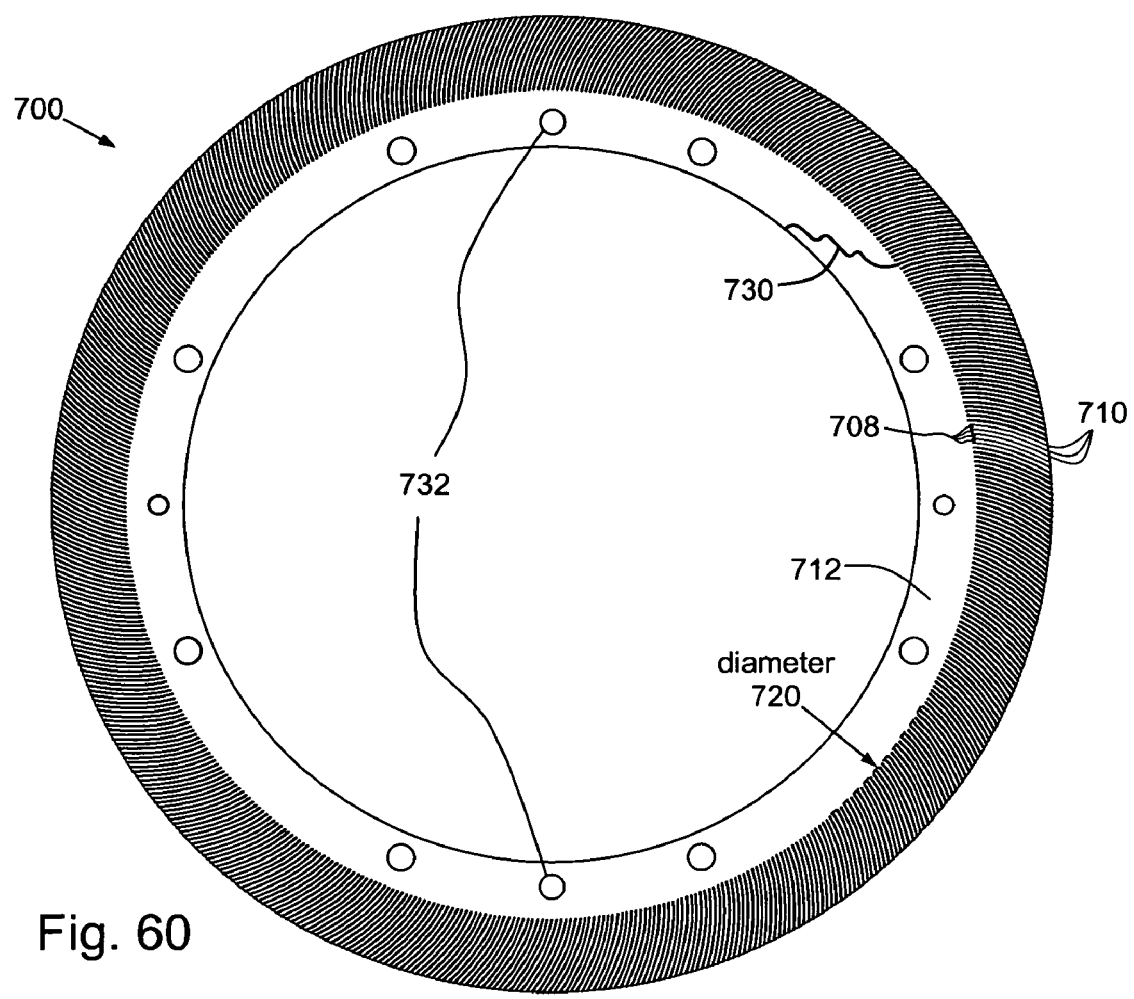
FIG. 60 is a schematic perspective view of one example of a spaced disk, such as an inner spaced disk, in accordance with the present invention.
Figure 61:
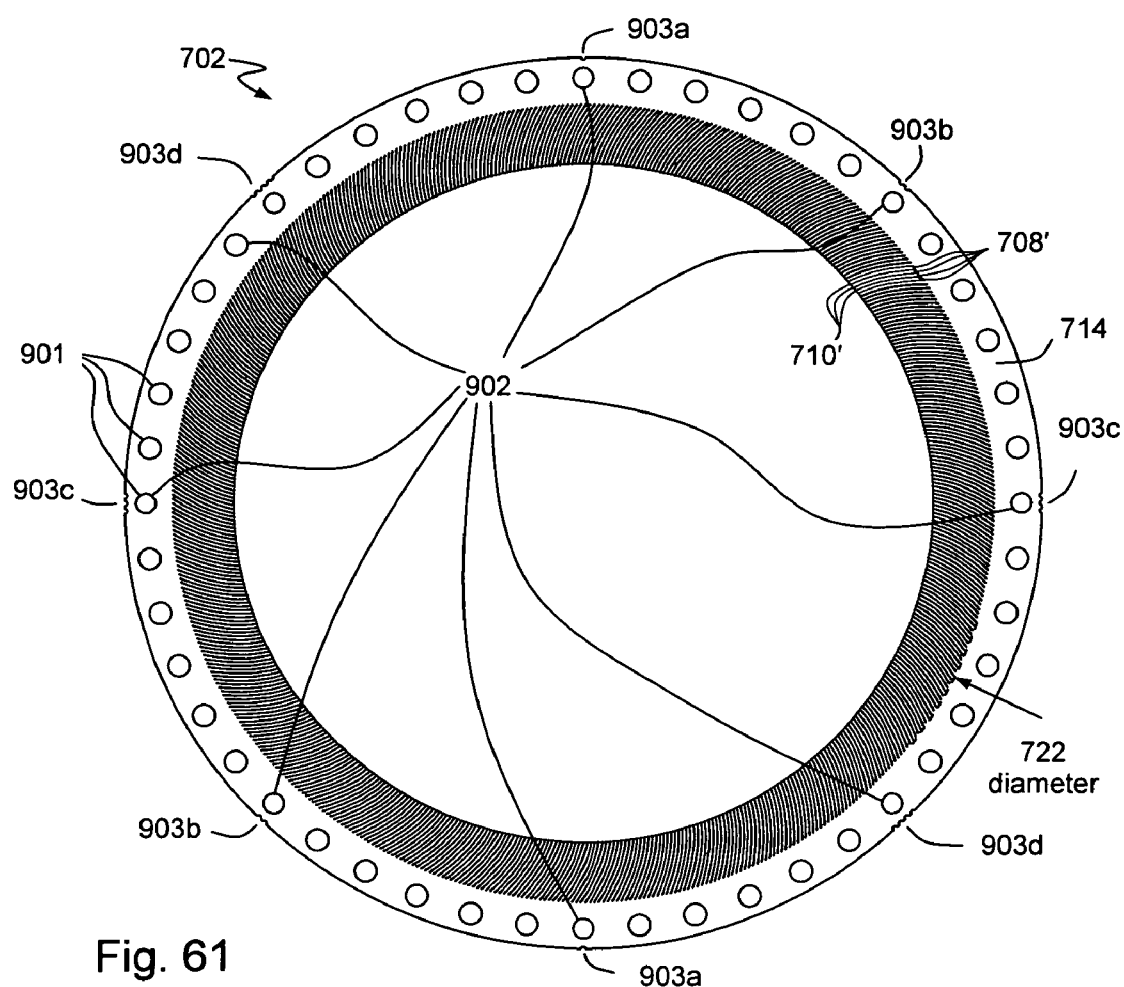
FIG. 61 is a schematic perspective view of one example of a spaced disk, such as an outer spaced disk, configured to be interleaved with the spaced disk of FIG. 60 in accordance with the present invention.

In one variation of a rotary reluctance motor in accordance with the subject invention, disk 700, FIG. 60 is an inner disk. A plurality of alternating high permeability teeth 708 and low permeability material segments 710 extend outward from inner diameter root 712, typically from outer diameter 720 of root 712. The plurality of alternating high permeability teeth 708 and low permeability material segment 710 comprise an outer diameter free end of disk 700. In this variation, disk 702, FIG. 61 is an outer disk. High permeability teeth 708' and low permeability material segments 710' extend inward from outer diameter root 714, typically from inner diameter 722 of root 714. The terms "inner" and "outer" are illustrative and not limiting, and inner root 712 may be fixed such that inner root 712 and high permeability 708 and low permeability material segments 710 comprise a portion of the stator or fixed portion of the motor, such that outer root 714, teeth 708' and low permeability segments 710' comprise a portion of the rotor or rotating portion of the motor. The plurality of alternating high permeability teeth 708' and low permeability segments 710' comprise an inner diameter free end of disk 702. Alternatively, outer root 714 teeth 708' and low permeability segments 710' may comprise a portion of the stator, such that inner root 712, teeth 708 and low permeability segments 710 comprise a portion of the rotor.

In one variation, high permeability teeth 708 and low permeability material segments 710 extend substantially radially outward, and high permeability teeth 708' and low permeability material segments 710' extend substantially radially inward. When set 690 of disks 700, FIG. 59 interleaves with and supports set 692 of disks 702, it is typically the high permeability teeth and low permeability segments of one of disks 700, 702 which bear against and axially support the high permeability teeth and low permeability segments of the other of disks 700, 702. The interleaved inner and outer disks 700, 702 form a disk stack 800. In one typical configuration, inner disks 700 and outer disks 702 will have the same number of teeth as one another, and the teeth are evenly spaced.

Conventional motors avoid direct contact between the poles, or "teeth" of the rotor and stator. This is done to avoid friction and wear. The present invention, however, typically produces very high torque at very low speed. The friction resulting from the contact between the teeth tends to have only a minor effect on torque output, and wear problems can be mitigated by proper lubrication.

In accordance with embodiments of the present invention, it is generally desirable to minimize clearance 762 between interleaved disks 700 and 702 (and accordingly the respective high permeability teeth and low permeability segments of the interleaved disks). This tends to increase the torque on rotor disk 700 for a given level of current in coil 706. Minimizing the clearance also reduces the axial magnetic force or "attraction" between the disks. In theory, if a disk is exactly centered between its neighboring disks in disk stack 800, the attractive forces between the neighboring disks will cancel and the friction will be zero. Magnetic attraction is unstable however, and disks 700, 702 will tend to bend one way or the other, which increases the attraction on the side with the smaller clearance, and decreases it on the other. In conventional disk motors, the disks must be stiff enough and the clearances large enough to resist these net axial forces and allow motor operation.

In the present invention, disks 700 and 702 are interleaved such that clearance 762 is much smaller than would be needed if each disk were self-supporting, such as the self-supporting disks of conventional systems. Since clearances 762 are very small, disks 700, 702 can be well-centered between their neighboring disks in the disk stack and the net axial magnetic forces are thus minimized. As a result, disks 700, 702 can also be much thinner than in a conventional motor since disk 700 and 702 support one another and bear against one another, and need not be self-supporting. The disks 700, 702 are also typically flexible, in order to tolerate errors in disk flatness and/or axial misalignment, thus also allowing smaller average axial clearance between the interleaved disks. This allows for more disks in a disk stack and consequently more torque. Also, the reduction of disk thickness can reduce the size and weight of the flux return and/or allow more space for the coils.

In accordance with the present invention, disks 700 and 702 interleave with and, in contrast to known systems, support and bear against one another in the presence of axial forces caused by magnetic attraction. The clearance 762 between disks 700 and 702 is preferably as small as manufacturing and assembly tolerances will allow. Typically, root assemblies 810 and 812, discussed further below, define the spacing of the disks and a minimal axial clearance between adjacent disks. Due to imperfections in the flatness, thickness and spacing of the disks, the actual clearance will vary, but there is an average axial clearance between disk of the disk stack and this average clearance size is typically very small. In one embodiment the average clearance between disks is 0.0013 inches, although this is not a necessary limitation. Various ways to minimize clearance are discussed in more detail below.

In accordance with the subject invention the disks support each other, thus tending to cancel the axial magnetic forces, and frictional forces are reduced since each disk is thin and can be better centered between neighboring disks. To the extent that closely spaced disks may contact or rub during motor operation, a lubricant or lubricating film or coating can be introduced or applied to one or both sides of each pair of adjacent interleaved surfaces, including the interleaved surfaces of the high permeability teeth and low permeability segments of the disks where such contact between disks typically would occur. Example lubricants include fluid such as oils, greases and low-friction powders such as Teflon, graphite, and molybdenum disulphide. Teflon-based products are especially desirable for positioning applications since they typically have lower breakaway friction than running friction. Examples of low friction films and coatings include those based on Teflon, graphite, and molybdenum disulphide, and newer high-tech coatings such as diamond-like carbon.

In one example, the axial error was measured at approximately 0.008 inches, or about six times the desired average clearance between disks. The conventional solution is to make all clearances significantly larger than the expected axial error motion. This solution is acceptable for low performance applications and for large motors, but for higher performance applications and/or smaller motors, increasing the clearance to over 0.008 inches would be severely detrimental to the torque output.

Figure 62:
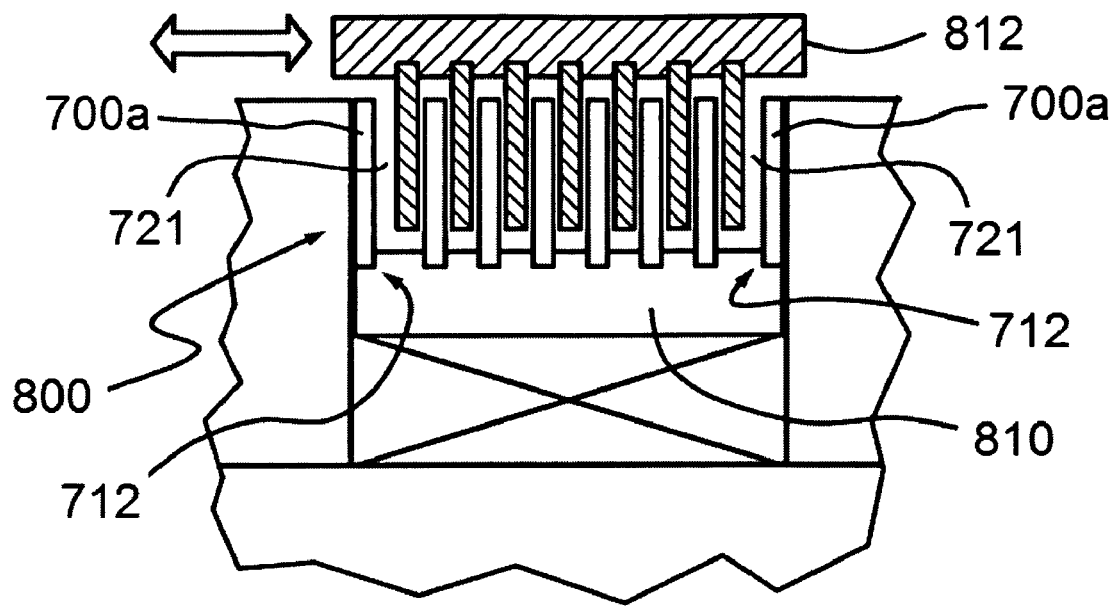
FIG. 62 is a schematic cross-sectional more detailed partial view of one embodiment of a rotary reluctance motor in accordance with the present invention including relatively larger gaps at each end of the disk stack.

In one variation of the present invention, the advantages of very small clearance between disks such that the disks support one another, are achieved despite the problem of axial alignment error, by having relatively large gaps 721, FIG. 62 at the ends of the disk stack. Very small clearances between interleaved disks can thus be maintained. In one configuration as shown in FIG. 59, sidewalls 715 of flux return portions 705a and 705c are tapered and the endmost disks 700a of stack 800 are bent outward, thus opening up gaps 721a. This tapering allows for axial misalignment of, for example, inner and outer root assemblies 810 and 812. It also minimizes the average size of clearances between disks during operation of the motor 650. This allows axial motion of root assembly 812 and axial motion between the roots 712, 714 of the sets of spaced disks 700, 702, respectively, up to the width of gap 721. All but the endmost disks 700a of disk stack 800 come into contact with adjacent disks and tend to bend or "dish" sideways. The resultant contact forces are small if the disks are thin compared with the radial height h of the interleaved portion. In one non-limiting variation, disk thickness was 0.018 inches and the radial height of the interleaved portion of the disks was 0.75 inches. This easily provided sufficient axial play (~0.008 inches) to allow for thermal expansion and part tolerances.

Figure 63:
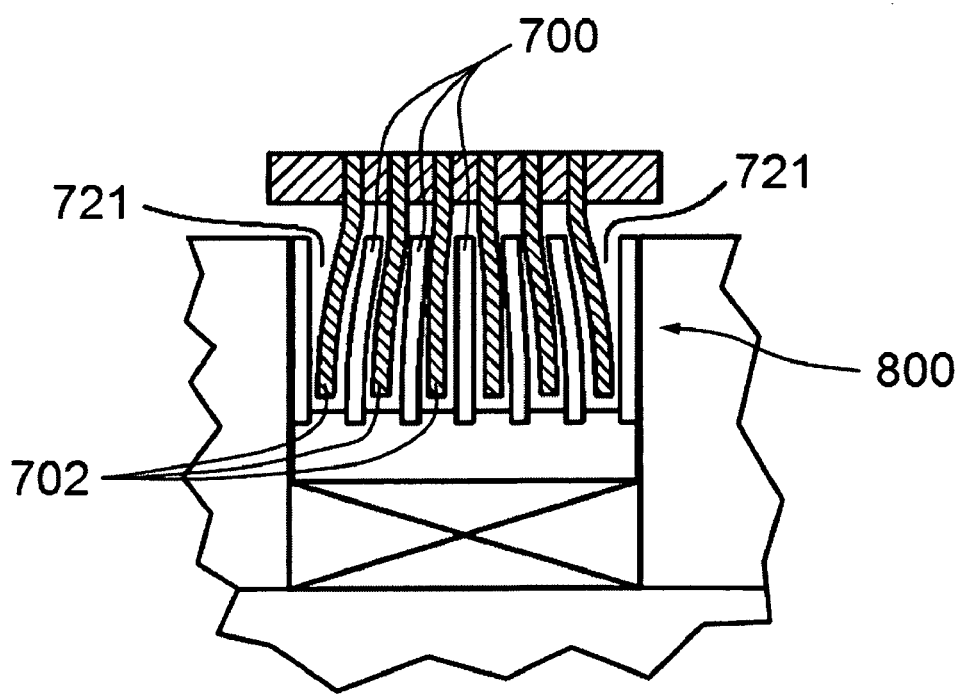
FIG. 63 is a schematic cross-sectional more detailed partial view of one embodiment of a rotary reluctance motor in accordance with the present invention including a variation in disk spacing between disks of each disk set.
Figure 64:
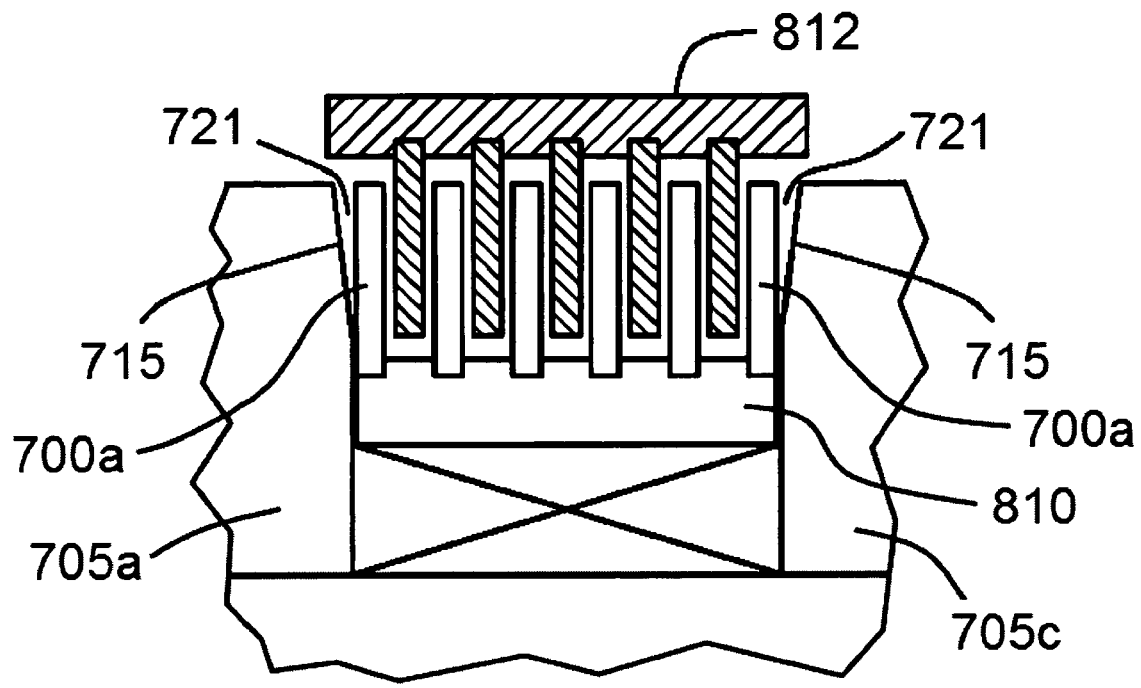
FIG. 64 is a schematic cross-sectional more detailed partial view of one embodiment of a rotary reluctance motor in accordance with the present invention including larger gaps at each end of the disk stack and a tapered flux return surface.

The relatively large gaps 721 at the ends of disk stack 800 can be between the two disks closest to the end of the disk stack as shown in FIG. 59 by having a tapered surface 715 on the flux return portions 705a and 705c. Alternatively, large gaps 721 at the ends of disk stack 800 may be achieved by wider spacing at the roots e.g. roots 712 of the endmost disks 700a as shown in FIG. 62, or by spacing all the disks 700 of one set of spaced disks differently than the disks 702 of the other set of spaced disks as shown in FIG. 63. In another example, large gaps 721 are between the endmost disks 700a and flux return portions 705a and 705c, FIG. 64. These configurations for opening up large gaps should not be considered limiting. Persons skilled in the art will recognize that there may be other methods or configurations for opening up larger gaps at the ends of a disk stack suitable for a particular desired application. As noted, these relatively large gaps 50 and 721 are substantially larger than the average clearance between disks of the disk stack.

Figure 65A:
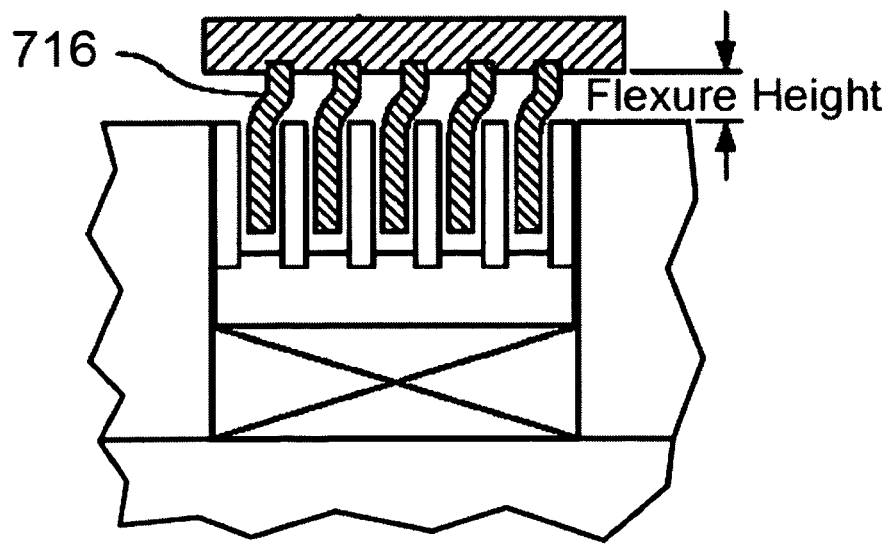
FIGS. 65A and 65B are schematic cross-sectional partial views of examples of flexures in accordance with the present invention.
Figure 65B:
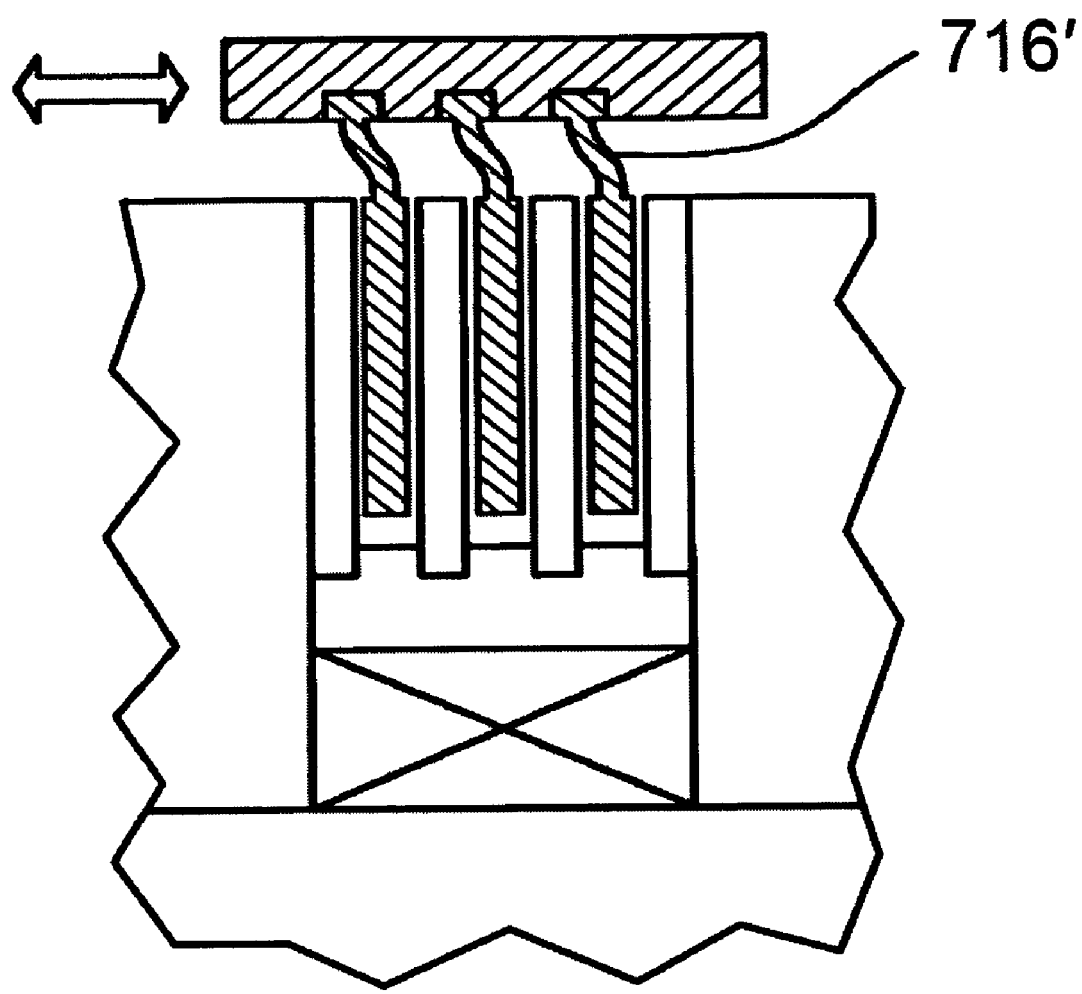
Figure 66A:
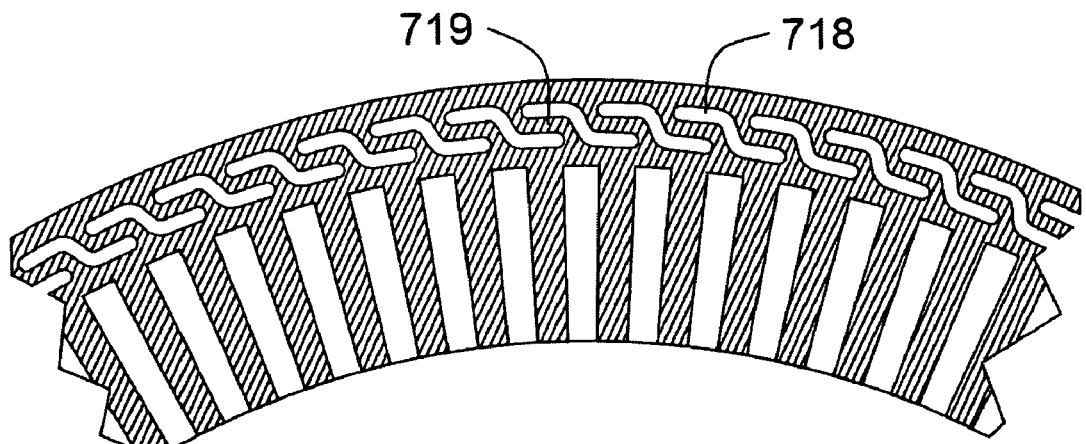
FIGS. 66A and 66B are schematic cross-sectional partial views of examples of flexures formed by slots or openings in disk roots in accordance with the present invention.
Figure 66B:
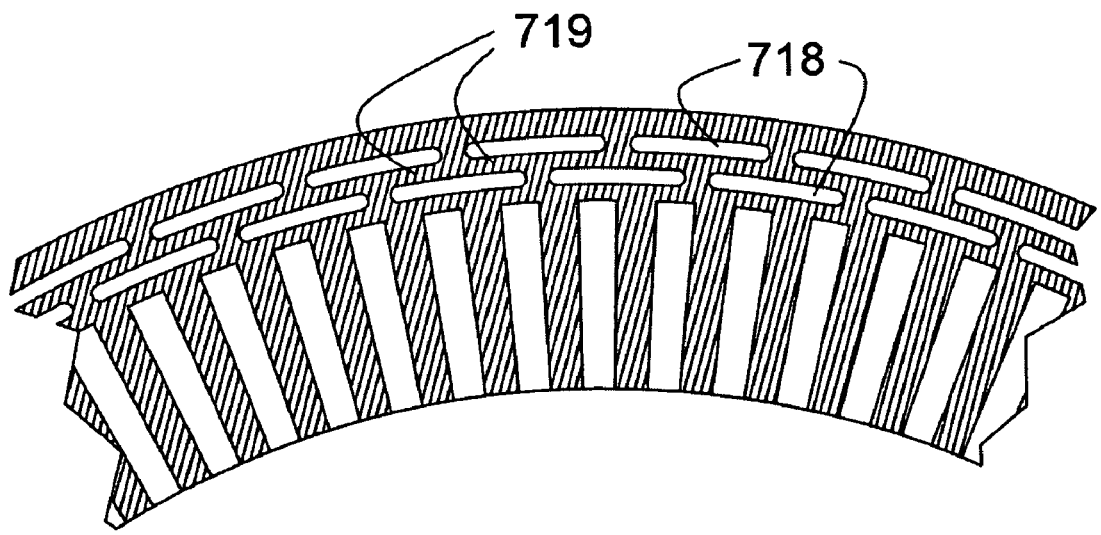

In another variation in accordance with the subject invention, the advantages of very small clearances between disks such that the disks support and bear against one another are achieved despite the problem of axial motion by providing flexures in a flexure region between the root or roots and the interleaved portion of at least one disk or set of spaced disks. For best results the flexures typically are relatively stiff in torsion, but compliant in axial shear, i.e. due to axial force. Examples of flexures 716, 716' are shown in FIGS. 65A and 65B. In the example of FIG. 65A, axial motion is accounted for by the increased flexure height from the roots of the disks to the interleaved portion. As shown in FIG. 65B flexures 716' are configured as thinned-down portions of the disks. In the variations of FIGS. 66A and 66B, showing arc-segments of e.g. outer disks 702, slots 718 (which are typically cut into the disk roots) form flexures 719. In this latter example, the flexure region is in the disk roots.

An additional configuration in accordance with the subject invention for minimizing the average clearance between adjacent disks of a disk stack is to make the clearance relatively larger near the roots of the disks than toward the radial center of the disk stack. This configuration results in minimizing average clearance size by providing clearance only where needed to avoid pinching of the free end of a disk near the roots of neighboring disks. One example of this approach is disk stack assembly 801 shown in FIG. 67. Free ends 760 of the disks (or more particularly free ends of the high permeability teeth and low permeability segments of the disks) have been thinned down, thus providing slightly larger clearance 761 nearer to the disk roots 712 and 714 than clearance 762 at the radial center of disk stack 800. Note that the same effect may also be achieved by thinning the disks near their roots. Thus, with very small clearance between adjacent disks, and by minimizing the average clearance between disks of the disk stack, less coil current is required to generate the necessary flux, resistive losses are reduced, and less heat is generated.

Also in accordance with various embodiments of the patent invention, coil 706, FIG. 59, is configured to provide flux through disks 700 and 702 to rotate set 692 of disks 702 with respect to set 690 of disks 700. As shown, rotary reluctance motor 650 includes rotating components 703 comprising a "rotor" (shaded portion) and fixed or stationary components 701 comprising a "stator". Rotating components or "rotor" 703 include set 692 of disks 702, spacers 742 between disk roots 714 and associated with root assembly 812, while fixed components or "stator" include set 690 of disks 700, spacers 740 between disk roots 712 and associated with root assembly 810. In this example, the set of inner disks 700 are fixed at inner diameter roots 712 to root assembly 810, and the set of outer disks 702 are fixed at outer diameter roots 714 to root assembly 812. Root assemblies 810 and 812 are typically made from low permeability materials.

When the rotor is attached to and/or is part of other structure(s), it drives or rotates such other structure(s). Those skilled in the art will understand that the description regarding stationary components 701 and rotating components 703 is not a limitation of any embodiments of the subject invention, and alternatively, components 703 may be fixed in place while components 701 rotate, for example, if components 701 are attached to a shaft and rotate the shaft (not shown) about axis 709, while components 703 remain fixed or stationary.

As shown in FIG. 59, coil 706 is associated with inner roots 712 of disks 700, but this is not a necessary limitation of the invention, as coil 706 may be associated with either an inner or an outer root depending on the configuration and as desired for a specific application, in order to rotate one set of disks with respect to the other set of spaced disks. As is known in the art, coil 706 is typically wound in order to provide flux axially through the interleaved disk stack 800 as shown. In one variation, a root associated with a coil, for example inner root 712 of disk 700, FIG. 60, includes discontinuity 730 therein, thus preventing unwanted power loss and loss of motor torque due to circumferential eddy currents. In this variation, the outer disks are not associated with the coil and their roots do not link the flux that passes through the flux-return and the disk stack. In such a case, outer disk roots 714 of disk 702, FIG. 61 can form a continuous conductive ring without significantly affecting torque output, although the motor may be harder to control since the leakage flux is still linked. In general, if the roots of the disks are made of electrically conductive material, it will be desirable for the roots of at least one of the sets 690 or 692, FIG. 59 of spaced disks 700, 702 to include discontinuities therein to prevent circumferential eddy currents.

Also as shown in FIG. 59, the active component of the rotary motor is associated with stator 701, although this is not a limitation of the invention, and various arrangements may be used depending on a particular desired application.

In the embodiment of FIG. 59, rotary reluctance motor 650 also typically includes flux return portions 705*a* and 705*b* axially adjacent disks 700 and 702 at each end of disk stack 800, as well as flux return portion 705*c* and coil 706, configured to provide flux axially through interleaved disks 700 and 702, i.e. disk stack 800, parallel to rotation axis 709 of the rotary motor, to rotate disk 700 and 702 with respect to one another. Together, flux return portions 705*a*, 705*b* and 705*c* complete the flux circuit. The direction of flux in the flux return portions has primarily axial and radial components. To minimize eddy-currents, the flux return portions are preferably laminated assemblies of ferromagnetic material with the laminations oriented substantially axially and radially. Alternatively, part or all of the flux return can be made from a high-resistivity, high-permeability material such as ferrite or a bonded metal-powder composite such as Permedyn™. Various flux-return examples are shown in greater detail below in FIGS. 86A through 86E, in the context of one embodiment of a rotary reluctance motor in accordance with the subject invention which includes a plurality of interleaved disk stacks.

To visualize the example of FIG. 59, the rotor or rotating components 703 would rotate into (or out of) the page, rotating about the rotation axis 709. Flux return portions 705*a* and 705*c* are at each end of disk stack 800, the latter including sets 690 and 692 of disks 700 and 702. In one variation, disk stack 800 includes approximately sixty-three (63) interleaving disks, although this is not a necessary limitation, and more or less interleaved disks in a disk stack may be utilized depending on a particular desired application. Flux return portions 705*a* and 705*c* may be attached to and/or axially support disks 700*a* located at each end of disk stack 800.

Disks 700, one example of which is shown in more detail in FIG. 60, include a plurality of alternating high permeability teeth 708 and low permeability material segments 710 therebetween, each extending from root 712. Disks 702, FIG. 61 also include a plurality of alternating high permeability teeth 708' and low permeability material segments 710' therebetween extending from root 714. Low permeability material segments 710 and 710' are typically shaped similarly to the high permeability teeth 708 and 708' in order to fit within and between the high permeability teeth. In one example, a photo-etching process may be used to "cut" or form the teeth. In most configurations, the high permeability teeth are made of the same material as the roots of the spaced disk, and are typically made of ferromagnetic material, e.g., iron, low-carbon steel or iron alloyed with any of the following: cobalt, silicon, nickel, chromium, manganese, vanadium or molybdenum. The high permeability teeth may be attached to the roots, but typically are fabricated from the same material stock.

The low permeability material segments are preferably made from a low permeability material having high resistivity, high strength, high stiffness, and a coefficient of thermal expansion close to that of the high permeability material used for the high permeability teeth. Ceramic powder-filled epoxy is a particularly good choice. Other options include ceramics, polymers, fiber-reinforced polymers, ceramic-filled polymers, metal-filled polymers, metal-filled ceramics, and low permeability metals such as aluminum, brass, and stainless steel. If the low-permeability material has high electrically conductivity, it will be advantageous to avoid electrical contact between the high permeability teeth and the low-permeability material segments, e.g. by bonding with a non-conductive adhesive. These materials are not necessarily limiting, however. In one example the roots may be made of low permeability material. Also, other suitable materials may be used according to a desired application. The low permeability material can also be air, particularly if the disks are reinforced with a thin structural surface layer, an example of which is discussed below and shown in FIG. 76.

In general, the torque density of the motor will increase inversely with the pitch of the high-permeability teeth. If the teeth are formed by photo-etching slots between teeth, the minimum pitch will be related to the disk thickness. Typically the minimum etched-slot width is about 1.2 times the disk thickness. Because of this relationship between disk thickness and tooth pitch, it is generally desirable to minimize the disk thickness. This also allows more disks to be packed into a smaller space, which increases the total surface area for electromagnetic shear. The minimum allowable disk thickness is typically limited by the strength and torsional stiffness of the disks. The disks must be thick enough to take the stress resulting from the electromagnetic shear pressure acting on the disk surfaces. The disks must also have sufficient handling strength to withstand manufacturing and assembly of the motor. In one variation of rotary reluctance motor of the present invention consistent with embodiments shown for example in FIGS. 60 and 61, and FIG. 81, the disks were 0.018 inch thick and had a total of five hundred sixty-two (562) high-permeability teeth 708 and low permeability material segments 710 per disk. This translates to a tooth pitch of approximately 0.046 inch. The width of the teeth and the low-permeability segments were approximately equal, i.e. 0.023 inches each. A tooth width to pitch ratio of 50% is not necessarily optimal, and these dimensions are not limiting. Depending on the application, however, the tooth width to pitch ratio will typically be in the range of 25% to 60%.

Each set of spaced disks is typically anchored at the roots to a root assembly. In one variation, shown in FIG. 59, the root assembly includes a stack of disk-roots with spacers in between. More specifically, (inner) root assembly 810 includes a stack of alternating (inner) disk roots 712 and (inner) spacers 740; and (outer) root assembly 812 includes a stack of alternating (outer) disk roots 714 and (outer) spacers 742. This type of root assembly is called a stack-type root assembly. To simplify the assembly of rotary reluctance motor 650 it is generally desirable for the root assemblies to be bonded together or held with pins, tie-rods or the like.

If made of conductive material, the root assembly should have one or more discontinuities in order to avoid circumferential eddy-currents. This may include discontinuities in the disk roots and/or spacers. For instance, as shown in isolation in FIG. 68, spacer 740 includes discontinuity 746. In such a variation, no discontinuity is necessary for spacer 742 which is not associated with the coil. This should not be considered limiting, however and it may be desirable for outer spacer 742 to include a discontinuity as well, as shown at 748 either to avoid second order dynamics due to linking the leakage flux, or in the case where the coils are associated with the outer roots. Additionally, in one configuration the strength of the root assemblies is maximized by rotationally offsetting or staggering the discontinuities of adjacent disks and/or spacers. In one example, the discontinuities of the disks are at 0°, and those of the spacers at 180°. In yet another example, greater strength is achieved with the disks alternating between 0° and 180° and the spacers alternating between 90° and 270°. This staggering of discontinuities provides greater mechanical strength than if the discontinuities were aligned.

Figure 68:
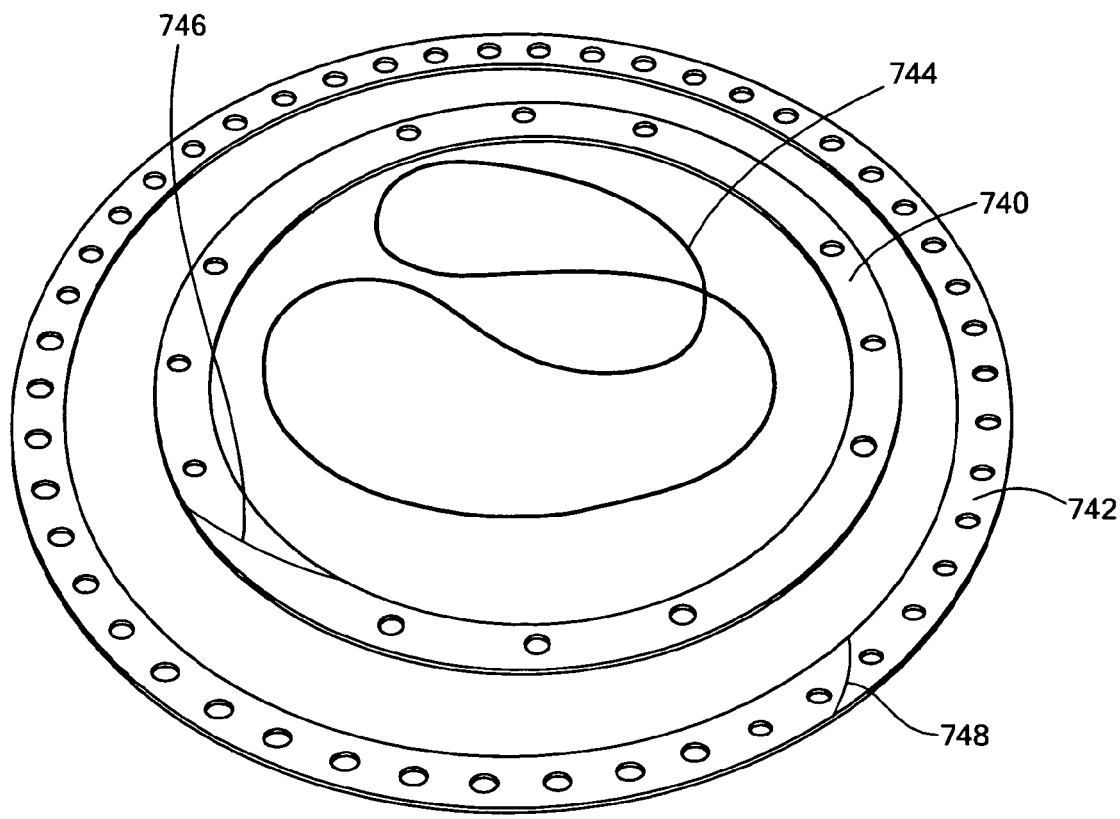
FIG. 68 is a schematic perspective view of spacers, such as inner and outer spacers, and a seal, such as in inner seal, in accordance with one aspect of the present invention.

If the discontinuities are offset or staggered, care must be taken to avoid short-circuiting across the discontinuities. Therefore, in one variation the spacers are made of aluminum and are hardcoat anodized to provide an insulating layer. The root assemblies e.g. root assemblies 810 and 812, are formed by assembling and interleaving the disks 700 and 702 and spacers 740 and 742, then introducing a wicking adhesive to the inner and outer diameters of the assemblies. To avoid getting adhesive in between the interleaved disks, seals are pre-attached to the disks. For example, seal 744, FIG. 68, is typically pre-bonded to inner disk 700. In one variation, seal 744 is die-cut from 0.031 inch thick Poron™ foam. The inner diameter of the seal is slightly larger than the outer diameter of the inner disk 700. During assembly the seal is compressed down to approximately 0.019 inches, thus blocking adhesive from getting in between the interleaved disks.

In one configuration, in order to avoid the need for a discontinuity, other candidate materials for use as the disk spacers are non-conductive materials, e.g. fiber reinforced polymers such as used to make circuit boards, ceramic-filled polymers, ceramics, glass, and polymers such as Mylar, Ultem, Kapton and PEEK. Desirable properties include high modulus, high strength, high temperature resistance, adhesive compatibility or high coefficient of friction (if the assembly relies on tie-rods), and low thermal expansion, and materials with such properties may also be suitable.

In another configuration, the spacers may also be bonded to or integral with the disk roots, for instance, if the spaces between the high permeability teeth are potted with a low-permeability filler (i.e. low permeability material segments), the filler may be molded in the same operation to form thicker disk roots. Thus separate spacers may be omitted.

Figure 69:
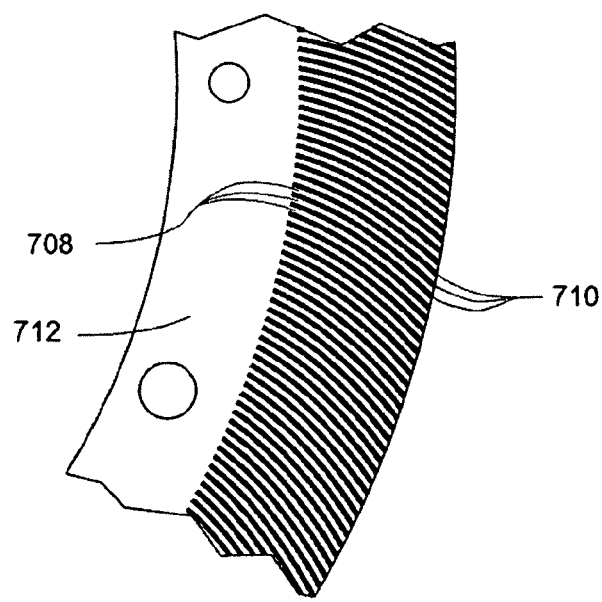
FIG. 69 is a schematic more detailed partial view of the spaced disk, such as an inner disk, shown in FIG. 60.

As shown in FIG. 69, in one embodiment, high permeability teeth 708 (and/or 708') and corresponding low permeability material segments 710 (and/or 710') are curved, which gives the teeth added torsional strength, especially in the direction that causes the teeth to further lean in the same direction. Since the weakest part of the disks is typically the bond between the low-permeability material and the high-permeability teeth, putting this bond in compression increases the bond strength. Also, since most applications tend to require higher torque in one direction, the direction of the teeth can be chosen accordingly. The configuration including curved teeth also improves the interleaved disks' handling strength and their tolerance for stresses which may be caused by unequal thermal expansion.

Figure 70:
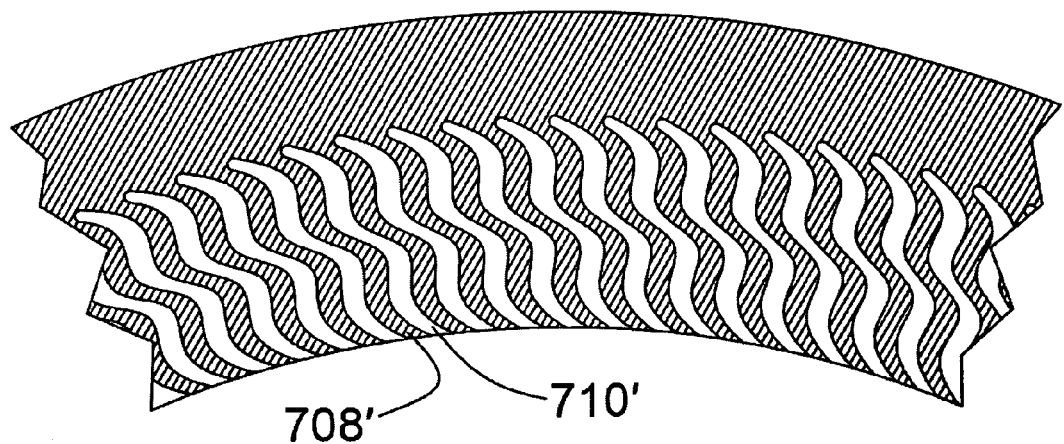
FIGS. 70-73 are schematic partial end views of spaced disks showing various shapes of high permeability teeth and low permeability material segments in accordance with various embodiments of the present invention.
Figure 71:
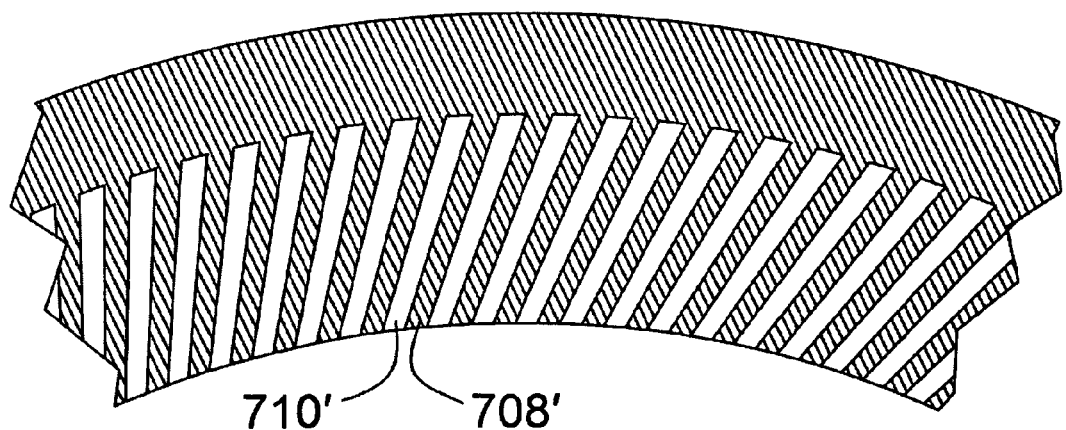
Figure 72:
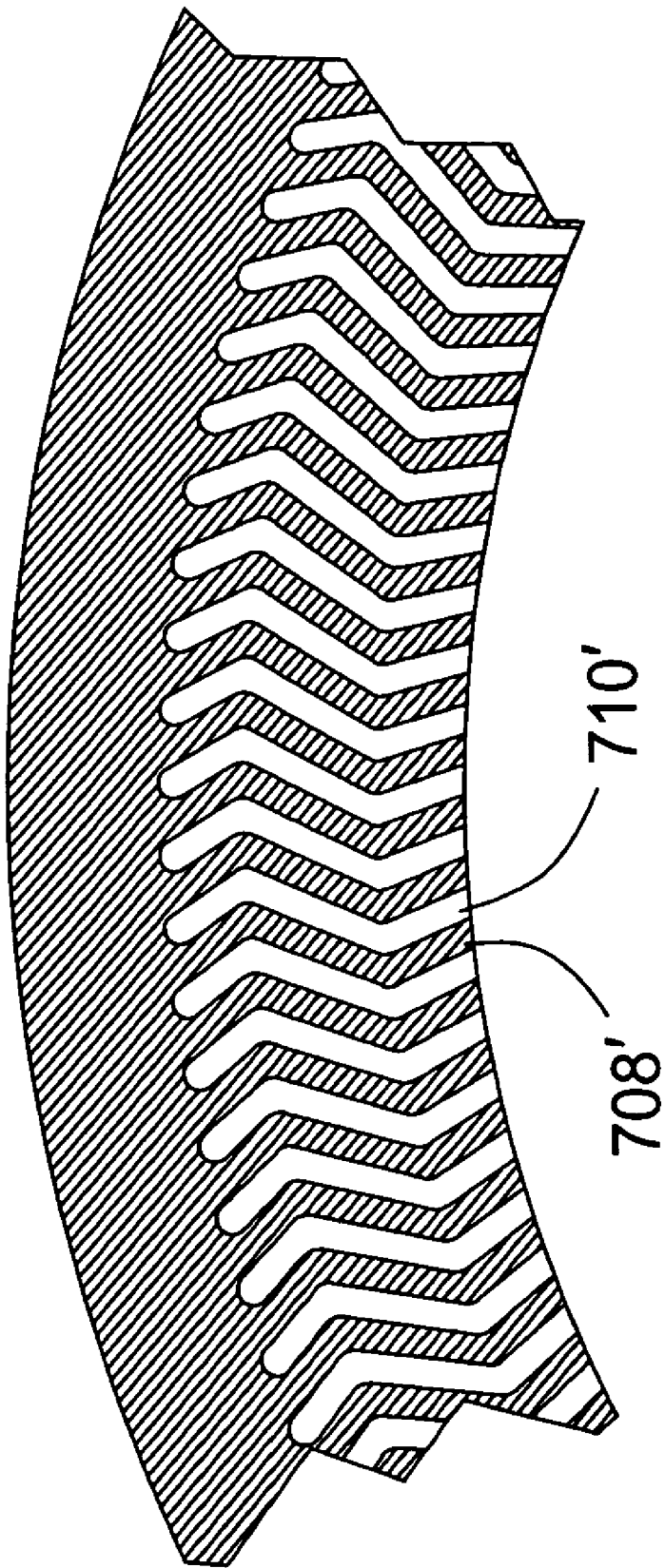
Figure 73:
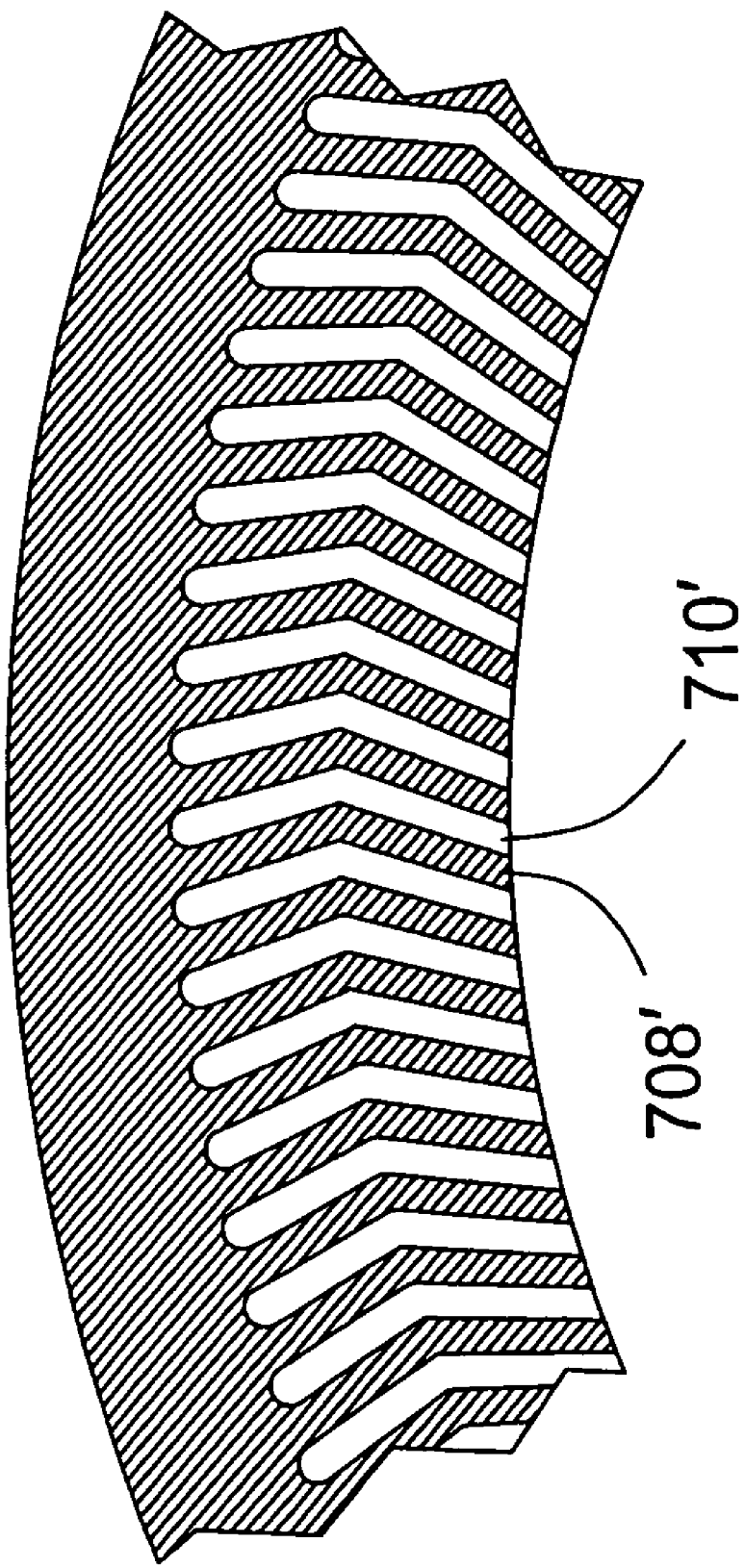

Curved teeth are not a necessary limitation, however, and teeth and segments 708, 708', 710, and/or 710' may be straight (as shown e.g. in FIG. 66B) wavy (as shown e.g. in FIG. 70), angled (as shown e.g. in FIG. 71), zig-zagged (as shown e.g. in FIG. 72), chevroned (as shown e.g. in FIG. 73), or any combination of these shapes, as may be beneficial to improve the strength of the disks or reduce sliding friction. Other shapes are also possible as long as they result in alternating regions of high-permeability and low-permeability in the tangential direction. Torque density will typically be highest if the high-permeability teeth are, on average, oriented "substantially radially", that is, within about 45° from the radial direction.

Figure 74:
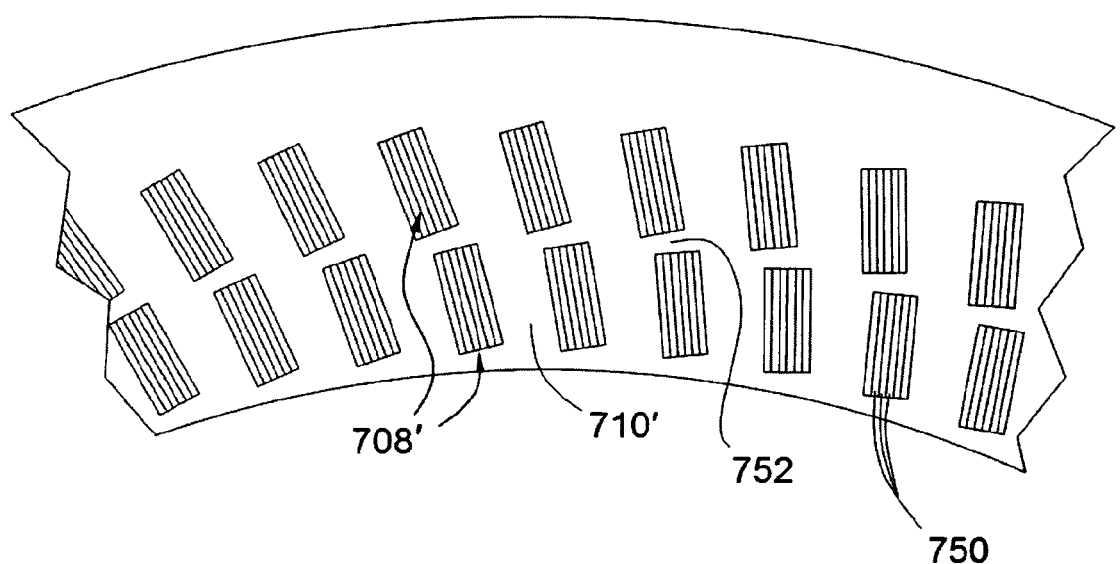
FIG. 74 is a schematic partial end view of one embodiment of a spaced disk including more than one row of high permeability teeth in accordance with the present invention.

In a further example, the disks include more than one row of teeth, e.g. 708', FIG. 74, with low permeability material segments 710' therebetween, and/or teeth 708' may be made up of ferromagnetic laminations 750. This is advantageous especially for larger motors having wide teeth and operating at high electrical frequency.

Figure 75:
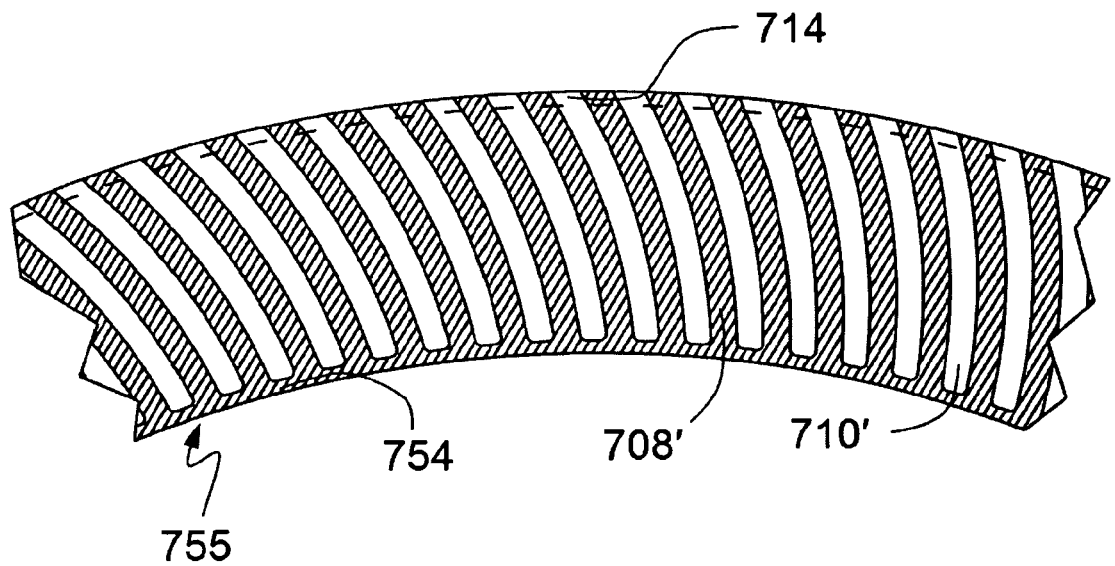
FIG. 75 is a schematic partial end view of one embodiment of a spaced disk, such as an outer disk, including a reinforcing band at the free end of the teeth in accordance with the present invention.

In one variation, the disks may also include reinforcing band of material 754 at free end 755, FIG. 75. Band 754 may be made of the same material as the high-permeability teeth 708' or of the same material as low-permeability segments 710', or an altogether different structural material, e.g. fiber reinforced polymer. For better performance however, reinforcing band 754 material should have low-permeability and low electrical conductivity properties. Low conductivity is especially important if reinforcing band 754 is on a side of the disk stack associated with the coil to link the active flux path. In the case where reinforcing band 754 is made of conductive material, and is on the coil-side, eddy-currents can be avoided by providing discontinuity (not shown) in reinforcing band 754. To minimize eddy-currents it is also important to minimize tangential conductivity of the roots, for example by having the low-permeability material segments 710' extend down to the root 714. The root is also preferably electrically isolated from the disk root assembly 812.

Figure 76:
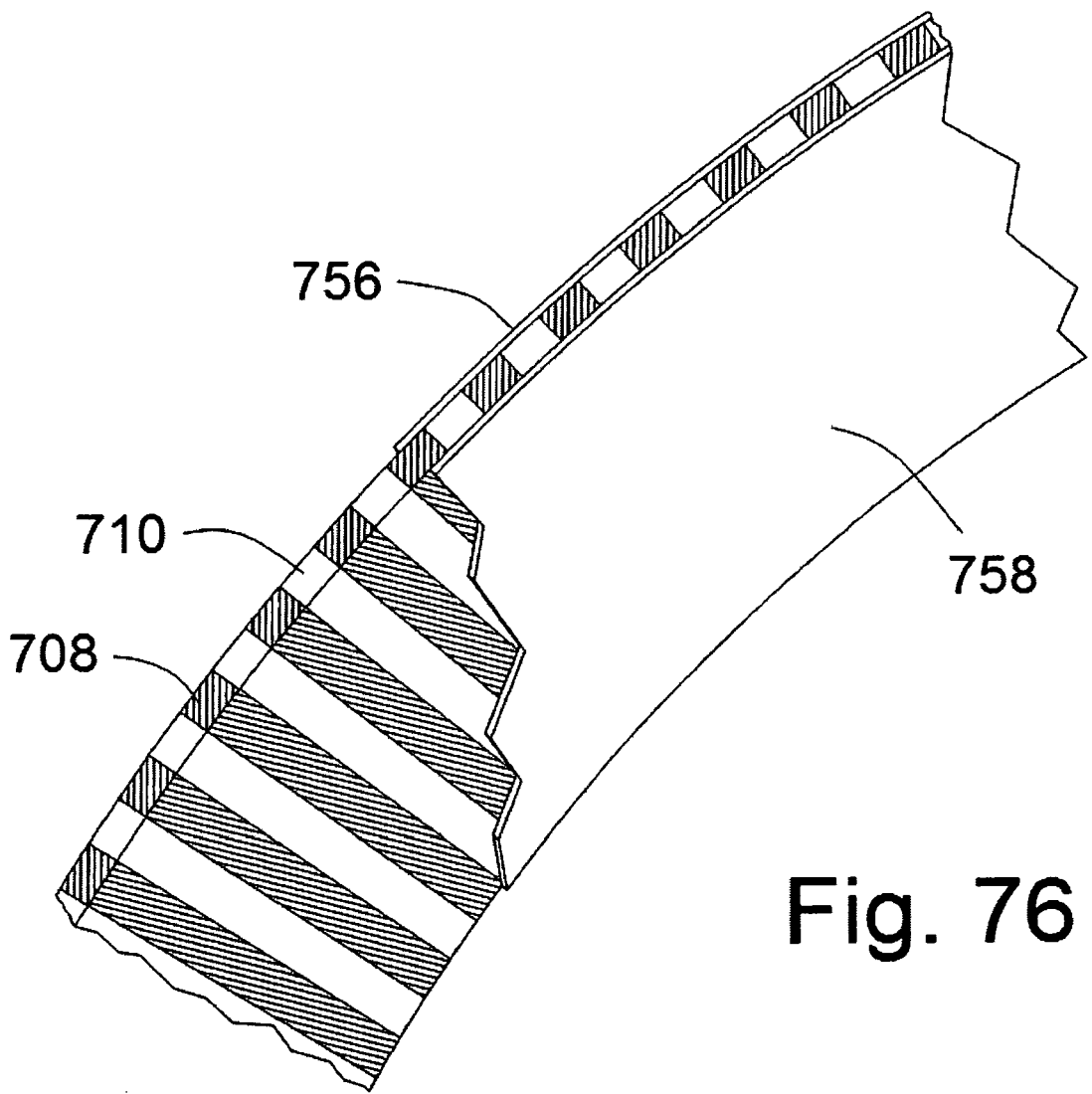
FIG. 76 is a schematic partial cutaway perspective view of one embodiment of a spaced disk, such as an inner disk, including a thin structural surface layer in accordance with the present invention.

In another variation, the disks may include thin structural surface layers 756 and 758, FIG. 76 covering high-permeability teeth 708 and low-permeability material segments 710 for reinforcing the disks. In one configuration, surface layers 756 and 758 are made of material which has high tensile strength and high modulus, though a medium-modulus material would be acceptable if it can be pre-stressed in tension so as to put the low-permeability material segments in compression. This material also preferably has low-permeability, low-friction, and low-conductivity properties. High conductivity would be acceptable, however, for low-speed applications, or if the surface layers material is insulated from high-permeability teeth 708 and is patterned to minimize eddy currents. One example pattern is a spiral angled the opposite direction as the high-permeability teeth. Example materials for surface layers 756 and 758 include but are not limited to fiber-reinforced polymer, high modulus films such as PBO or Vectran film, medium modulus films such as Mylar, Ultem, Kapton or PEEK, carbon nanotube "buckypaper", diamond-like carbon, or a metal such as stainless steel, brass or titanium.

As noted above, embodiments of a rotary reluctance motor in accordance with the present invention typically include sets of disks assembled together to form disk stack 800, FIG. 59, including multiple layers of inner roots 712, typically aligned axially, and outer roots 714, also typically aligned axially, each having its own respective high permeability teeth and low permeability material segments 708, 708', 710, 710', FIGS. 60 and 61 attached to or part thereof as described above. It can be seen that when these components form part of the operating rotary reluctance motor, if inner roots 712 of FIG. 59 are fixed (the "stator" portion), outer roots 714 will rotate (the "rotor" portion), which will drive or rotate a structure attached thereto, such as a rotatable arm in one example. If outer roots 714 are fixed (thus serving as the "stator" portion), inner roots 712 will rotate (the "rotor" portion), which in turn would rotate a structure, such as a shaft in one example, attached to inner roots 712 via one or more attachment element(s).

As shown in FIG. 59, one configuration of inner root assembly 810 includes inner roots 712 and inner spacers 740. Similarly, outer root assembly 812 includes outer roots 714 and outer spacers 742. Such a construction is an example of a stack-type root assembly. In one variation, tabs (not shown) are used to reinforce the inner roots at the discontinuities 730, and the tabs are typically cut off after assembling the stack.

Figure 67:
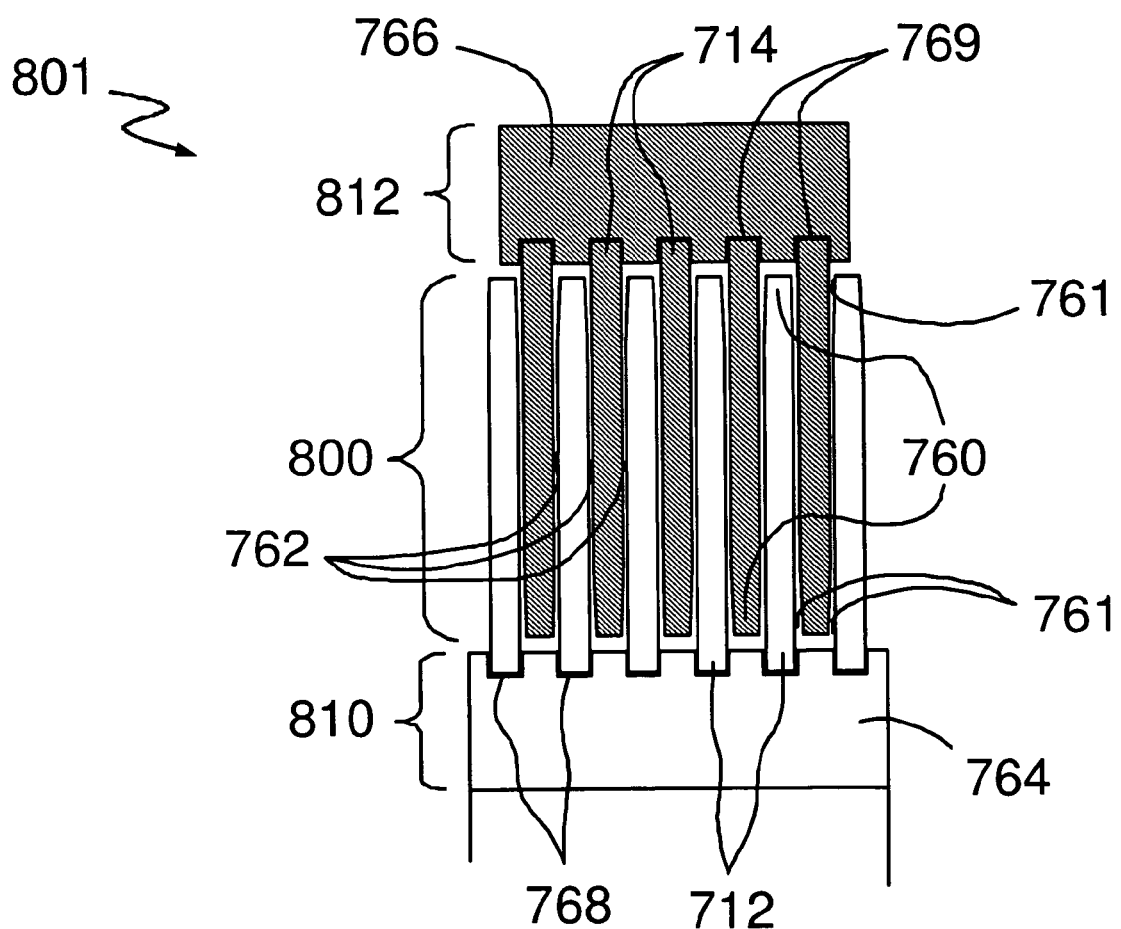
FIG. 67 is a schematic cross-sectional partial view of one embodiment of spaced disks including thinned down free ends in accordance with the present invention.
Figure 77:
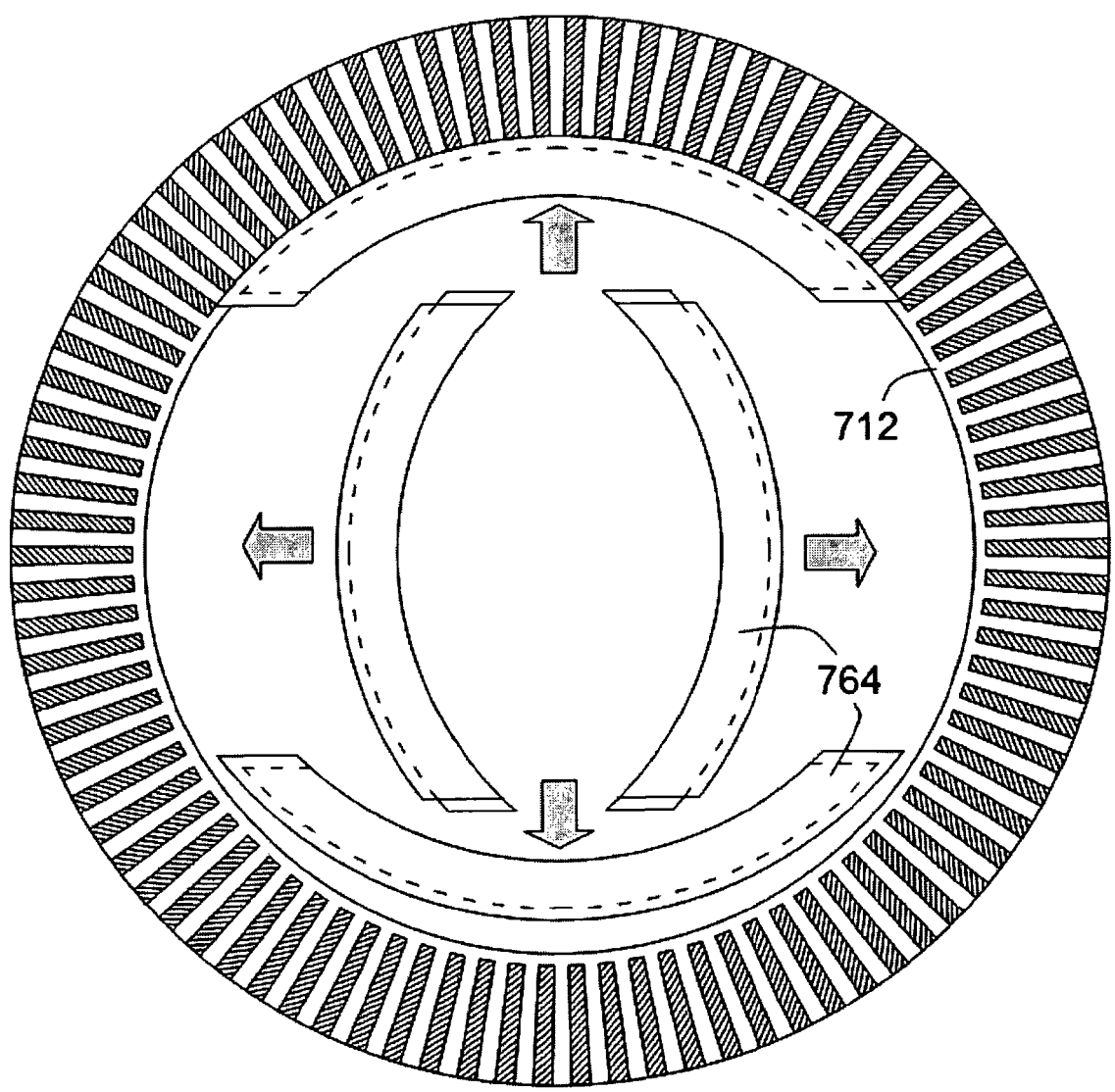
FIG. 77 is a schematic perspective exploded partial view showing one embodiment of a segmented collar, such as an inner collar, utilized for one method of collar assembly in accordance with the present invention.
Figure 78:
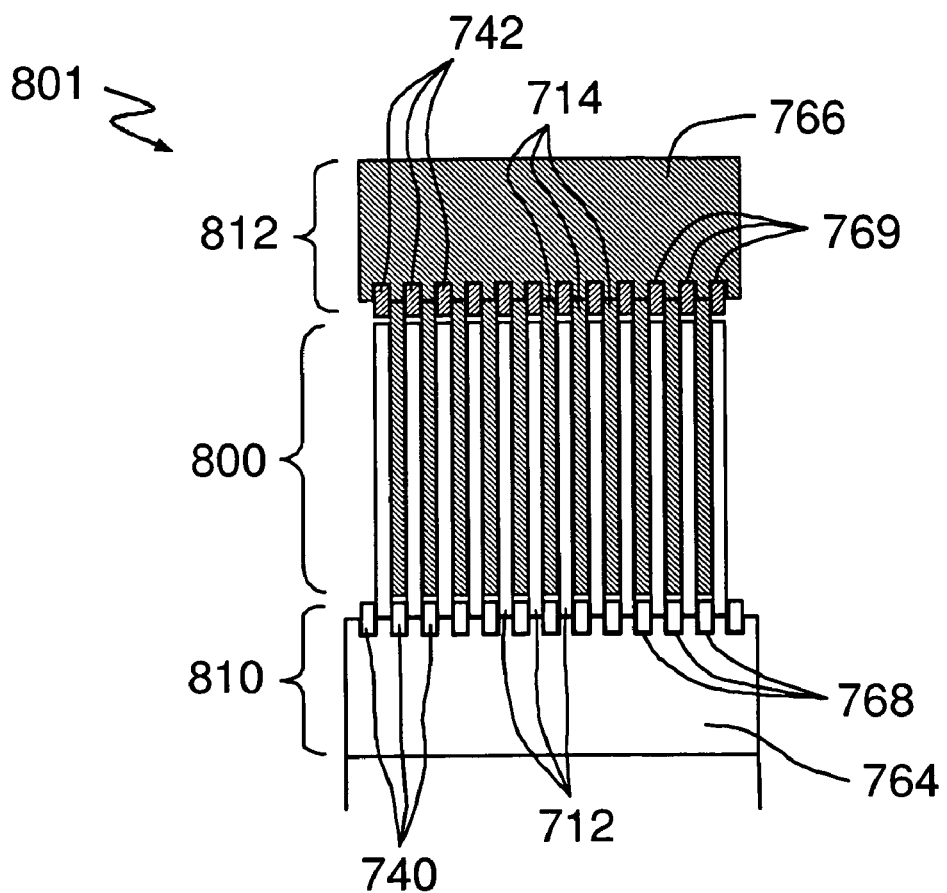
FIG. 78 is a schematic partial cross-sectional view of one embodiment of a disk stack assembly including root assemblies with grooved collars and snap-ring type spacers in accordance with the present invention.

Another configuration of a root assembly is a collar-type root assembly as shown in FIGS. 67, 77 and 78. FIG. 67 shows a cross-section of the disk stack assembly 801 which includes disk stack assembly 800, inner root assembly 810 and outer root assembly 812. Inner root assembly 810 includes inner collar 764 and the inner roots 712. Similarly, outer root assembly 812 includes outer collar 766 and outer roots 714. In this variation, outer collar 766 includes grooves 769 to accept outer roots 714, and inner collar 764 includes grooves 768 to accept inner roots 712. Typically, collars 764 and 766 are segmented to facilitate assembly. FIG. 77 shows one example of a four-piece inner collar 764, and one way of assembling it to attach to a set of inner roots, namely by first attaching two opposing portions, then attaching the remaining two opposing portions to inner root 712.

Figure 79:
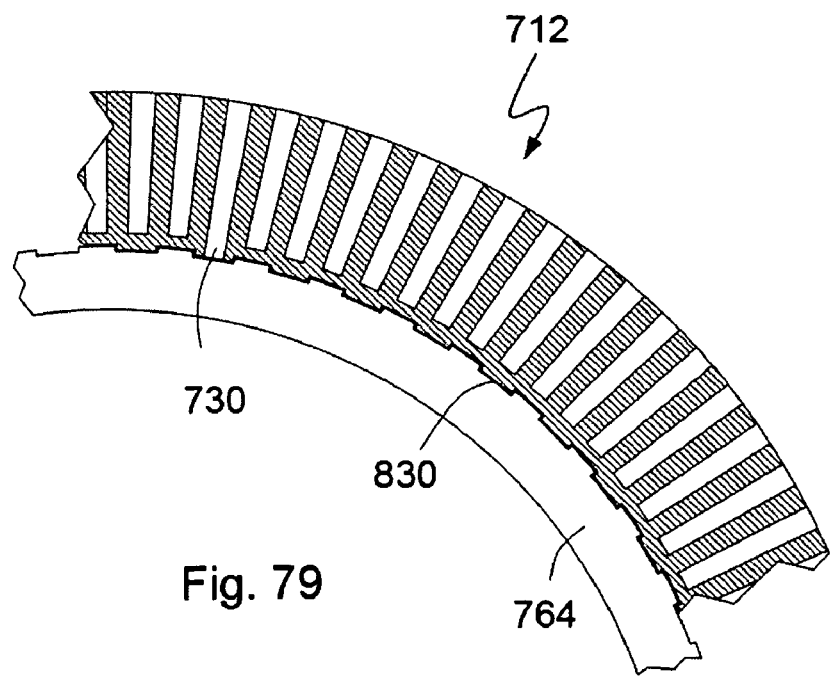
FIG. 79 is a schematic partial end view of one embodiment of a spaced disk, such as an inner disk, including a splined root for mating with a splined collar for tangential disk alignment.

Segmenting the collars is not a necessary limitation, however. FIG. 78 shows another example of a collar-type root assembly where spacers 740, 742 are used to space the disk roots 712 and 714 respectively, and to provide surface area for attaching the roots to the collars, e.g. using adhesive or solder. As shown, collars 764, 766 include grooves 768 and 769 to accept disk roots 712 and 714, and typically spacers 740, 742 have at least one tangential gap to allow circumferential stretching or compressing to facilitate assembly (i.e. like snap-rings). These are not necessary limitations, however, and only one of the inner root assemblies may include a collar, the collar(s) need not necessarily be grooved, and the spacers do not necessarily need tangential gaps. Additionally, in one variation, less than all of the disk roots of spaced disks of the disk stack may be attached to the collar. The disks may also be aligned and/or attached to the collars by a spline, keyway or other tangential alignment feature. FIG. 79 shows one example of an inner disk 712 including spline teeth 830 to engage a splined collar 764. Discontinuity 730 is also shown.

Typically, the collar associated with a coil links the active flux. To avoid eddy-current losses, this collar is preferably made of non-conductive material, or, if conductive, should have at least one discontinuity. In one example, a discontinuity in a collar is a spiral wound discontinuity 820, FIG. 80A, or the discontinuity may be a puzzle joint discontinuity 822, FIG. 80B. Other types of collar discontinuities include but are not limited to multi-lap radial discontinuity 824, FIG. 80C, multi-lap axial discontinuity 826, FIG. 80D, or woodruff keys discontinuity 828, FIG. 80E.

Collars 764, 766, FIG. 78 are typically made of low-permeability materials, for example 300 series stainless steel, brass, aluminum, ceramic, or reinforced polymer material. Root assemblies 810 and 812 are typically configured to allow axial movement, e.g. to move axially with respect to each other as discussed above, and typically will be configured to move or allow movement over a distance greater than the average width of the gaps between the adjacent interleaved spaced disks.

Figure 81:
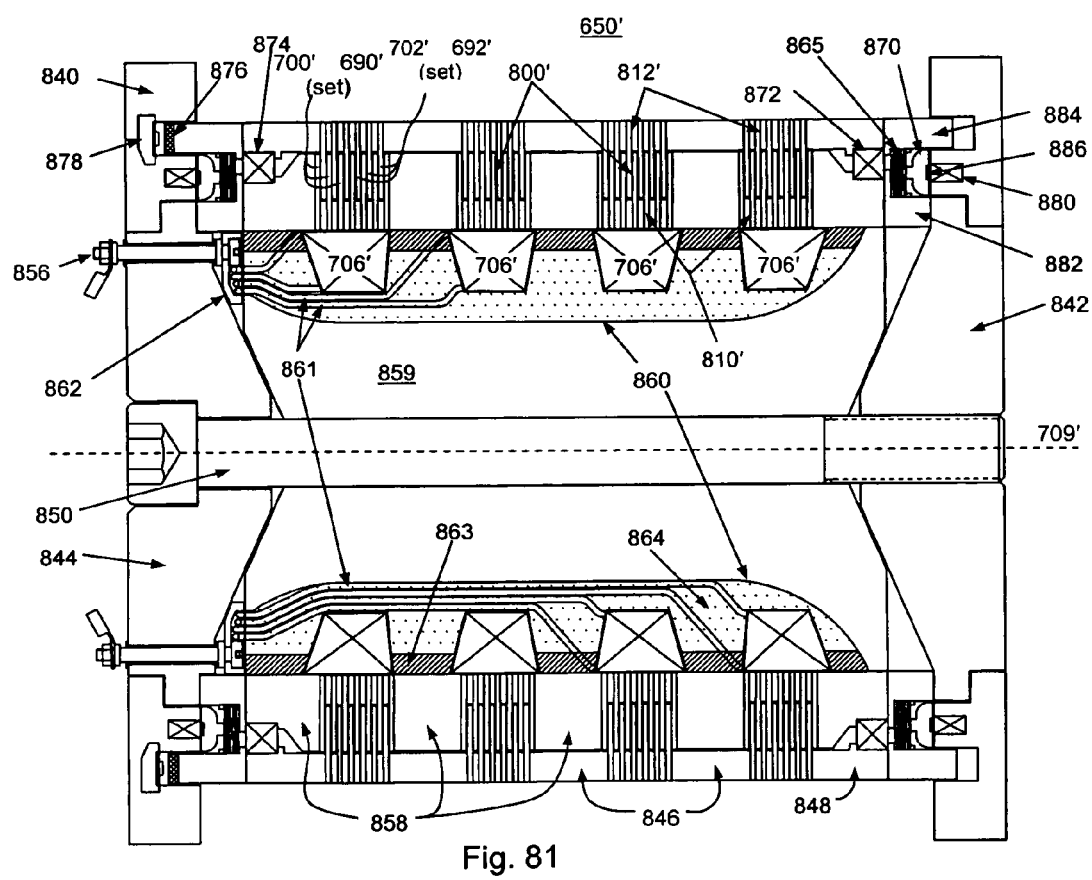
FIG. 81 is a schematic cross-sectional view showing primary components of one embodiment of a rotary reluctance motor in accordance with the present invention including multiple disk stacks.

In one embodiment, rotary reluctance motor 650', FIG. 81 in accordance with the present invention includes a plurality of interleaved disk stacks 800', four of which are shown, and coils 706', one associated with each disk stack 800'. Each interleaved disk stack 800' is structured and configured in accordance with the present invention consistent with the description above. The axial spacing of the four disk stacks is controlled by flux return portions or flanges 858, case parts 846, and root assemblies 810' and 812'. The lengths of these parts will vary slightly due to fabrication tolerances and unequal thermal expansion. This causes the roots of the first set of disks to be displaced axially with respect to the roots of the second set of disks.

In the embodiment shown in FIG. 81, inner root assemblies 810' are held stationary, i.e. are part of the stator, and outer root assemblies 812' are part of the rotor, rotating about axis 709'. In operation, sets 690' of interleaved disks 700' (i.e. the inner disks) are thus held stationary while sets 692' of interleaved disks 702' (outer disks) rotate. Similarly as noted above, in alternative configurations the outer disks could be fixed while the inner disks rotate.

Figure 84:
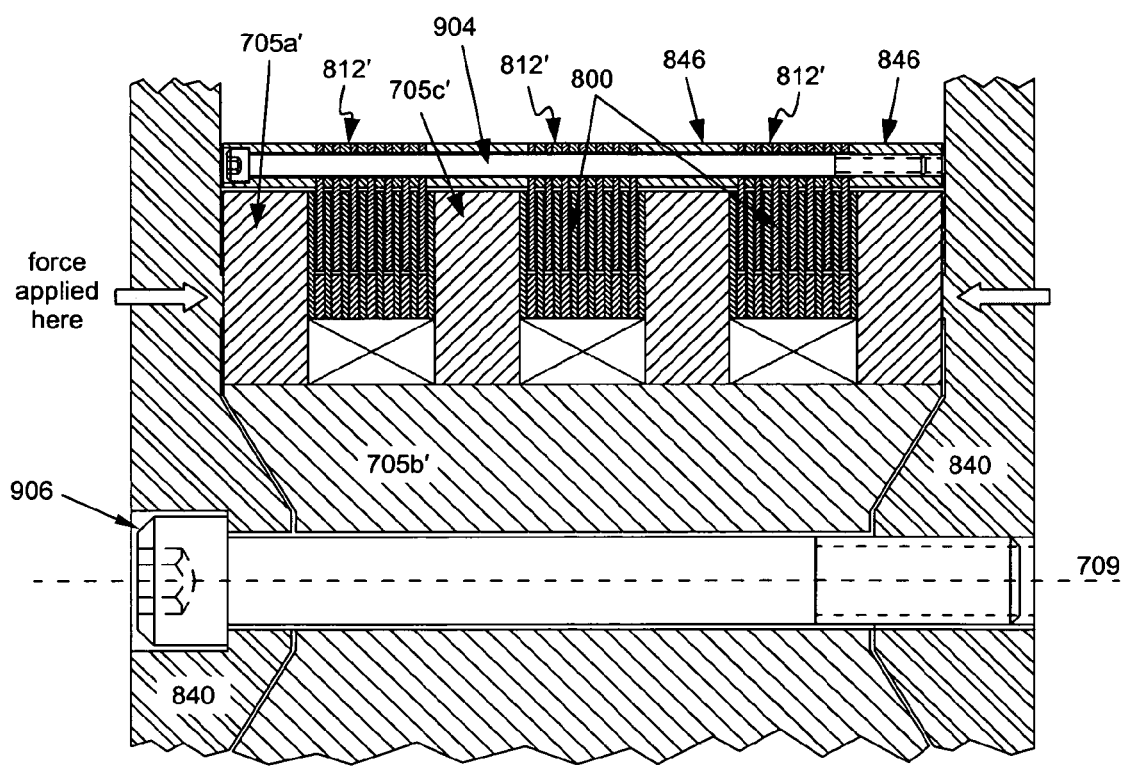
FIGS. 84 and 85 are schematic partial cross-sectional views of two embodiments of axial preloading elements and flux return configurations in accordance with the present invention.

As shown, the rotor parts also include outer root assemblies 812' and case parts 846. Axial tie-rods 904, shown in FIG. 84, typically run through the outer root assemblies and case parts. In one variation, the rotor parts are prevented from rotating independently by pre-tensioning the tie-rods so as to clamp the parts together. Close fitting axial pins can also be used to engage mating holes in the root assemblies and case parts as discussed below.

The stator parts typically include inner root assemblies 810', FIG. 81, flux-return core 859, and coils 706'. In one variation, the stator parts also include flux-return flanges 858, inner brake collars 882, end-washer 844, end-nut 842, yokes 840, and central bolt or tie-rod 850. In this configuration, central bolt 850 pulls inward on the end-washer 844 and end-nut 842, thus clamping inner brake collars 882, flux-return flanges 858, and inner root assemblies 810. End nut 842 and end washer 844 are typically attached to yokes 840 using bolts (not shown). Yokes 840 provide the mounting features for the stator components, which in one example include threaded holes.

Figure 82:
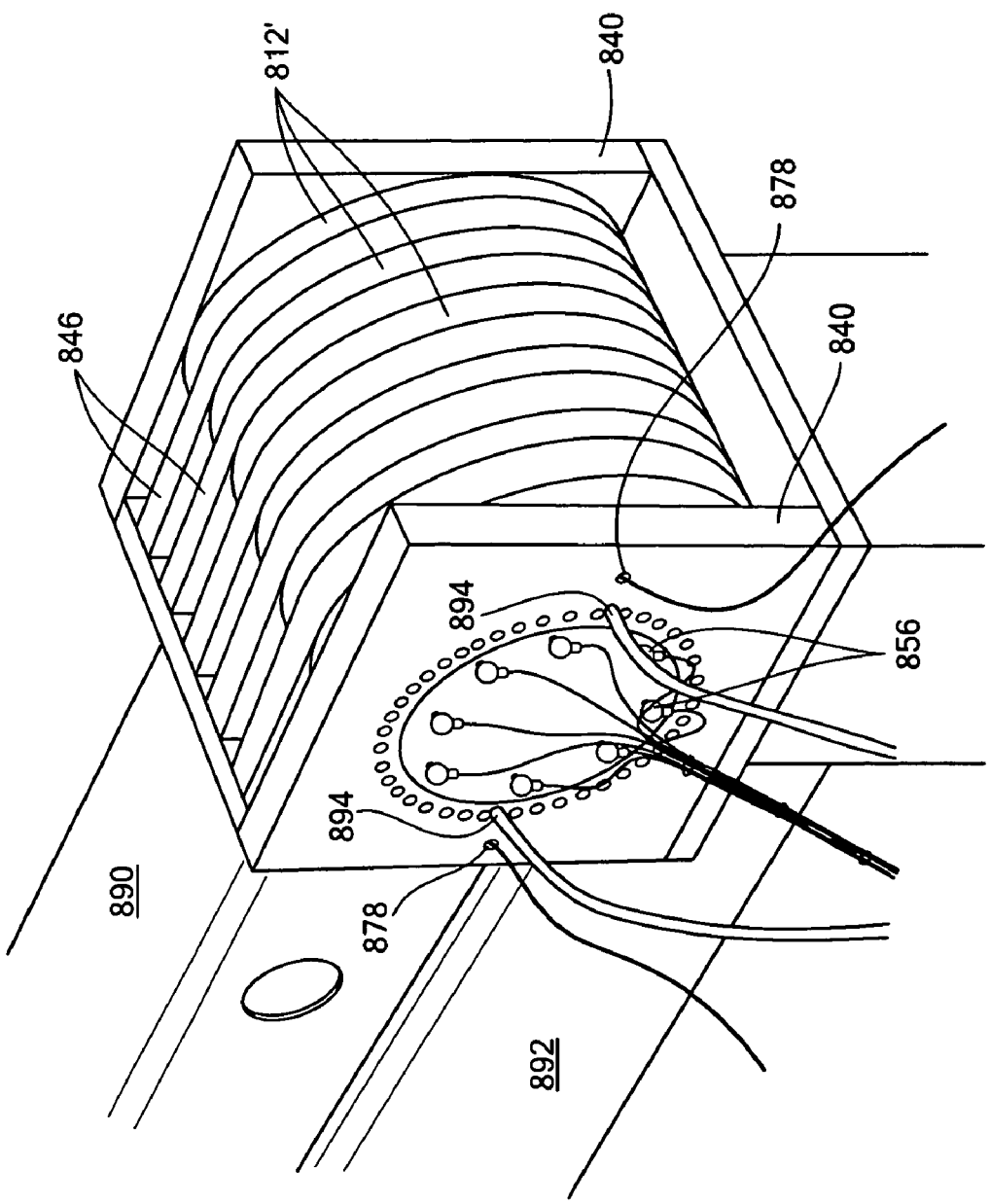
FIG. 82 is a schematic perspective view of the rotary reluctance motor of FIG. 81.

In one embodiment, case parts 846, FIG. 82, are D-shaped elements attached to the outer root assemblies 812' (of spaced disks 692'), and are also attached to main arm 890, such that when the outer roots and outer root assemblies 812' of the spaced disks rotate, the torque generated by rotary reluctance motor 650', FIG. 81 lifts or moves main arm 890, FIG. 82 which may be used to perform work itself, or which may be attached to additional structure(s). In one example, yokes 840, FIG. 82 are attached to reaction arm or post 892 for stability. Coolant ports 894 may be included to provide coolant 864, FIG. 81 to slots 860.

Figure 83:
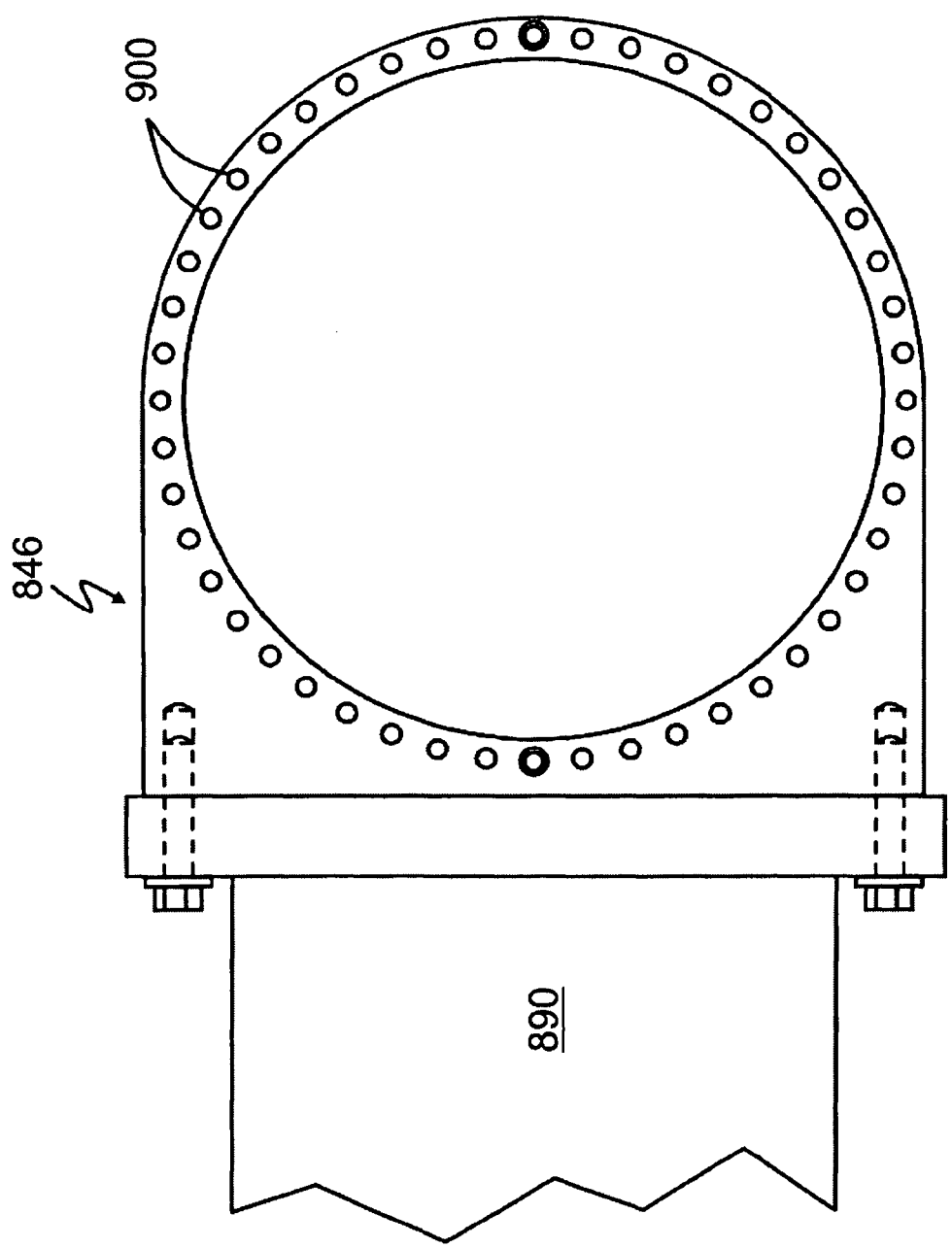
FIG. 83 is a schematic end view of one example of a case part for use with a rotary reluctance motor in accordance with one aspect of the present invention.
Figure 85:
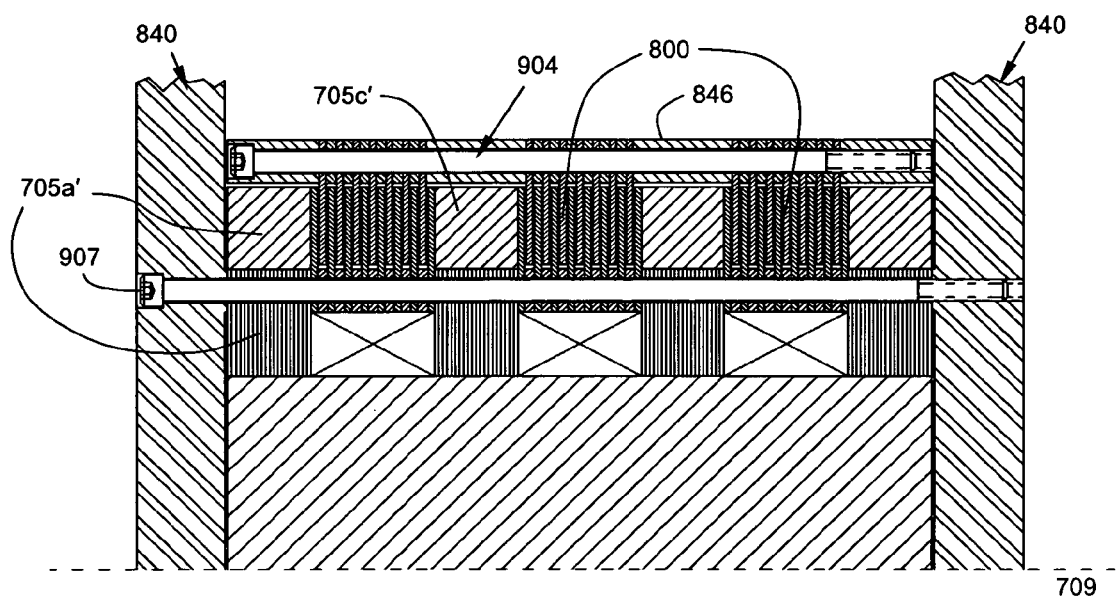

One configuration of case part 846, FIG. 83, includes holes 900 corresponding, e.g. to holes 901, FIG. 61 of outer root 714, through which a means for attaching, such as bolts, pins, tie rods or the like, may be inserted. In one variation, axial preloaded bolts or tie-rods 904, FIG. 84 through root assemblies 812', and central preload bolt or tie-rod 906, are utilized to transmit torque from the root assemblies, e.g. root assemblies 812' through flux return portions 705a', 705c' and into yokes 840. Pre-loaded bolts 904 and pre-load bolt 906 apply axial pre-load, and torque is transferred through friction. Axial pre-load for the "rotor" parts (including the outer disk roots) is supplied by bolts or tie-rods 904, and axial pre-load for the "stator" (including inner disk roots) is provided by center bolt or tie-rod 906. In another variation, shown in FIG. 85, the "stator" parts are axially pre-loaded by a plurality of bolts or tie-rods 907 instead of a center bolt.

Corresponding holes such as holes 900 in case part 846, FIG. 83 and holes 901 in outer root 714, FIG. 61 in one example, and alignment means therebetween such as pins, bolts, and tie rods or the like, are also typically utilized for precise alignment such that the (stator and) rotor portions (e.g. fixed sets of spaced disks and rotatable sets of spaced disks) of each disk stack are aligned, in order that the high permeability teeth of the rotor and stator of each disk stack have the correct rotational offset with respect to the other disk stacks. For instance, in one configuration, each disk has a total of five-hundred sixty-two (562) high-permeability teeth and alternating low permeability material segments, collectively referred to as "teeth" for the discussion of phases, and there are four phases. When the rotor and stator teeth of Phase 1 are aligned, the phase angle is said to be 0°. The rotor teeth of Phase 2 are typically advanced by a phase angle of 90°, which represents approximately half a tooth width (assuming equal width teeth and low-permeability material segments). Phase 3 will have phase angle 180°, thus having misaligned, i.e. non-overlapping teeth. Phase 4 will typically have phase angle 270°, and its teeth will be approximately half-overlapping, but in the opposite direction as Phase 2. More generally, the desired phase angle offset between phases is 360°/Nphases, where Nphases is the number of phases. This phase offset can be achieved by a rotating the outer root assembly (relative to the inner root assembly) by the angle 360°/(Nphases·Nteeth), where Nteeth is the number of teeth per disk. For smooth continuous torque in either direction, embodiments of a rotary reluctance motor in accordance with the present invention, typically include three or more "phases," each phase including a disk stack, coil and flux-return. The phases are typically arranged axially as shown for example in FIG. 81. Due to fabrication tolerances and thermal expansion there can be a substantial axial alignment error.

If the number of teeth per disk is chosen correctly, the desired phase offsets can also be achieved with larger, more convenient rotations. In one variation, the motor has four phases and the number of teeth is divisible by two but not by four. Disks 700, FIG. 59 are aligned using two alignment holes 732, FIG. 60, spaced 180° apart. Since Nteeth is divisible by 2, discontinuities 730 can be offset 180° without affecting the tooth alignment. Disks 702 have eight equally spaced alignment holes 902, FIG. 61. Each 180° pair of holes is marked with 1, 2, 3 or 4 tic marks 903a, 903b, 903c and 903d respectively. Choosing the correct pair of alignment holes clocks the outer disks in increments of 45°, effecting a phase offset in increments of 90°.

When a phase is energized (i.e. current is applied to a coil associated with a particular disk stack), axial flux is generated through the disk stack which tends to bring the rotating disks (associated with the "rotor" portion of the motor) of that disk stack into alignment with the non-rotating disks (associated with the "stator" portion of the motor). In effect, the flux produces a "shear pressure" acting tangentially on the inter-leaved surfaces of the rotor disks. FIG. 23 shows a typical set of curves for shear pressure vs. tooth alignment at various levels of flux-density. It should be noted that this characteristic is essentially the same as for a multi-blade linear motor having similar high-permeability tooth material, disk thickness and pitch. The numbers in the legend of this graph represent the flux-density (in units Tesla) if all the axial flux were to be concentrated in the disk teeth. To get the average axial flux-density, divide by 2. On the X-axis, tooth alignment of 0 corresponds to phase angle 180°, and tooth alignment 1 represents 100% alignment which is phase angle 360° (or 0°).

From phase angle 180° to 360° a phase produces positive torque. The torque is approximately equal to the product of the shear pressure, interleaved surface area of the rotor disks and the mean radius of the disk stack. From phase angle 0 to 180°, the phase produces negative torque. To produce smooth torque, three or more phases are typically needed and each phase is typically energized over half the tooth cycle (e.g. over 180-360° phase angle to produce positive torque). Over the other half of the tooth cycle, the phase is typically turned off. As described above, the phases are typically offset by 360°/Nphases. FIG. 24 shows the top curve of FIG. 23 superimposed with the same curve advanced and retarded by ⅔ of a tooth (120° phase offset). This is the desired offset for a three-phase motor. The three curves represent the potential shear pressure that could be supplied to each of the three sets of spaced rotor disks. The fourth curve labeled "All 3 Phases" represents the sum of the contributions of the three phases divided by three to reflect the fact that there is three times greater rotor disk surface area. This fourth curve can be used to determine the potential motor torque, assuming the practical maximum flux-density is limited by the cross-sectional area of the flux-return.

To produce smooth torque, the current to each phase is modulated as a function of the phase angle, which is inferred by the rotor position as measured, for example, by an encoder or resolver. FIG. 27 shows example three-phase waveforms of the MMF per rotor disk needed to produce 2 psi and 4.4 psi. The phase current waveform can be approximated by multiplying the MMF per rotor disk by the number of rotor disks per stack and dividing by the number of turns in the coil. Note that as Phase A is being energized, the adjacent phase is being de-energized.

Those skilled in the art will recognize that the current waveform for smooth torque will depend on the number of phases, the number of disks, the tooth geometry, number of turns in the coil, B-H curves of the flux-return portions, and other factors. With modern controls, a rotary reluctance motor in accordance with the subject invention could be put on a test stand and run through a calibration procedure to create a look-up table describing the desired phase currents as a function of the rotor position, commanded torque, and direction of motion. The look-up table could be stored in flash memory, EPROM or other data storage media. A controller could be sold with the motor as an integrated package, thus accepting the torque command and position measurement and outputting the phase currents to the coils, e.g. coils 706' shown in FIG. 81.

Additionally, in the embodiment of FIG. 81, coils 706' are wound around the flux-return core 859 which includes slots 860 for providing a conduit for coil leads 861 which attach to coil terminals 856. Slots 860 also provide channels for coolant 864. As shown, the coolant runs axially down one slot, enters the coil, follows the coil wires tangentially for 180°, then exits by means of the second slot. Slots 860 can be made sufficiently wide so that coil leads 861 do not block the coolant flow. On the outer diameter of the flux-return core 859 the coolant is retained by the slot seals 863. The ends of slots 860 are connected to coolant ports by means of manifold 862. Manifold 862 also provides a sealed feedthrough for the coil terminals 856. Example coolants are gases such as air, nitrogen, helium, hydrogen, etc, and liquids such as oil, water, glycol, or a fluorinated synthetic. In another variation, flux return core 859 may have full-length slots and the coolant, e.g. air, could be forced in one end and out the other.

Figure 86A:
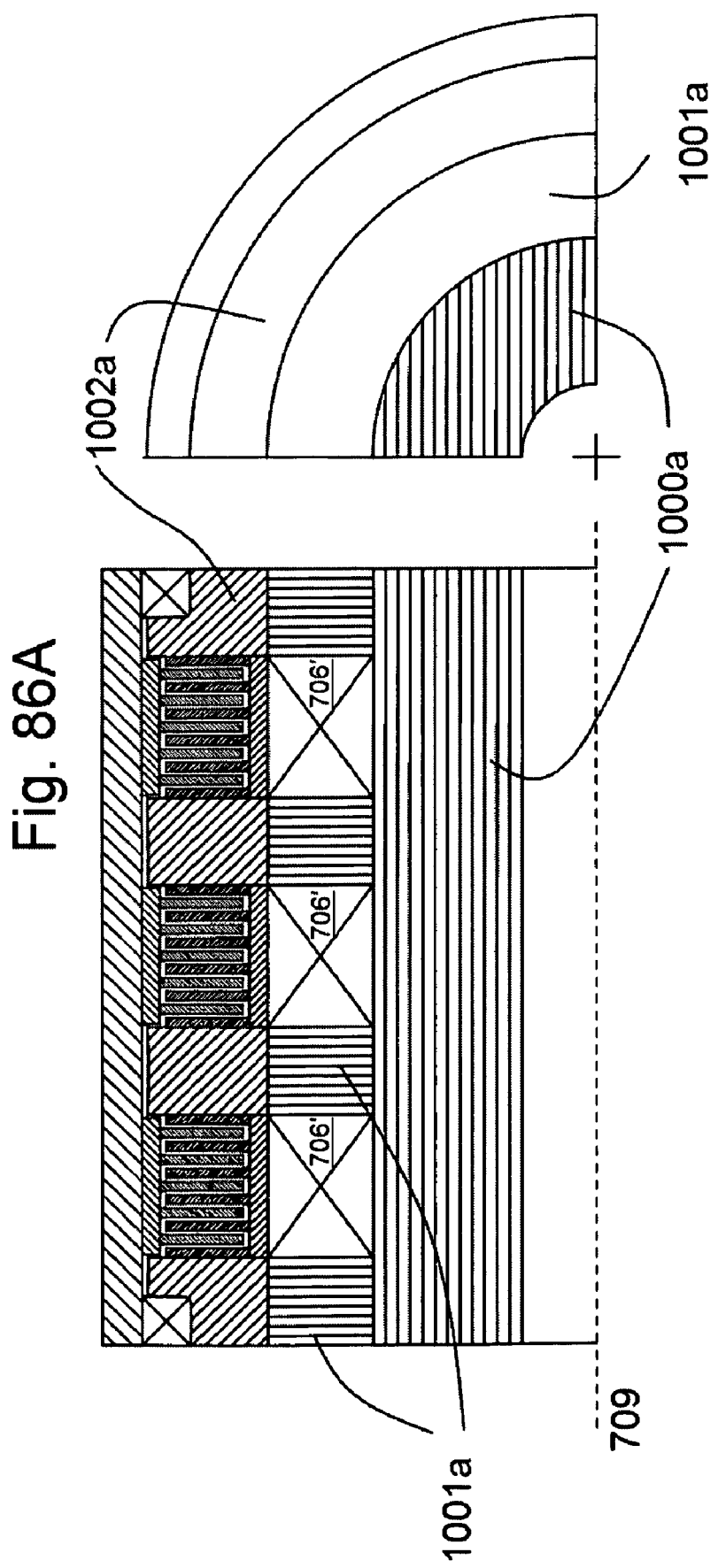
FIGS. 86A-86E are schematic partial cross-sectional and end views of embodiments of flux return configurations for conducting axial and radial flux and minimizing eddy currents in accordance with the present invention.
Figure 86B:
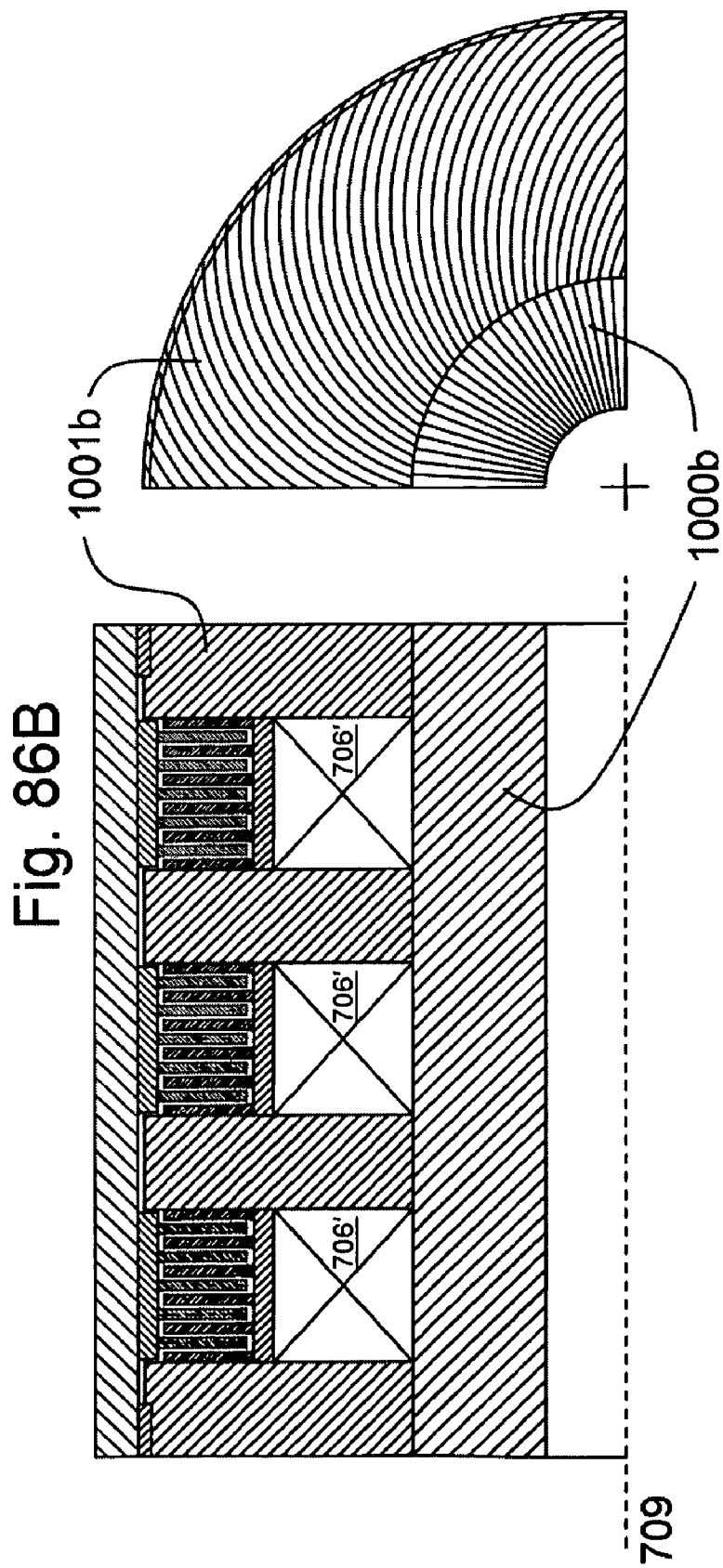
Figure 86C:
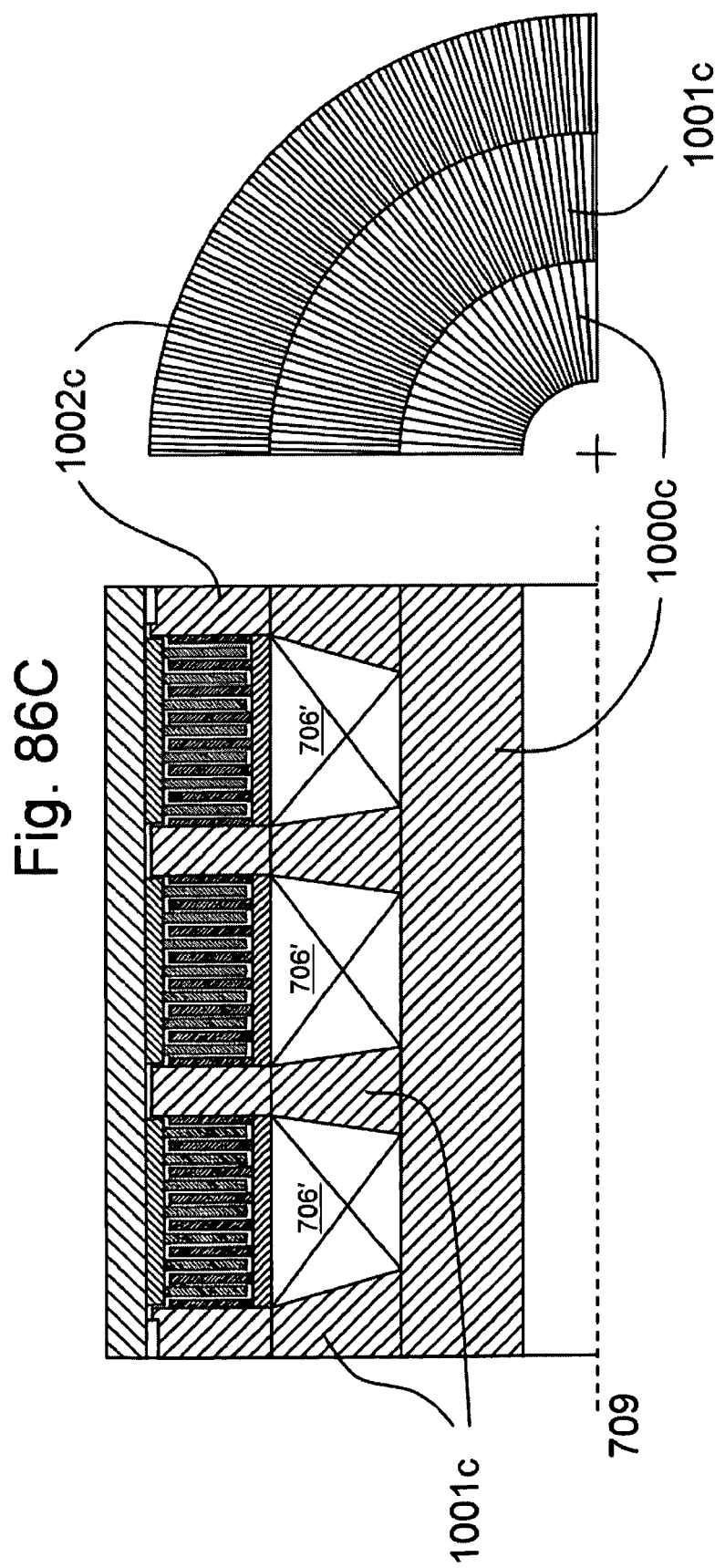
Figure 86D:
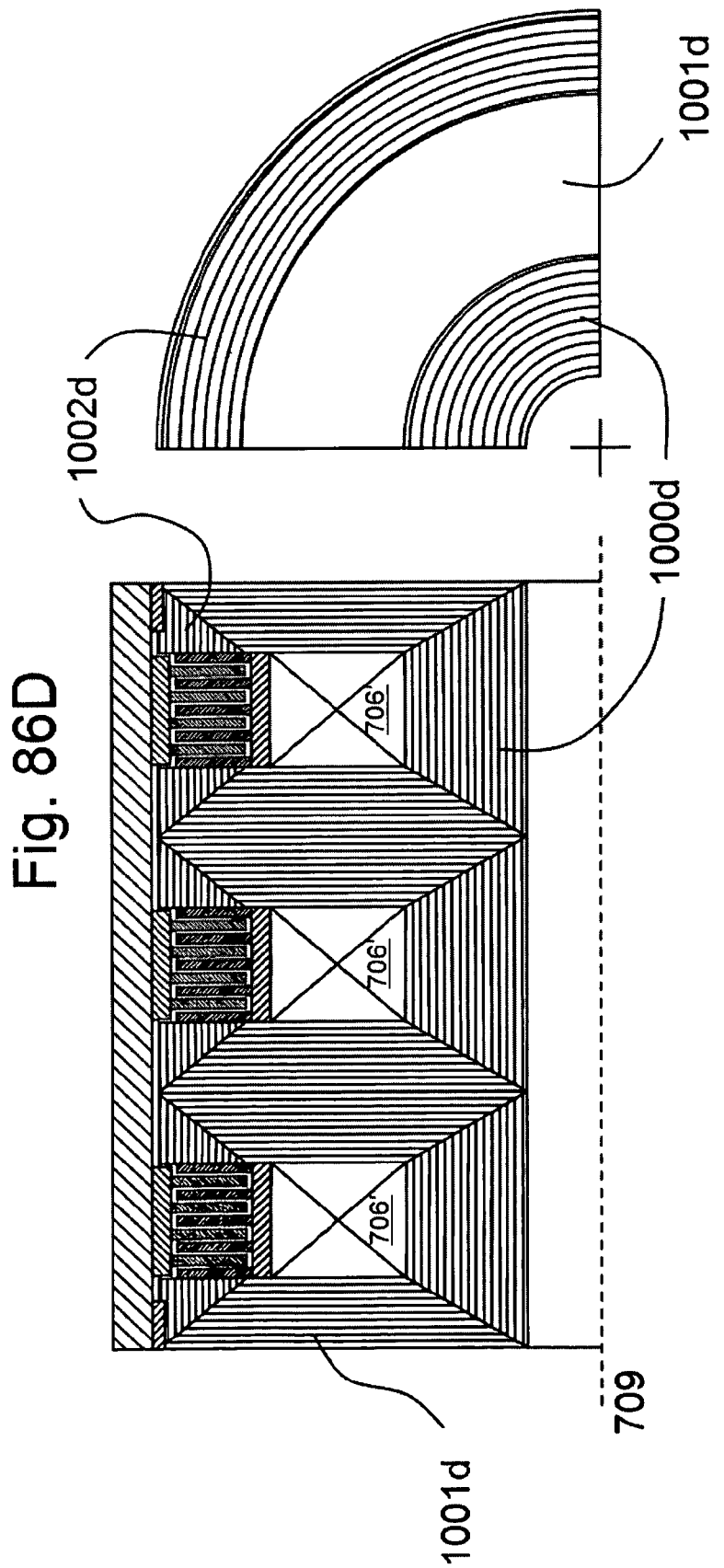
Figure 86E:
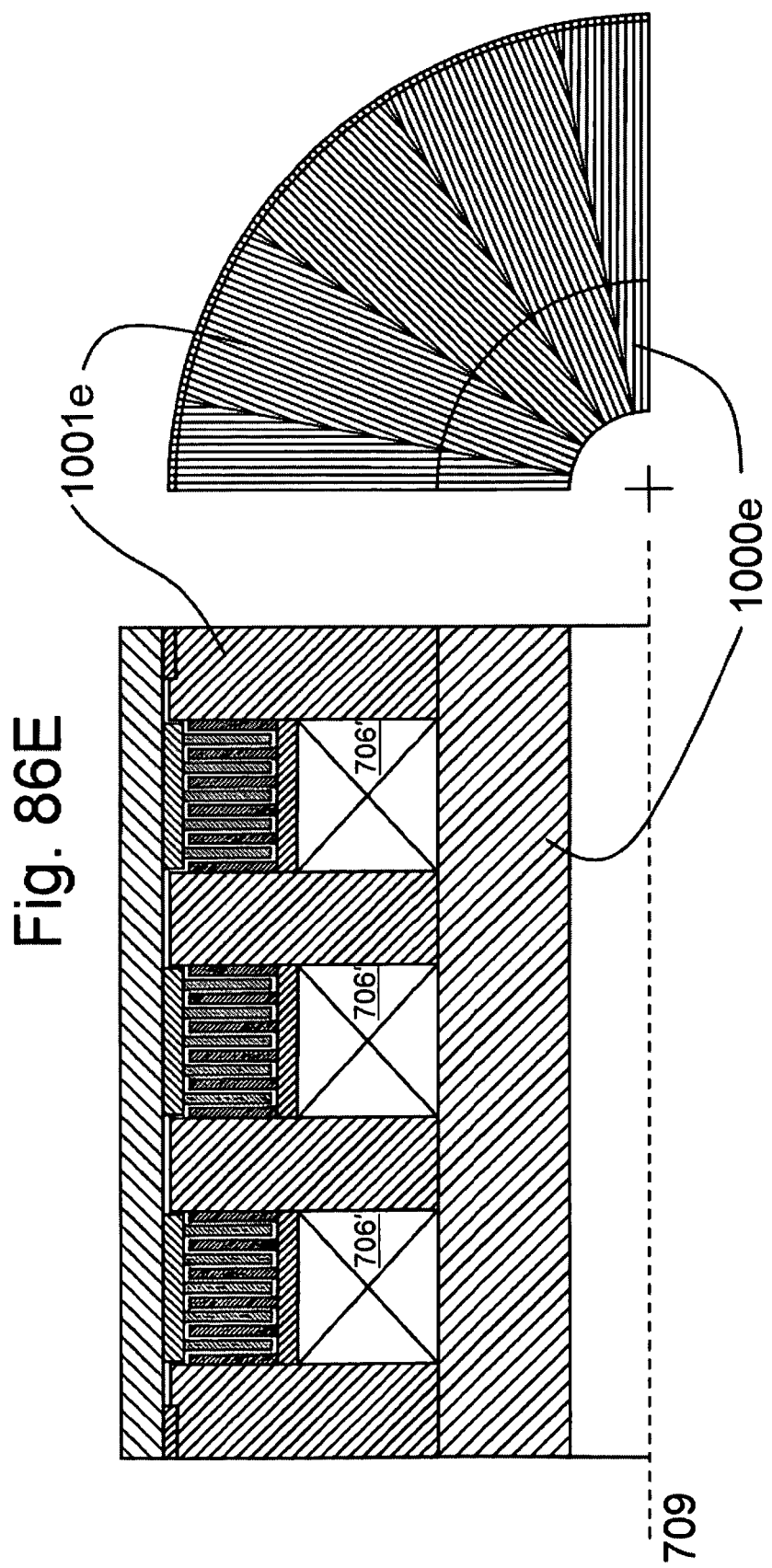

Various configurations for the flux return may be utilized depending on a particular desired application, and some examples are shown in FIGS. 86A-86E. In each case coils 706' are wound around one or more core sections 1000a-1000e, FIGS. 86A-86E. Core section 1000a, FIG. 86A is configured as a stack of flat laminations. Core sections 1000b and 1000c, FIGS. 86B and 86C, are configured as stacks of radially oriented tapered laminations. Core section 1000d, FIG. 86D is configured by tape-winding and machining the ends on an angle. Core section 1000e, FIG. 86E is configured as an assembly of wedges, wherein each wedge is a stack of flat laminations.

The flux return portion adjacent to each coil can be part of the flux-return core 859 as shown in FIG. 81, or can be a separate core section piece 1001a, 1001b, 1001c, 1001d or 1001e, as shown in FIGS. 86A-86E. In FIG. 81, coils 706' are shown wound directly onto flux-return core 859, while in the configurations shown in FIGS. 86A-86E, the coils 706' are separate sub-assemblies.

Referring to FIGS. 86A-86E, flux return 1001a is configured to have circular flat laminations stacked axially, flux return 1001b is configured to have constant-thickness, curved laminations, and flux return 1001c is configured to have tapered radial laminations alternating with flat laminations. This reduces the number of tapered laminations required, thereby reducing cost. Flux return 1001d is a stack of flat, circular laminations, including ends which are typically beveled so as to mate with other core flux return portions. Flux return 1001e is configured as an assembly of wedges made up of flat laminations.

The flux-return portion adjacent to the disk stack can be part of the portion adjacent to the coil (e.g. 1001b and 1001e), or can be a separate piece (e.g. 1002a, 1001c, 1001d). Flux-return portion 1002a is typically a high-resistivity material such as ferrite or Permedyn™. Flux return portion 1002c is configured to have tapered radial laminations interspersed with pairs of flat laminations. Flux return portion 1002d is typically tape-wound and bevel-cut to mate with 1001d, and flux return portion 1001e has wedges made of flat laminations.

The flux-return configurations described are not limiting, and other flux-return geometries are possible depending on a particular desired application, and techniques and configurations described for a particular flux-return portion can be applied to other portions as well. For instance, the entire flux-return could be made of Permedyn™. The flux return portions may have slots 860 such as shown in FIG. 81, e.g. for the purpose of routing wires to the coils and/or for cooling, and/or the flux-return may also have axial holes to accept tie-rods.

The structures shown in FIGS. 86A-86E can also be achieved by starting with one or more solid pieces of ferromagnetic material and cutting radial or curved slits, e.g. by using a bandsaw, rotary saw, EDM, water jet, laser or other means. Other slit patterns would also be effective as long as they reduce the effective thickness of metal in the direction of flux. The slits can also be potted with a low thermal expansion compound to provide greater strength.

Examples of ferromagnetic material appropriate for the flux return include pure iron, low-carbon steel, or iron alloyed with any of the following: cobalt, silicon, nickel, chromium, manganese, vanadium or molybdenum.

Additional features may also be included in rotary reluctance motor 650', FIG. 81, such as a failsafe brake, bearings and/or an encoder. As shown there are two brakes on either side of the motor. Brake spring 886 preloads brake washer 870 against interleaved brake disks 866, thus resisting rotation. The brake disks are attached to inner brake collar 882 and outer brake collar 884. The brake collars are attached to the stator and rotor respectively. Applying current to brake coil 880 pulls the brake washer toward the yoke, thus defeating the brake spring and releasing the brake. FIG. 81 also shows bearings 872 and 874, and an encoder which includes encoder grating 876 and encoder sensor 878. It will be understood that these latter further and additional features as shown are not necessary limitations of the invention, and some of these further or additional features may be interchanged, placed in alternate configurations, and/or excluded or substituted therefore as desired for a particular application.

The present invention thus results in an improved rotary reluctance motor with higher torque density and reduced power dissipation compared with conventional motors, and in one instance the "motor constant", or torque per square root of electrical power, was determined to be approximately ten times higher than comparably sized state-of-the-art brushless PM direct-drive motors. Also, as with most electromagnetic motors, the present invention can do both positive work and negative work. Negative work is often needed in positioning applications, e.g. to decelerate or lower a payload, or when the motor is used as a generator. Additionally, the subject invention is particularly advantageous for low-speed power generation such as wind or wave power since it could avoid the need for a step-up transmission.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A rotary reluctance motor comprising:
a set of inner disks each having an inner diameter root, an outer diameter free end, and a plurality of alternating high permeability teeth and low permeability material segments;
a set of outer disks interleaved with the inner disks to form a disk stack with an average axial clearance between disks of the disk stack, each outer disk having an outer diameter root, an inner diameter free end, and a plurality of alternating high permeability teeth and low permeability material segments;

an end disk at the end of the disk stack and a gap between the end disk and at least one of the adjacent flux return portion and the disk adjacent to the end disk, wherein said gap is substantially larger than the average axial clearance between disks of the disk stack;

flux return portions disposed axially adjacent the disks at each end of the disk stack; and a coil associated with the roots of one of the sets of disks configured to provide axial flux through the disk stack to rotate one set of disks with respect to the other set of disks.

2. The motor of claim 1 in which said gap is tapered to minimize the average size of said gap during operation of said motor.

3. A rotary reluctance motor comprising:

a set of inner disks each having an inner diameter root, an outer diameter free end, and a plurality of alternating high permeability teeth and low permeability material segments;

a set of outer disks interleaved with the inner disks to form a disk stack, each outer disk having an outer diameter root, an inner diameter free end, and a plurality of alternating high permeability teeth and low permeability material segments;

a flexure residing in a flexure region between a disk root and the interleaved portion of a disk;

flux return portions disposed axially adjacent the disks at each end of the disk stack; and a coil associated with the roots of one of the sets of disks configured to provide axial flux through the disk stack to rotate one set of disks with respect to the other set of disks.

4. The motor of claim 3 in which the flexure is formed by thinning a portion of the disk in the flexure region, increasing the height of the flexure region, including slots in the flexure region, or some combination thereof.

5. A rotary reluctance motor comprising:

a set of inner disks each having an inner diameter root, an outer diameter free end, and a plurality of alternating high permeability teeth and low permeability material segments;

a set of outer disks interleaved with the inner disks to form a disk stack, each outer disk having an outer diameter root, an inner diameter free end, and a plurality of alternating high permeability teeth and low permeability material segments, in which at least one of said inner or outer disks is thinner at the free end thereof;

flux return portions disposed axially adjacent the disks at each end of the disk stack; and a coil associated with the roots of one of the sets of disks configured to provide axial flux through the disk stack to rotate one set of disks with respect to the other set of disks.

6. A rotary reluctance motor comprising:

a set of inner disks each having an inner diameter root, an outer diameter free end, and a plurality of alternating high permeability teeth and low permeability material segments;

a set of outer disks interleaved with the inner disks to form a disk stack, each outer disk having an outer diameter root, an inner diameter free end, and a plurality of alternating high permeability teeth and low permeability material segments, the set of inner disks fixed at the inner diameter roots to an inner root assembly and the set of outer disks fixed at the outer diameter roots to an outer root assembly, at least one root assembly including a discontinuity to avoid circumferential eddy currents;

flux return portions disposed axially adjacent the disks at each end of the disk stack; and a coil associated with the roots of one of the sets of disks configured to provide axial flux through the disk stack to rotate one set of disks with respect to the other set of disks.

7. The motor of claim 6 in which the at least one root assembly includes multiple discontinuities which are staggered to provide greater mechanical strength.

* * * * *